United States Patent
Surnilla et al.

(10) Patent No.: US 6,691,669 B2
(45) Date of Patent: Feb. 17, 2004

(54) OVERALL SCHEDULING OF A LEAN BURN ENGINE SYSTEM

(75) Inventors: Gopichandra Surnilla, West Bloomfield, MI (US); John M. Roth, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,129

(22) Filed: Sep. 19, 2002

(65) Prior Publication Data

US 2003/0221660 A1 Dec. 4, 2003

Related U.S. Application Data

(63) Continuation-in-part of application No. 10/064,006, filed on Jun. 4, 2002.

(51) Int. Cl.[7] ................................................. F02B 17/00
(52) U.S. Cl. ..................... 123/295; 123/481; 123/198 F
(58) Field of Search ................................. 123/295, 481, 123/472, 198 F

(56) References Cited

U.S. PATENT DOCUMENTS 3,696,618 A  10/1972  Boyd et al.
5,992,142 A  11/1999  Pott
6,247,445 B1 * 6/2001  Langer ........................ 123/305

FOREIGN PATENT DOCUMENTS

JP   55-29002   3/1980
JP   55-49549   4/1980

* cited by examiner

Primary Examiner—Bibhu Mohanty
(74) Attorney, Agent, or Firm—Allan J. Lippa; Kolisch Hartwell, PC

(57) ABSTRACT

A method is disclosed for controlling operation of an engine coupled to an exhaust treatment catalyst. Under predetermined conditions, the method operates an engine with a first group of cylinders combusting a lean air/fuel mixture and a second group of cylinders pumping air only (i.e., without fuel injection). In addition, the engine control method also provides the following features in combination with the above-described split air/lean mode: idle speed control, sensor diagnostics, air/fuel ratio control, adaptive learning, fuel vapor purging, catalyst temperature estimation, default operation, and exhaust gas and emission control device temperature control. In addition, the engine control method also changes to combusting in all cylinders under preselected operating conditions such as fuel vapor purging, manifold vacuum control, and purging of stored oxidants in an emission control device.

7 Claims, 32 Drawing Sheets

*Figure 3D(1)A*   8 = 4 CYL. TRANSITION
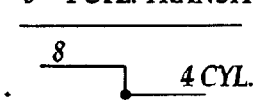
*Figure 3D(1)B* TP
*Figure 3D(1)C* SPARK
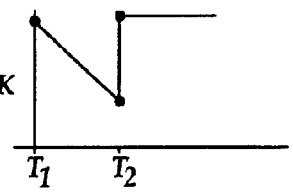
*Figure 3D(1)D* T
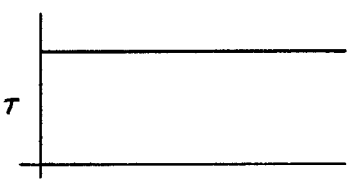
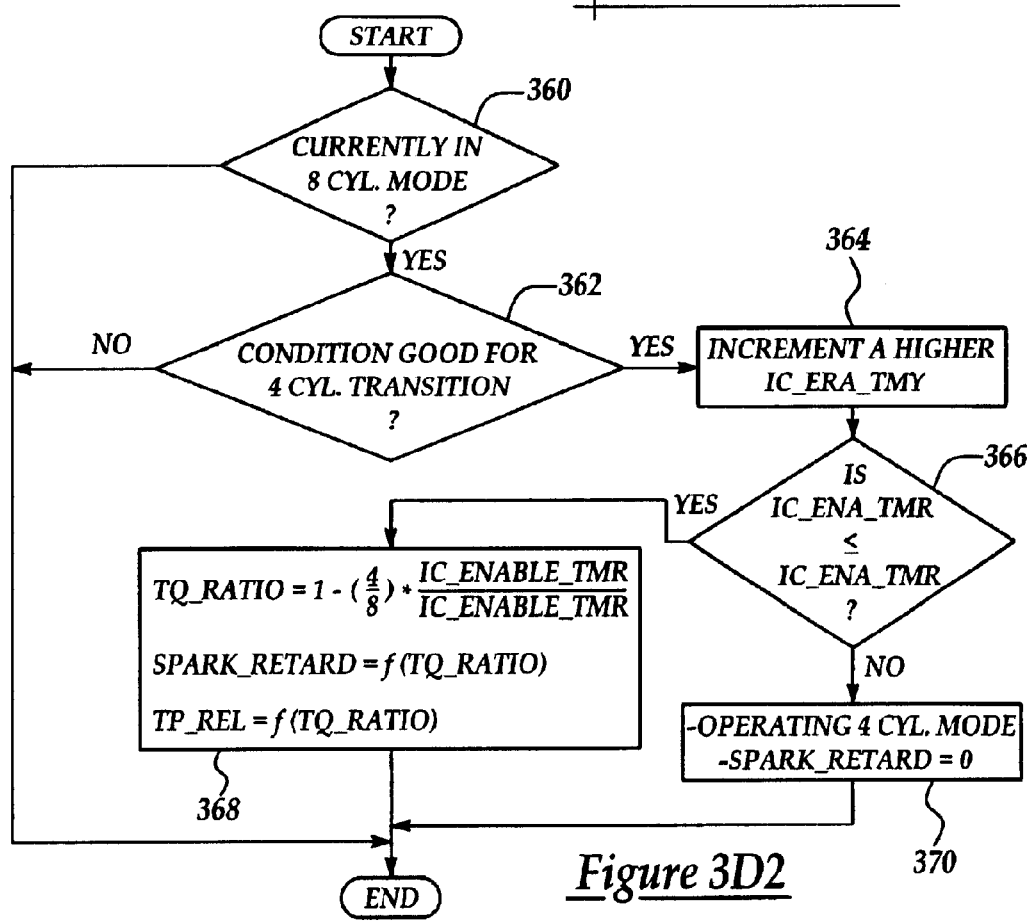
*Figure 3D2*

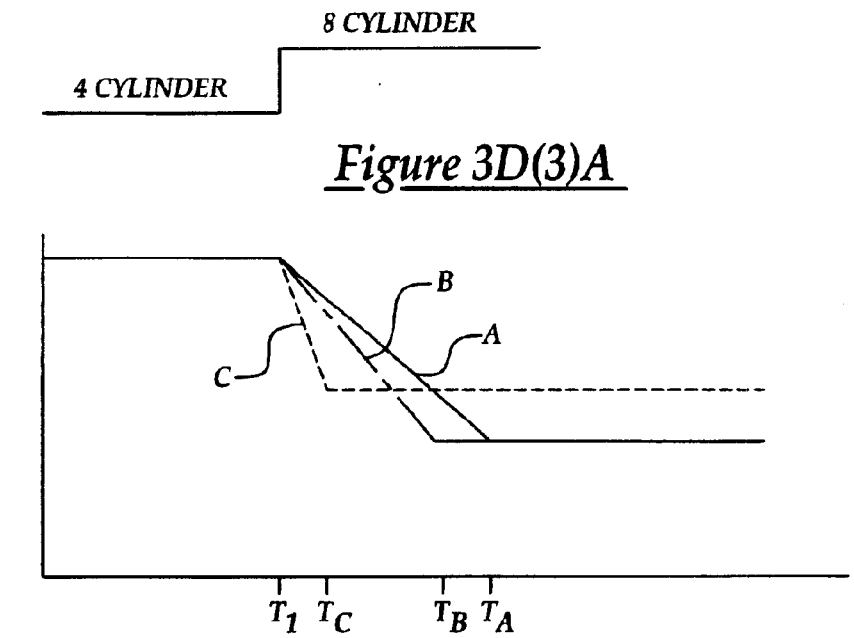
*Figure 3D(3)A*
*Figure 3D(3)B*
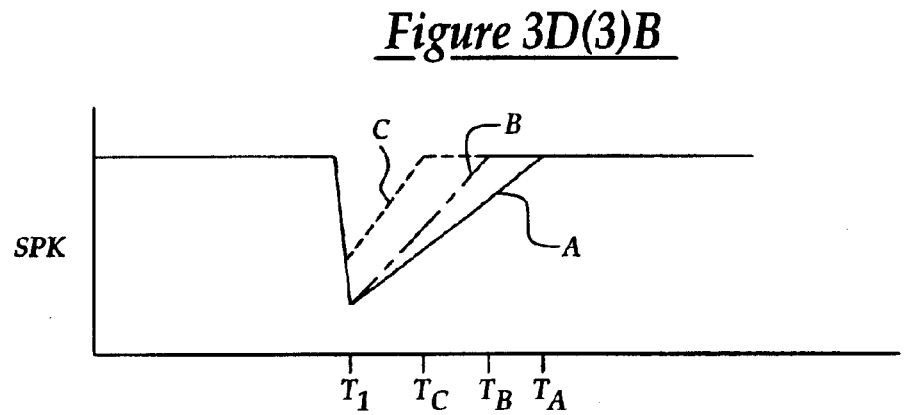
*Figure 3D(3)C*
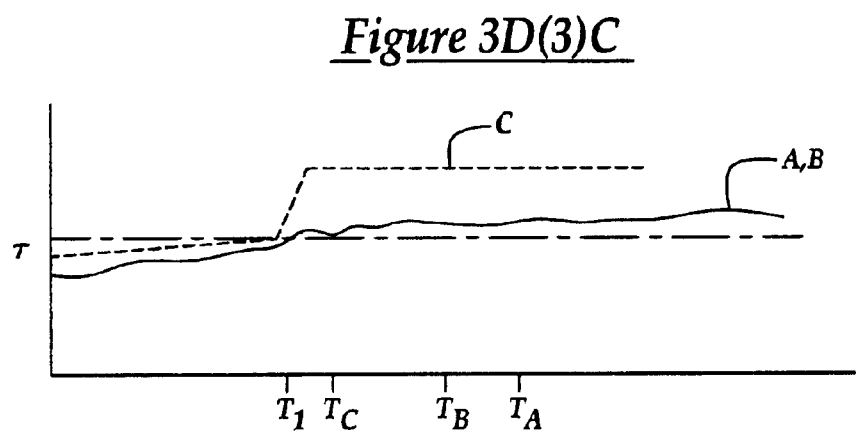
*Figure 3D(3)D*

OVERALL SCHEDULING OF A LEAN BURN ENGINE SYSTEM

CROSS REFERENCE TO RELATED APPLICATION

This application is a continuation-in-part of U.S. patent application Ser No. 10/064,006, filed Jun. 4, 2002, having the same assignee, and which is incorporated herein by reference in its entirety.

BACKGROUND OF INVENTION

1. Field of the Invention

This invention relates generally to variable displacement engines for providing improved fuel economy.

2. Background of the Invention

One method for selecting a number of cylinders to carry out combustion is described in U.S. Pat. No. 5,479,898. In this system, engine output is reduced via ignition timing, air-fuel ratio, and cylinder deactivation in a systematic approach. However, the inventors herein have recognized a disadvantage with such a system when using a new system configuration.

In particular, the inventors herein have recognized that operating with some cylinders combusting a lean air-fuel mixture and others inducting air without injected fuel can provide significantly increased fuel economy. Further, if an emission control device (that retains NOx during lean operation and later releases and reduces the NOx during rich operation) is coupled to the combusting cylinders, then such operation can be achieved without degraded emissions.

However, the inventors herein have also recognized that when exhaust gas recirculation, or EGR, is added to such operation, degraded airflow control can result.

SUMMARY OF INVENTION

By operating according to claim 1, it is possible to provide a requested airflow, and air to fuel ratio, even in the presence of EGR. i.e., since the EGR will displace fresh charge, and thereby change the combustion air-fuel ratio (since the recirculated exhaust gas includes a lean burnt mixture as well as fresh charge from the cylinders without fuel injection), the necessary airflow to meet a requested combustion air-fuel ratio is affected by the EGR.

BRIEF DESCRIPTION OF DRAWINGS

FIGS. 3D(1)A–D illustrate various engine operating parameters when transitioning from eight to four cylinder operation;

FIG. 3D(2) shows a high level flow chart for controlling engine operation during cylinder transitions;

FIGS. 3D(3)A–D illustrate engine operating parameters when transitioning from four to eight cylinders;

FIGS. 13G(1)–(3) illustrate engine operation during engine mode transitions;

DETAILED DESCRIPTION

Figure 1A:
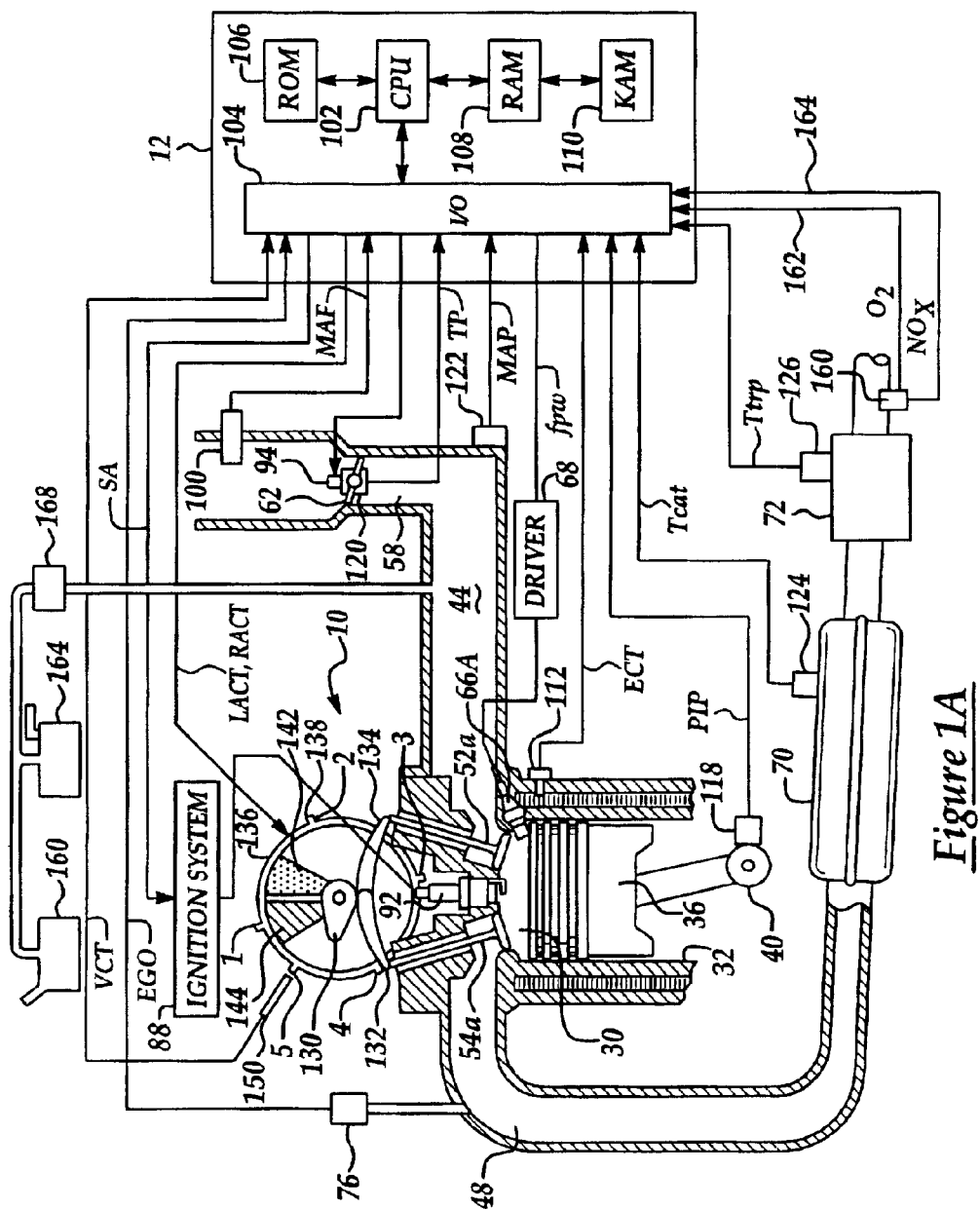
FIGS. 1A and 1B show a partial engine view.
Figure 1B:
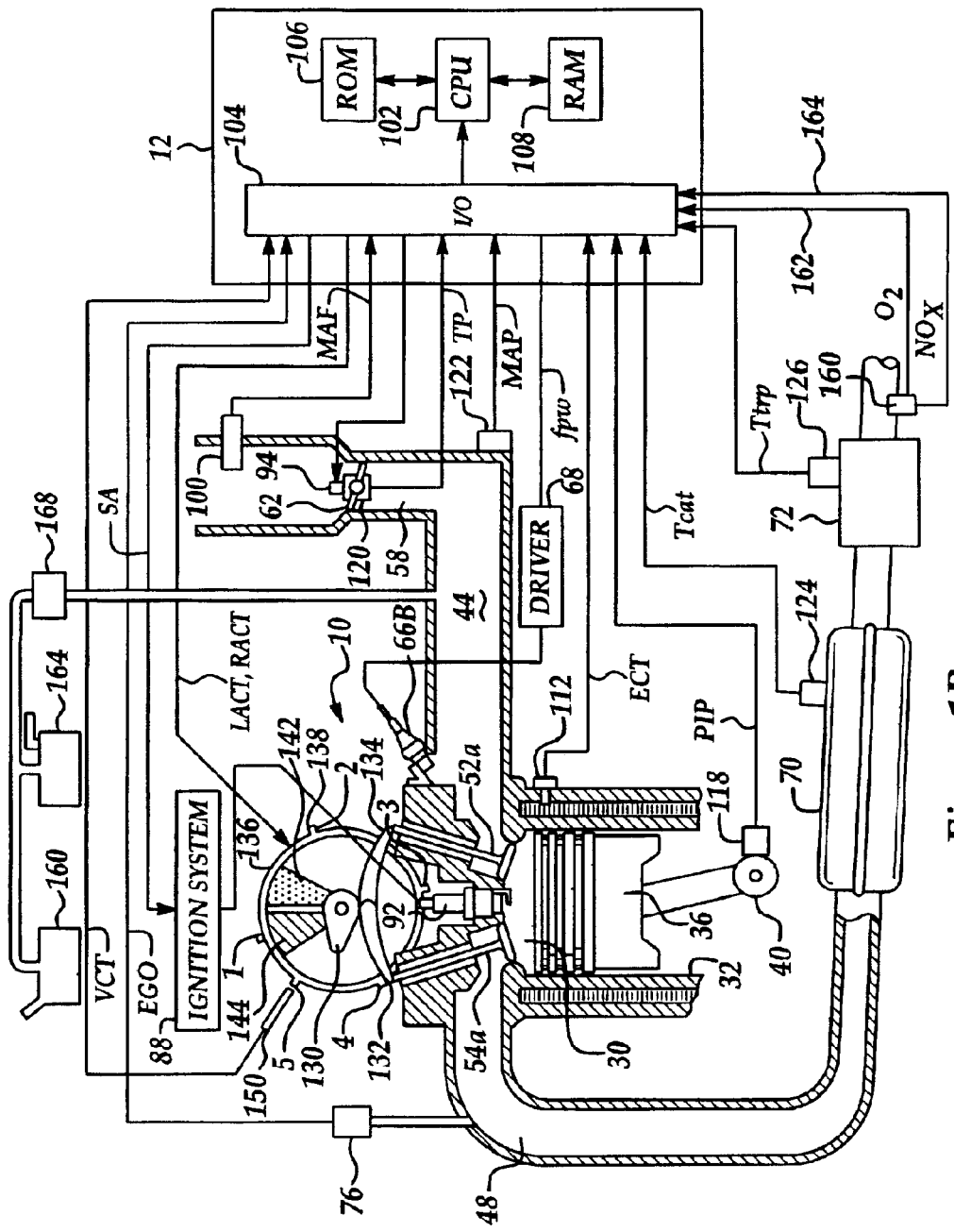

FIGS. 1A and 1B show one cylinder of a multi-cylinder engine, as well as the intake and exhaust path connected to that cylinder. As described later herein with particular reference to FIG. 2, there are various configurations of the cylinders and exhaust system.

Continuing with FIG. 1A, direct injection spark ignited internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) is coupled to crankshaft 40 via a flywheel (not shown). In this particular example, piston 36 includes a recess or bowl (not shown) to help in forming stratified charges of air and fuel. Combustion chamber, or cylinder, 30 is shown communicating with intake manifold 44 and exhaust manifold 48 via respective intake valves 52a and 52b (not shown), and exhaust valves 54a and 54b (not shown). Fuel injector 66A is shown directly coupled to combustion chamber 30 for delivering injected fuel directly therein in proportion to the pulse width of signal fpw received from controller 12 via conventional electronic driver 68. Fuel is delivered to fuel injector 66A by a conventional high-pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70 (note that sensor 76 corresponds to various different sensors, depending on the exhaust configuration. For example, it could correspond to sensor 230, or 234, or 230b, or 230c, or 234c, or 230d, or 234d, as described in later herein with reference to FIG. 2). Sensor 76 (or any of sensors 230, 234, 230b, 230c, 230d, or 234d) may be any of many known sensors for providing an indication of exhaust gas air/fuel ratio such as a linear oxygen sensor, a two-state oxygen sensor, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS is used to advantage during feedback air/fuel control in a conventional manner to maintain average air/fuel at stoichiometry during the stoichiometric homogeneous mode of operation.

Conventional distributorless ignition system 88 provides ignition spark to combustion chamber 30 via spark plug 92 in response to spark advance signal SA from controller 12.

Controller 12 causes combustion chamber 30 to operate in either a homogeneous air/fuel mode or a stratified air/fuel mode by controlling injection timing. In the stratified mode, controller 12 activates fuel injector 66A during the engine compression stroke so that fuel is sprayed directly into the bowl of piston 36. Stratified air/fuel layers are thereby formed. The strata closest to the spark plug contains a stoichiometric mixture, or a mixture slightly rich of stoichiometry, and subsequent strata contain progressively leaner mixtures. During the homogeneous mode, controller 12 activates fuel injector 66A during the intake stroke so that a substantially homogeneous air/fuel mixture is formed when ignition power is supplied to spark plug 92 by ignition system 88. Controller 12 controls the amount of fuel delivered by fuel injector 66A so that the homogeneous air/fuel mixture in chamber 30 can be selected to be at stoichiometry, a value rich of stoichiometry, or a value lean of stoichiometry. The stratified air/fuel mixture will always be at a value lean of stoichiometry, the exact air/fuel being a function of the amount of fuel delivered to combustion chamber 30. An additional split mode of operation wherein additional fuel is injected during the exhaust stroke while operating in the stratified mode is also possible.

Nitrogen oxide (NOx) adsorbent or trap 72 is shown positioned downstream of catalytic converter 70. NOx trap 72 is a three-way catalyst that absorbs NOx when engine 10 is operating lean of stoichiometry. The absorbed NOx is subsequently reacted with HC and CO and catalyzed when controller 12 causes engine 10 to operate in either a rich homogeneous mode or a near stoichiometric homogeneous mode. Such operation occurs during a NOx purge cycle when it is desired to purge stored NOx from NOx trap 72, or during a vapor purge cycle to recover fuel vapors from fuel tank 160 and fuel vapor storage canister 164 via purge control valve 168, or during operating modes requiring more engine power, or during operation modes regulating temperature of the omission control devices such as catalyst 70 or NOx trap 72. (Again, note that emission control devices 70 and 72 can correspond to various devices described in FIG. 2. For example, they can correspond to devices 220 and 224, 220b and 224b, etc.).

Controller 12 is shown in FIG. 1A as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold: During stoichiometric operation, this sensor can give an indication of engine load. Further, this sensor, along with engine speed, can provide an estimate of charge,(including air) inducted into the cylinder. In a preferred aspect of the present invention, sensor 118, which is also used as an engine speed sensor, produces a predetermined number of equally spaced pulses every revolution of the crankshaft.

In this particular example, temperature Tcat of catalytic converter 70 and temperature Ttrp of NOx trap 72 are inferred from engine operation as disclosed in U.S. Pat. No. 5,414,994, the specification of which is incorporated herein by reference. In an alternate embodiment, temperature Tcat is provided by temperature sensor 124 and temperature Ttrp is provided by temperature sensor 126.

Continuing with FIG. 1A, camshaft 130 of engine 10 is shown communicating with rocker arms 132 and 134 for actuating intake valves 52a, 52b and exhaust valve 54a. 54b. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high-pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high-pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing is measured using the method described in U.S. Pat. No. 5,548,995, which is incorporated herein by reference. In general terms, the time or rotation angle between the rising edge of the PIP signal and receiving a signal from one of the plurality of teeth 138 on housing 136 gives a measure of the relative cam timing. For the particular example of a V-8 engine with two cylinder banks and a five-toothed wheel, a measure of cam timing for a particular bank is received four times per revolution, with the extra signal used for cylinder identification.

Sensor 160 provides an indication of both oxygen concentration in the exhaust gas as well as NOx concentration. Signal 162 provides controller a voltage indicative of the O2 concentration while signal 164 provides a voltage indicative of NOx concentration.

As described above, FIG. 1A (and 1B) merely shows one cylinder of a multi-cylinder engine, and that each cylinder has its own set of intake/exhaust valves, fuel injectors, spark plugs, etc.

Referring now to FIG. 1B, a port fuel injection configuration is shown where fuel injector 66B is coupled to intake manifold 44, rather than directly to cylinder 30.

Also, in each embodiment of the present invention, the engine is coupled to a starter motor (not shown) for starting the engine. The starter motor is powered when the driver turns a key in the ignition switch on the steering column, for example. The starter is disengaged after engine start as evidence, for example, by engine 10 reaching a predetermined speed after a predetermined time. Further, in each embodiment, an exhaust gas recirculation (EGR) system routes a desired portion of exhaust gas from exhaust manifold 48 to intake manifold 44 via an EGR valve (not shown). Alternatively, a portion of combustion gases may be retained in the combustion chambers by controlling exhaust valve timing.

The engine 10 operates in various modes, including lean operation, rich operation, and "near stoichiometric" operation. "Near stoichiometric" operation refers to oscillatory operation around the stoichiometric air-fuel ratio. Typically, this oscillatory operation is governed by feedback from exhaust gas oxygen sensors. In this near stoichiometric operating mode, the engine is operated within one air-fuel ratio of the stoichiometric air-fuel ratio.

As described below, feedback air-fuel ratio is used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) is adjusted based on a desired air-fuel ratio and the air-fuel ratio from the sensor. Further still, individual cylinder air-fuel ratio control could be used if desired.

Also note that various methods can be used, according to the present invention, to maintain the desired torque such as, for example, adjusting ignition timing, throttle position, variable cam timing position, and exhaust gas recirculation amount. Further, these variables can be individually adjusted for each cylinder to maintain cylinder balance among all the cylinder groups. Engine torque control is described more specifically herein in FIGS. 3A–C, 4C, and others such as 13J, K.

Referring now to FIGS. 2A–2D, various configurations are described that can be used according to the present invention. In particular, FIG. 2A describes an engine 10 having a first group of cylinders 210 and a second group of cylinders 212. In this particular example, first and second groups 210 and 212 have four combustion chambers each. However, the groups can have different numbers of cylinders, including just a single cylinder. Engine 10 need not be a V-engine, but also may be an in-line engine where the cylinder grouping do not correspond to engine banks. Further, the cylinder groups need not include the same number of cylinders in each group.

First combustion chamber group 210 is coupled to the first catalytic converter 220. Upstream of catalyst 220 and downstream of the first cylinder group 210 is an exhaust gas oxygen sensor 230. Downstream of catalyst 220 is a second exhaust gas sensor 232.

Similarly, second combustion chamber group 212 is coupled to a second catalyst 222. Upstream and downstream are exhaust gas oxygen sensors 234 and 236, respectively. Exhaust gas spilled from the first and second catalyst 220 and 222 merge in a Y-pipe configuration before entering downstream under body catalyst 224. Also, exhaust gas oxygen sensors 238 and 240 are positioned upstream and downstream of catalyst 224, respectively.

In one example embodiment, catalysts 220 and 222 are platinum and rhodium catalysts that retain oxidants when operating lean and release and reduce the, retained oxidants when operating rich. Similarly, downstream underbody catalyst 224 also operates to retain oxidants when operating lean and release and reduce retained oxidants when operating rich. Downstream catalyst 224 is typically a catalyst including a precious metal and alkaline earth and alkaline metal and base metal oxide. In this particular example, downstream catalyst 224 contains platinum and barium. Also, various other emission control devices could be used in the present invention such as catalysts containing palladium or perovskites. Also, exhaust gas oxygen sensors 230 to 240 can be sensors of various types. For example, they can be linear oxygen sensors for providing an indication of air-fuel ratio across a broad range. Also, they can be switching type exhaust gas oxygen sensors that provide a switch in sensor output at the stoichiometric point. Further, the system can provide less than all of sensors 230 to 240, for example, only sensors 230, 234, and 240.

Figure 2A:
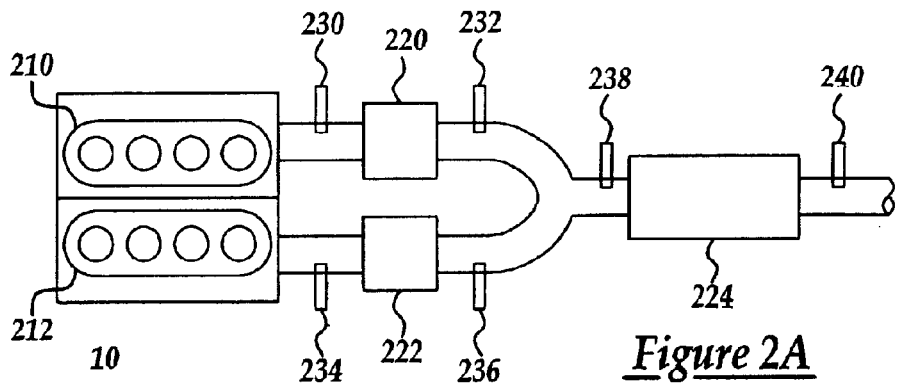
FIGS. 2A–2D show various schematic configurations according to the present invention.

When the system of FIG. 2A is operated in the AIR/LEAN mode, first combustion group 210 is operated without fuel injection and second combustion group 212 is operated at a lean air-fuel ratio (typically leaner than about 18:1). Thus, in this case, and during this operation, sensors 230 and 232 see a substantially infinite air-fuel ratio. Alternatively, sensors 234 and 236 see essentially the air-fuel ratio combusted in the cylinders of group 212 (other than for delays and filtering provided by the storage reduction catalysts 222). Further, sensors 238 and 240 see a mixture of the substantially infinite air-fuel ratio from the first combustion chamber 210 and the lean air-fuel ratio from the second combustion chamber group 212.

As described later herein, diagnosis of sensors 230 and 232 can be performed when operating in the AIR/LEAN mode if the sensors indicate an air-fuel ratio other than lean. Also, diagnostics of catalysts 220 and 222 are disabled when operating in the AIR/LEAN mode in the system of FIG. 2A, since the catalysts do not see a varying air-fuel ratio.

Figure 2B:
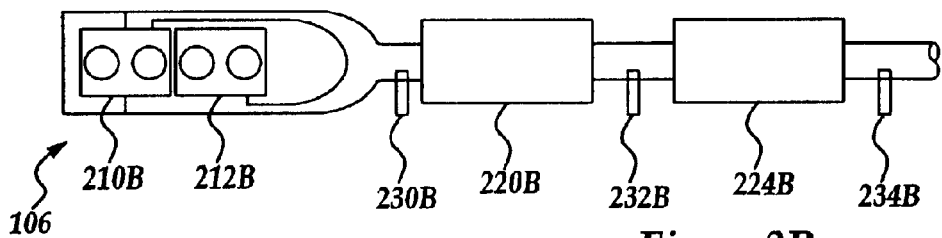

Referring now to FIG. 2B, engine 10B is shown with first and second cylinder groups 210b and 212b. In this example, an inline four-cylinder engine is shown where the combustion chamber groups are equally distributed. However, as described above herein with particular reference to FIG. 2A, the combustion chamber groups do not need to have an equal number of cylinders. In this example, exhaust gases from cylinder groups 210b and 212b merge in the exhaust manifold. Engine 10B is coupled to catalysts 220b. Sensors 230b and 232b are positioned upstream and downstream of the upstream catalyst 220b. Downstream catalyst 224b is coupled to catalyst 222b. In addition, a third exhaust gas oxygen sensor 234b is positioned downstream of catalyst 224b.

With regard to FIG. 2B, when the engine is operating in the AIR/LEAN mode, regardless of which cylinder group is operating lean and which is operating without fuel injection, all of the exhaust gas oxygen sensors and catalysts see a mixture of gases having a substantially infinite air-fuel ratio from group 210B and gases having a lean air-fuel ratio from group 212b.

Figure 2C:
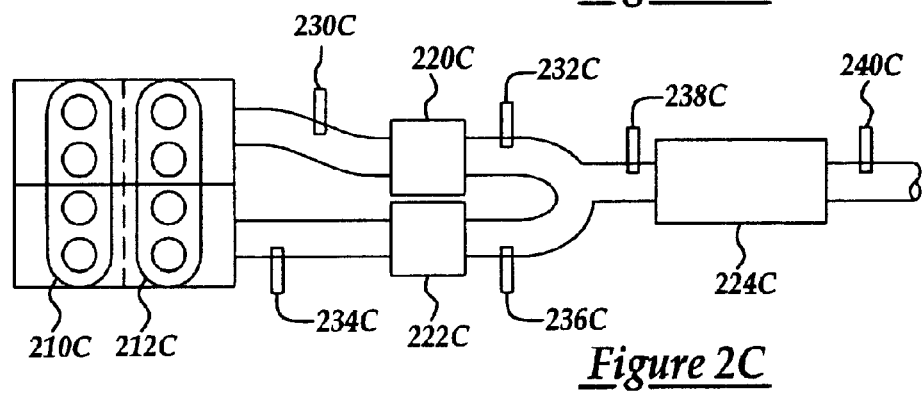

Referring now to FIG. 2C, a system similar to FIG. 2A is shown. However, in FIG. 2C, the cylinder groups 210c and 212c are distributed across engine banks so that each bank has some cylinders in a first group and some cylinders in a second group. Thus, in this example, two cylinders from group 210c and two cylinders from group 212c are coupled to catalysts 220c. Similarly, two cylinders from group 210c and 212c are coupled to catalysts 222c.

In the system of FIG. 2C, when the engine is operating in the AIR/LEAN mode, all of the sensors (230c to 240c) and all of the catalysts (220c to 224c) see a mixture of gases having a substantially infinite air-fuel ratio and gases having a lean air-fuel ratio, as previously described with particular reference to FIG. 2A.

Figure 2D:
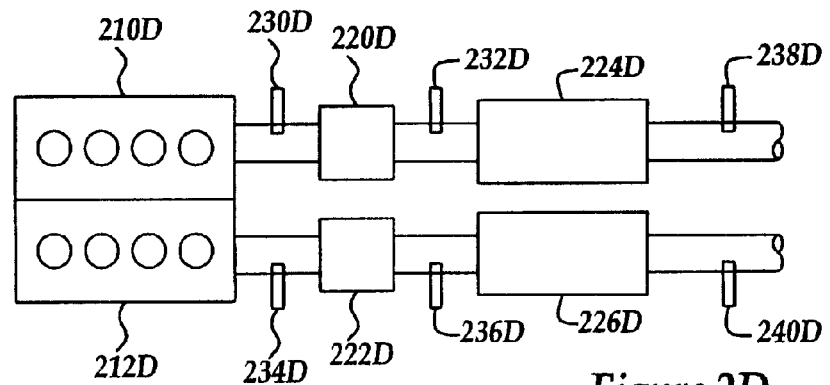

Referring now to FIG. 2D, yet another configuration is described. In this example, the first and second cylinder groups 210d and 212d have completely independent exhaust gas paths. Thus, when the engine is operating in the AIR/ LEAN mode, the cylinder group 210d without injected fuel, sensors 230d, 232d, and 238d all see a gas with substantially infinitely lean air-fuel ratio. Alternatively, sensors 234d, 236d, and 240d see a lean exhaust gas mixture (other than delay and filtering effects of catalysts 222d and 226d).

In general, the system of FIG. 2C is selected for a V-8 engine, where one bank of the V is coupled to catalyst 220c and the other bank is coupled to catalyst 222c, with the first and second cylinder groups being indicated by 210c and 212c. However, with a V-10 engine, typically the configuration of FIG. 2A or 2D is selected.

Referring now to FIGS. 2E–2H, various fuel delivery and air/fuel modes of operation are described. These modes of operation include feedback correction to the fuel delivered in response to one or more exhaust gas oxygen sensors coupled to the exhaust of engine 10. These modes also include various adaptive learning modes including adaptively learning errors caused by either inducting air or delivering fuel into engine 10; adaptively learning fuel vapor concentration of fuel vapors inducted into engine 10; and adaptively learning the fuel mixture of a multi-fuel engine such as an engine adapted to operate on a blend of fuel and alcohol.

Figure 2E:
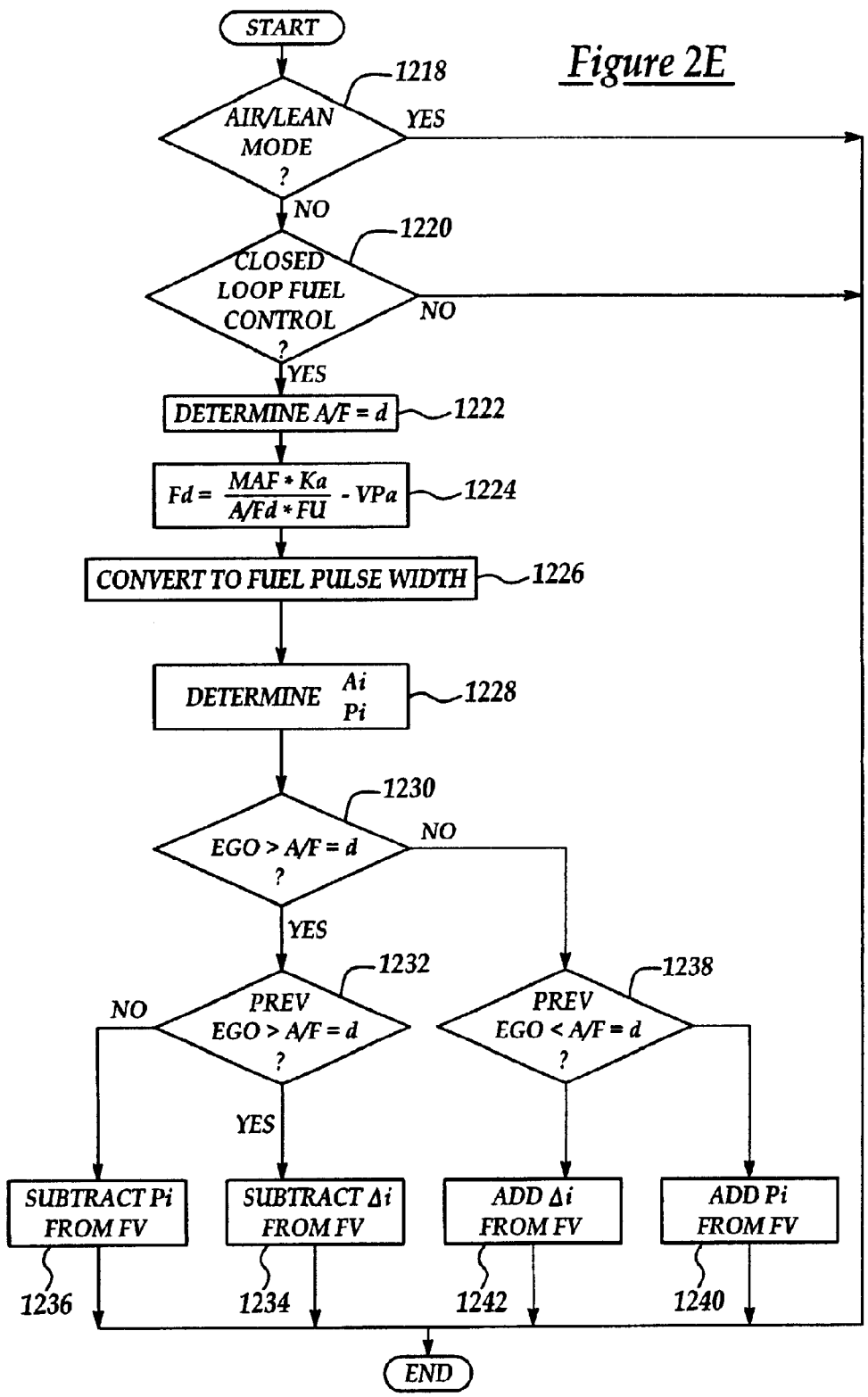
FIGS. 2E–2H show various flow charts relating to fuel delivery and adaptive learning.

Referring now to FIG. 2E, closed loop, or feedback, fuel control is enabled in block 1220 when certain engine operating conditions are met such as sufficient engine operating temperature. First, the operation described in FIG. 2E proceeds, if not in the AIR/LEAN mode (block 1218). If in the AIR/LEAN mode, air/fuel control is provided in FIG. 5. When not in AIR/LEAN mode and when in closed loop fuel control, the desired air-fuel ratio (A/Fd) is first determined in step 1222. Desired A/Fd may be a stoichiometric air-fuel mixture to achieve low emissions by operating essentially within the peak efficiency window of a three-way catalyst. Desired A/Fd also may be an overall air-fuel mixture lean of stoichiometry to achieve improved fuel economy, and desired A/Fd may be rich of stoichiometry when either acceleration is required or faster catalyst warm up is desired.

In block 1224, desired fuel Fd is generated from the following equation:

$$Fd = \frac{MAF \cdot Ka}{A/Fd \cdot FV}$$

where:
MAF is an indication of the mass airflow inducted into engine 10 which may be derived from either a mass airflow meter, or from a commonly known speed density calculation responsive to an indication of intake manifold pressure;

Ka is an adaptively learned term to correct for long term errors in the actual air-fuel ratio such as may be caused by a faulty mass airflow meter, an inaccurate fuel injector, or any other cause for error in either airflow inducted into engine 10 or fuel injected into engine 10, regeneration of Ka is described in greater detail later herein with particular reference to FIG. 2F;

FV is a feedback variable derived from one or more exhaust gas oxygen sensors, its generation is described in more detail later herein with particular reference to FIG. 2E;

VPa is an adaptively learned correction to compensate for fuel vapors inducted into engine 10, its generation is described in greater detail later herein with particular reference to FIG. 2G.

Desired fuel quantity Fd is then converted to a desired fuel pulse width in block 1226 for driving those fuel injectors enabled to deliver fuel to engine 10.

Steps 1228–1240 of FIG. 2E describe in general a proportional plus integral feedback controller for generating feedback variable FV in response to one or more exhaust gas sensors. Integral term Δi and proportional term Pi are determined in step 1228. Although only one integral and one proportional term are shown herein, different terms may be used when making corrections in the lean direction than those terms used when making corrections in the rich direction so as to provide an overall air-fuel bias. In step 1230, an overall output of the exhaust gas oxygen sensor designated as EGO is read and compared with desired A/Fd. Signal EGO may be a simple two state representation of either a lean air-fuel mixture or a rich air-fuel mixture. Signal EGO may also be a representation of the actual air-fuel mixture in engine 10. Further, signal EGO may be responsive to only to one exhaust gas oxygen sensor positioned upstream of the three-way catalytic converters. And, signal EGO may be responsive to both exhaust gas oxygen sensors positioned upstream and downstream of the three-way catalytic converter.

When signal EGO is greater than desired A/Fd (block 1230), and it was also greater than A/Fd during the previous sample, (Block 1232), feedback variable FV is decremented by integral value Δi (block 234). Stated another way, when the exhaust gases are indicated as being lean, and were also lean during the previous sample period, signal FV is decremented to provide a rich correction to the delivered fuel. Conversely, when signal EGO is greater than desired A/Fd (block 1230), but was not greater than A/Fd (block 1232) during the previous sample, proportional term Pi is subtracted from feedback variable FV (block 1236). That is, when exhaust gases change from rich to lean, a rapid rich correction is made by decrementing proportional value Pi from feedback variable FV.

On the other hand, when signal EGO is less than A/Fd (block 1230), indicating exhaust gases are rich, and the exhaust gases were rich during the previous sample period (block 1238), integral term Δi is added to feedback variable FV (block 1242). However, when exhaust gases are rich (block 1230), but were previously lean (block 1238), proportional term Pi is added to feedback variable FV (block 1240).

It is noted that in this particular example, feedback variable FV occurs in the denominator of the fuel delivery equation (block 1224). Accordingly, a lean air-fuel correction is made when feedback variable FV is greater than unity, and a rich correction is made when signal FV is less than unity. In other examples, a feedback variable may occur in the numerator so that opposite corrections would be made.

Note that various other air-fuel feedback control methods can be used, such as state-space control, nonlinear control, or others.

Figure 2F:
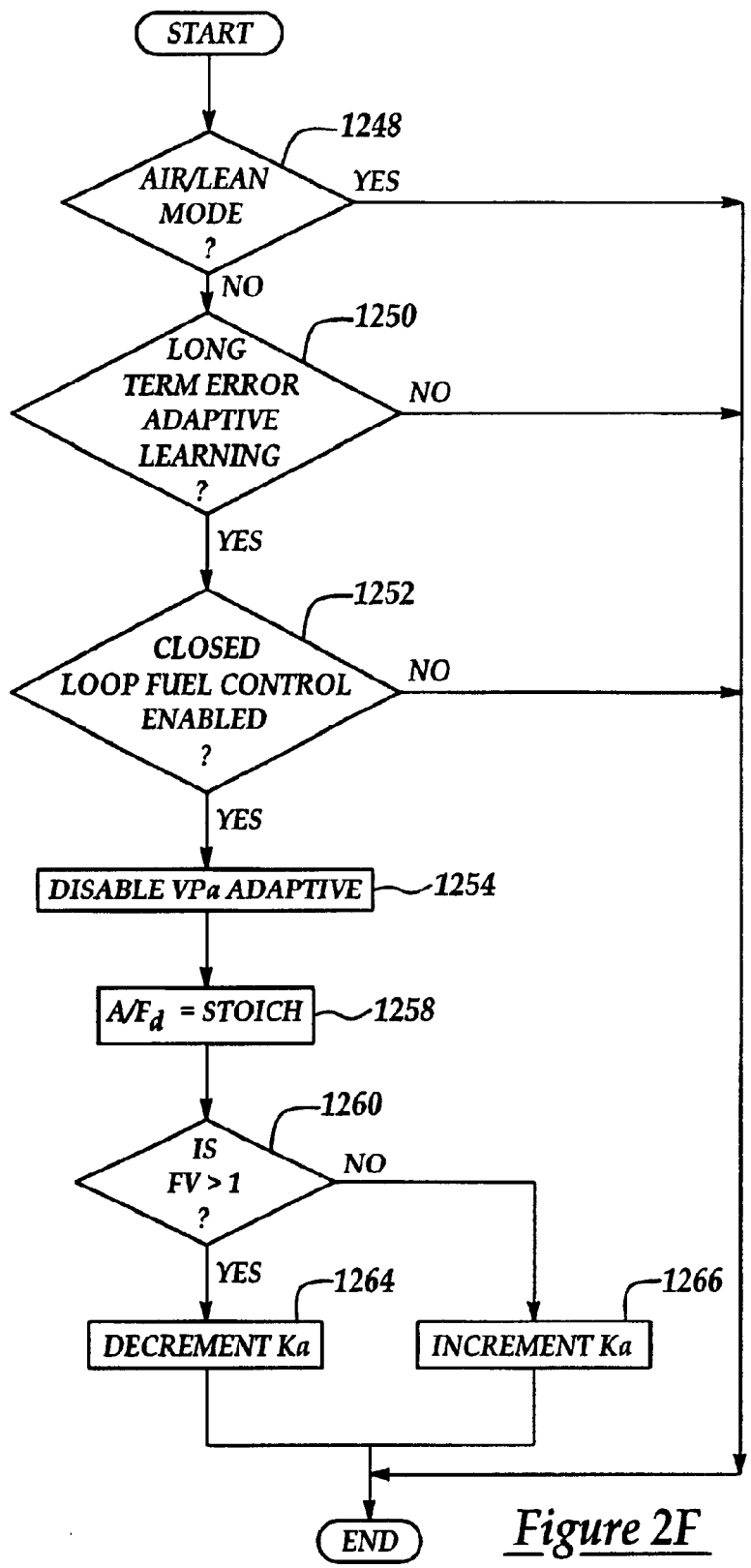

Referring now to FIG. 2F, a routine for adaptively learning a correction value for air-fuel ratio errors caused by degraded components, such as faulty airflow meters or faulty fuel injectors, is now described. After it is determined that operation is not in the AIR/LEAN Mode (block 248), and adaptive learning of long-term air-fuel errors is desired (block 1250), and closed loop fuel control is enabled (block 1252), adaptive learning of fuel vapor concentration is disabled in block 1254. The desired air-fuel ratio A/Fd is then set to the stoichiometric value in block 1258. When feedback value FV is greater than unity (block 1260), or other indications are given that a lean fuel correction is desired because engine 10 is operating too rich, adaptive term Ka is decremented in block 1264. That is, a lean correction to delivered fuel (see block 1224 of FIG. 2E) is provided when it is apparent that engine 10 is operating too rich and feedback air-fuel control FV is continuously providing lean corrections. On the other hand, when feedback control is indicating that rich fuel corrections are being provided (block 1260), adaptive term Ka is incremented in block 266. That is, when feedback control is continuously providing rich corrections, adaptive term Ka is incremented to provide those rich corrections.

Figure 2G:
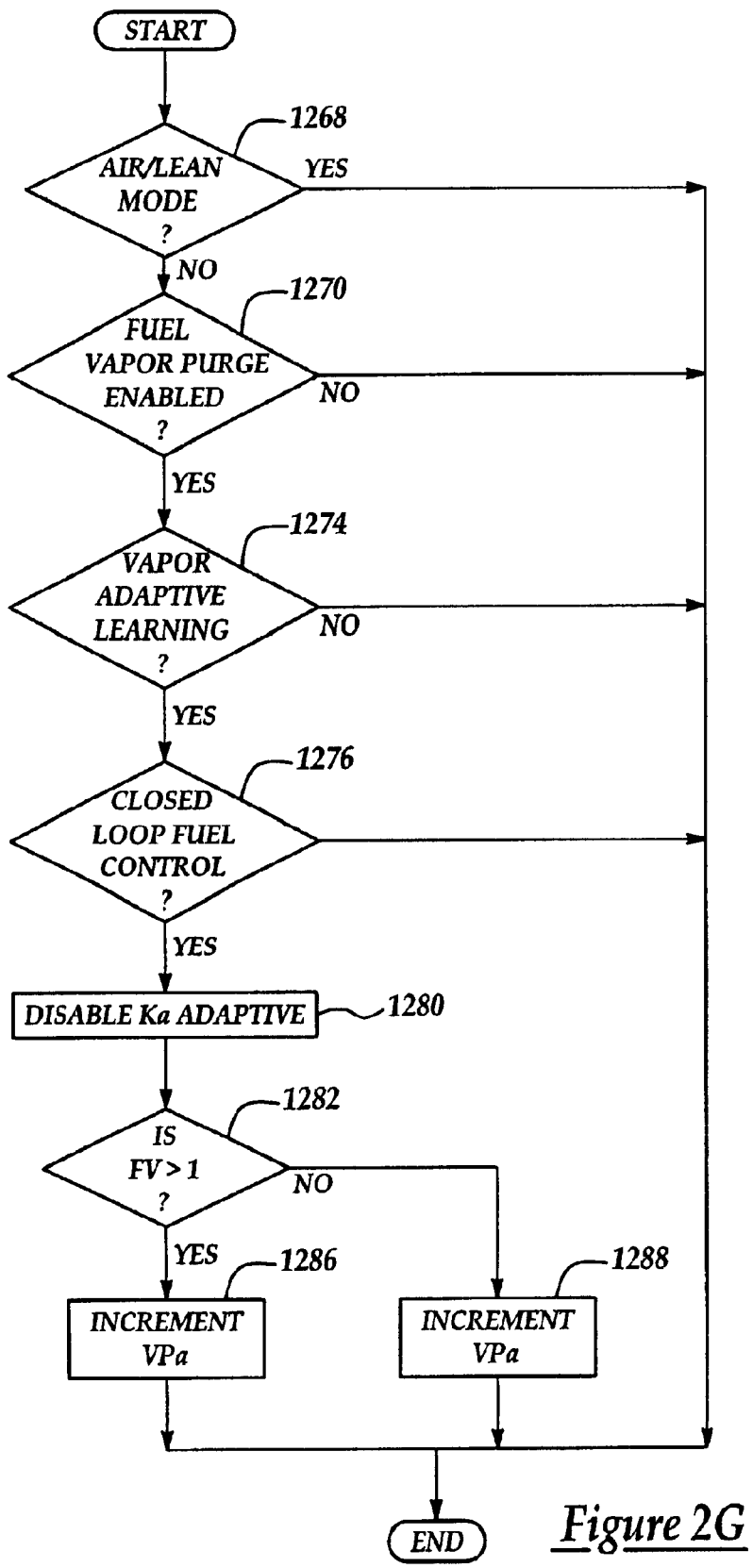

Referring now to FIG. 2G, adaptive learning of the concentration of fuel vapors inducted into engine 10 is now described. As discussed previously herein, fuel vapors are inducted from fuel tank 160 and fuel vapor storage canister 164 into intake manifold 44 via vapor purge control valve 168. In this description, the generation of adaptive correction value VPa is provided for correcting delivered fuel to compensate for fuel vapors being inducted into engine 10. Fuel vapor purge is enabled, for example, when an indication of ambient temperature exceeds a threshold, or a period of engine operation has elapsed without purging, or engine temperature exceeds a threshold, or engine operation has switched to a stoichiometric, rich or homogenous air/fuel mode.

When not in the AIR/LEAN mode (block 1268), and when fuel vapor purge is enabled (block 1270), and adaptive learning of fuel vapor concentration is also enabled (block 1274), and closed loop fuel control is enabled (block 1276), adaptive learning of air-fuel errors provided by adaptive term Ka is disabled (block 1280).

At block 1282, signal FV is compared to unity to determine whether lean or rich air-fuel rich corrections are being made. In this particular example, closed loop fuel control about a stoichiometric air-fuel ratio is utilized to generate feedback variable FV. The inventor recognizes, however, that any feedback control system may be utilized at any air-fuel ratio to determine whether lean or rich air-fuel corrections are being made in response to the induction of fuel vapors into engine 10. Continuing with this particular example, when feedback variable FV is greater than unity (block 1282), indicating that lean air-fuel corrections are being made, vapor adaptive term VPa is incremented in block 1286. On the other hand, when feedback variable FV is less than unity, indicating that rich air-fuel corrections are being made, adaptively learned vapor concentration term VPa is decremented in block 1290.

In accordance with the above described operation with reference to FIG. 2G, adaptive term VPa adaptively learns the vapor concentration of inducted fuel vapors and this adaptive term is used to correct delivered fuel in, for example, block 1224 of FIG. 2E.

Figure 2H:
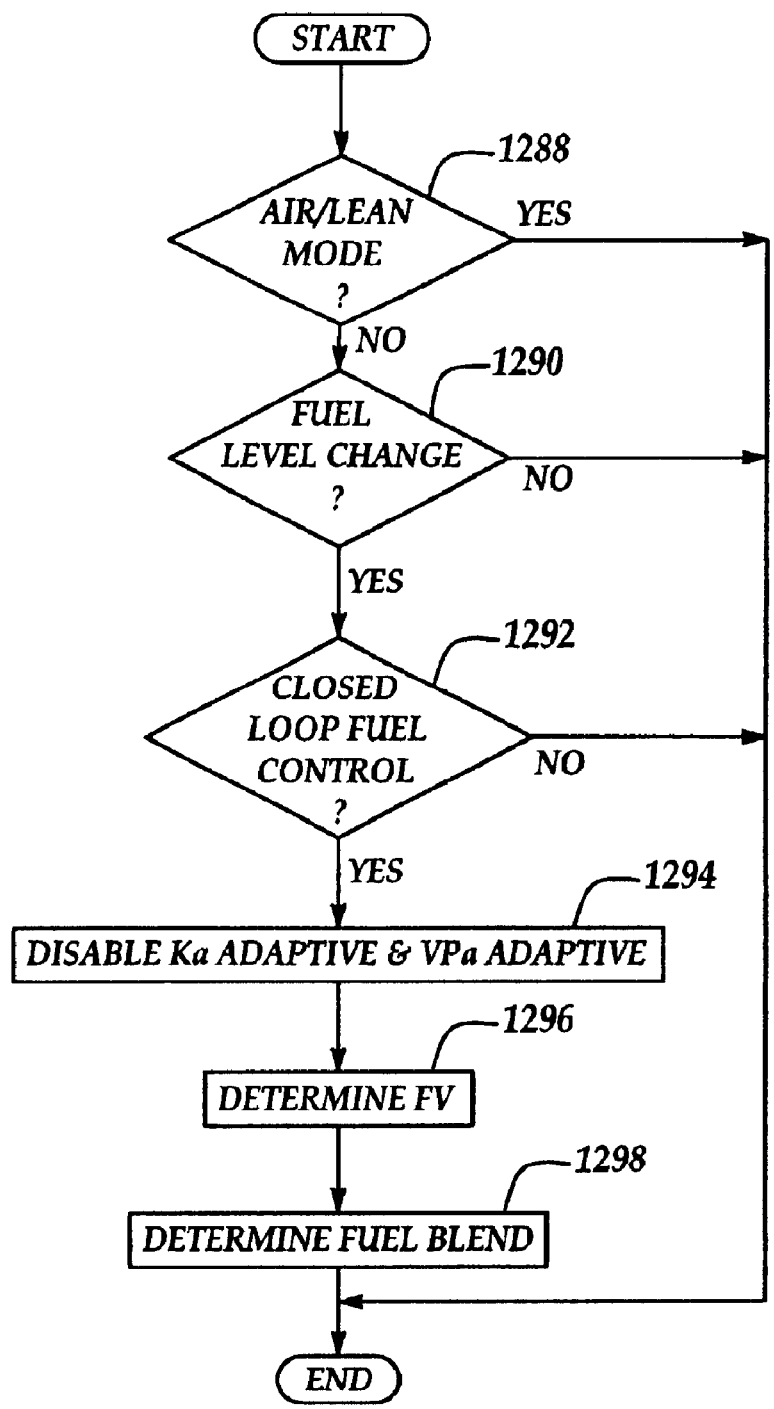

Referring now to FIG. 2H, a description of adaptively learning the fuel blend mixture is now provided. For example, engine 10 may operate on an unknown mixture of gasoline and an alcohol such as methanol. The adaptive learning routine that will now be described provides an indication of the actual fuel blend being used. Again, this adaptive learning is responsive to one or more exhaust gas oxygen sensors.

When not in the AIR/LEAN mode, and when the fuel level of fuel tank has changed (block 1290), and engine 10 is operating in closed loop fuel control mode (block 1292), adaptive learning of air-fuel error by adaptive term Ka, and adaptive learning of fuel vapor concentration by adaptive term VPa is disabled in block 1294. Feedback variable FV is determined in block 1296 as previously described with particular reference to FIG. 2E. In response to feedback variable FV, the overall engine air-fuel ratio is determined and, accordingly, the fuel blend mixture is inferred (block 1298). Stated another way, the stoichiometric air-fuel mixture of any fuel blend is known. And, it is also known that feedback variable FV provides an indication of engine air-fuel ratio. For example, feedback variable FV provides an indication of a stoichiometric air-fuel ratio for pure gasoline when FV is equal to unity. When FV is equal to 1.1, for example, the overall engine air-fuel ratio would be 10% leaner than the stoichiometric air-fuel ratio for gasoline. Accordingly, the fuel blend is easily inferred from feedback variable FV in block 298.

Figure 3A:
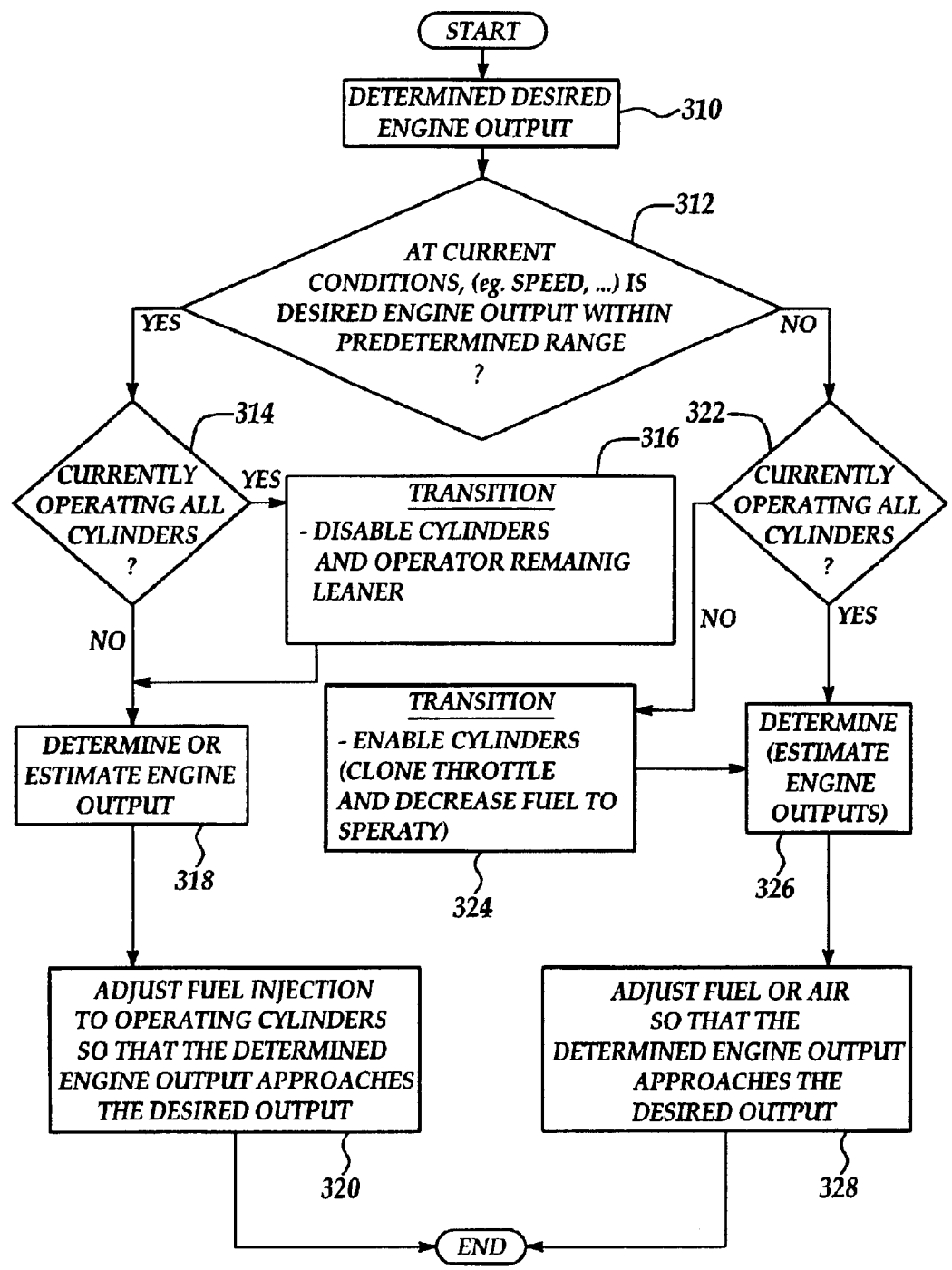
FIG. 3A shows a high level flow chart for determining and transitioning between engine operating modes.

Referring now to FIG. 3A, a routine is described for controlling engine output and transitioning between engine operating modes. First, in step 310, the routine determines a desired engine output. In this particular example, the desired engine output is a desired engine brake torque. Note that there are various methods for determining the desired engine output torque, such as based on a desired wheel torque and gear ratio, based on a pedal position and engine speed, based on a pedal position and vehicle speed and gear ratio, or various other methods. Also note that various other desired engine output values could be used other than engine torque, such as engine power or engine acceleration.

Next, in step 312, the routine makes a determination as to whether at the current conditions the desired engine output is within a predetermined range. In this particular example, the routine determines whether the desired engine output is less than a predetermined engine output torque and whether current engine speed is within a predetermined speed range. Note that various other conditions can be used in this determination, such as engine temperature, catalyst temperature, transition mode, transition gear ratio, and others. In other words, the routine determines in step 312 which engine-operating mode is desired based on the desired engine output and current operating conditions. For example, there may be conditions where based on a desired engine output torque and engine speed, it is possible to operate with less than all the cylinders firing, however, due to other needs such as purging fuel vapors or providing manifold vacuum, it is desired to operate with all cylinders firing. In other words, if manifold vacuum falls below a predetermined value, the engine is transitioned to operating with all cylinders combusting injected fuel. Alternatively, the transition can be called if pressure in the brake booster is below a predetermined value.

On the other hand, operation in the AIR/LEAN mode is permitted during fuel vapor purge if temperature of the catalyst is sufficient to oxidize the purged vapors which will pass through the non-combusting cylinders.

Continuing with FIG. 3A, when the answer to step 312 is yes, the routine determines in step 314 as to whether all cylinders are currently operating. When answer to step 314 is yes, a transition is scheduled to transition from firing all cylinders to disabling some cylinders and operating the remaining cylinders at a leaner air-fuel ratio than when all the cylinders were firing. The number of cylinders disabled is based on the desired engine output. The transition of step 316, in one example, opens the throttle valve and increases fuel to the firing cylinders while disabling fuel to some of the cylinders. Thus, the engine transitions from performing combustion in all of the cylinders to operating in the hereinafter referred to AIR/LEAN MODE. In other words, to provide a smooth transition in engine torque, the fuel to the remaining cylinders is rapidly increased while at the same time the throttle valve is opened. In this way, it is possible to operate with some cylinders performing combustion at an air/fuel ratio leaner than if all of the cylinders were firing. Further, those remaining cylinders performing combustion operate at a higher engine load per cylinder than if all the cylinders were firing. In this way, a greater air-fuel lean limit is provided thus allowing the engine to operate leaner and obtain additional fuel economy.

Next, in step 318, the routine determines an estimate of actual engine output based on the number of cylinders combusting air and fuel. In this particular example, the routine determines an estimate of engine output torque. This estimate is based on various parameters, such as engine speed, engine airflow, engine fuel injection amount, ignition timing and engine temperature.

Next, in step 320, the routine adjusts the fuel injection amount to the operating cylinders so that the determined engine output approaches the desired engine output. In other words, feedback control of engine output torque is provided by adjusting the fuel injection amount to the subset of cylinders that are carrying out combustion.

In this way, according to the present invention, it is possible to provide rapid torque control by changing fuel injection amount during lean combustion of less than all of the engine cylinders. The firing cylinders thereby operate at a higher load per cylinder resulting in an increased air-fuel operating range. Additional air is added to the cylinders so that the engine can operate at this higher air-fuel ratio thereby providing improved thermal efficiency. As an added effect, the opening of the throttle to provide the additional air reduces engine pumping work, further providing an increase in fuel economy. As such, engine efficiency and fuel economy can be significantly improved according to the present invention.

Returning to step 312 when the answer is no, the routine continues to step 322 where a determination is made as to whether all cylinders are currently firing. When the answer to step 322 is no, the routine continues to step 324 where a transition is made from operating some of the cylinders to operating all of the cylinders. In particular, the throttle valve is closed and fuel injection to the already firing cylinders is decreased at the same time as fuel is added to the cylinders that were previously not combusting in air-fuel mixture. Then, in step 326, the routine determines an estimate of engine output in a fashion similar to step 318. However, in step 326, the routine presumes that all cylinders are producing engine torque rather than in step 318 where the routine discounted the engine output based on the number of cylinders not producing engine output.

Finally, in step 328, the routine adjusts at least one of the fuel injection amount or the air to all the cylinders so that the determined engine output approaches a desired engine output. For example, when operating at stoichiometry, the routine can adjust the electronic throttle to control engine torque, and the fuel injection amount is adjusted to maintain the average air-fuel ratio at the desired stoichiometric value. Alternatively, if all the cylinders are operating lean of stoichiometry, the fuel injection amount to the cylinders can be adjusted to control engine torque while the throttle can be adjusted to control engine airflow and thus the air-fuel ratio to a desired lean air-fuel ratio. During rich operation of all the cylinders, the throttle is adjusted to control engine output torque and the fuel injection amount can be adjusted to control the rich air-fuel ratio to the desired air-fuel ratio.

FIG. 3A shows one example of engine mode scheduling and control. Various others can be used as is now described.

Figure 3B:
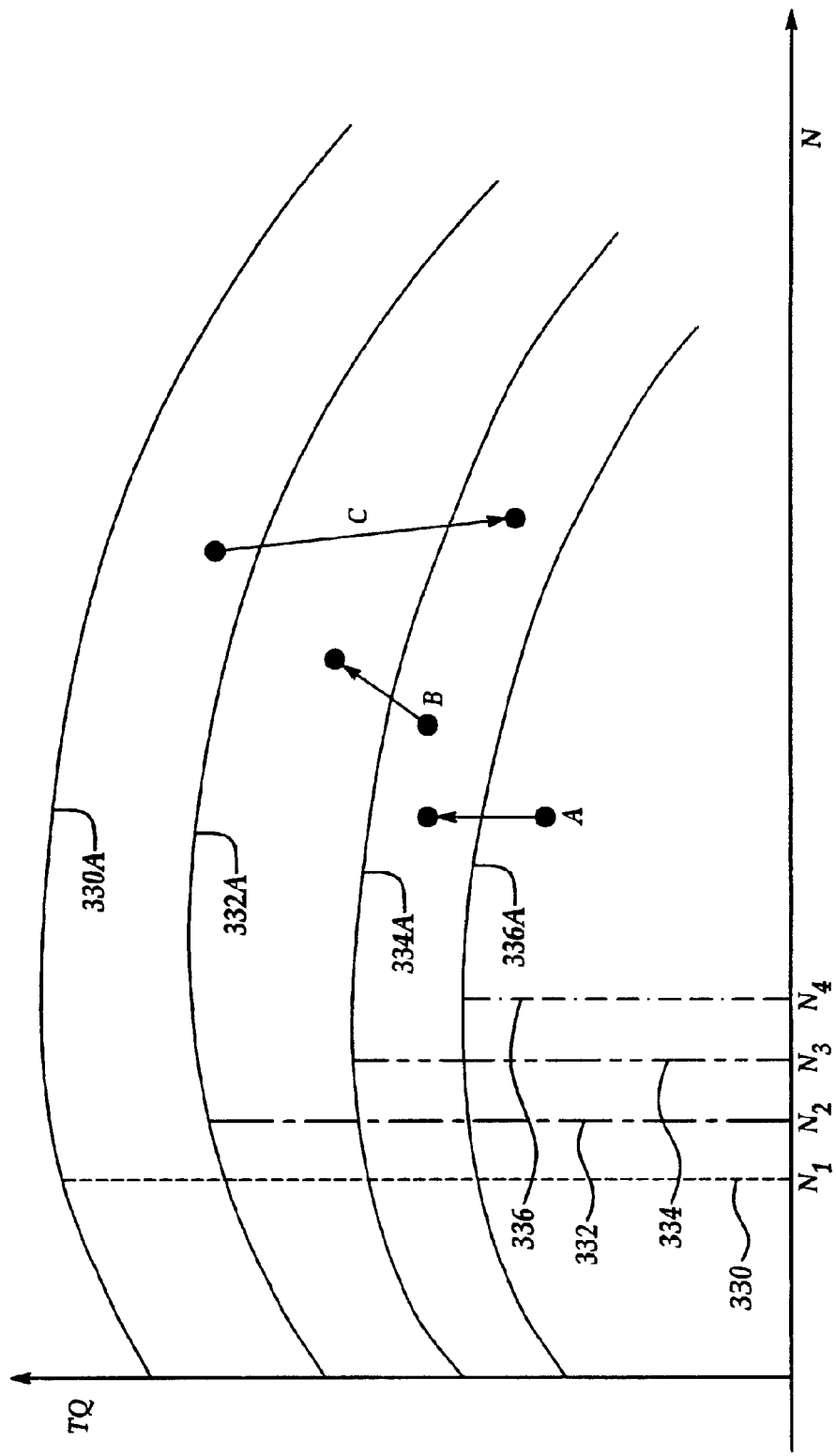
FIG. 3B is a graph representing different engine operating modes at different speed torque regions.

In particular, referring now to FIG. 3B, a graph is shown illustrating engine output versus engine speed. In this particular description, engine output is indicated by engine torque, but various other parameters could be used such as, for example, wheel torque, engine power, engine load, or others. The graph shows the maximum available torque that can be produced in each of four operating modes. Note that a percentage of available torque, or other suitable parameters, could be used in place of maximum available torque. The four operating modes in this embodiment include:

Operating some cylinders lean of stoichiometry and remaining cylinders with air pumping through and substantially no injected fuel (note: the throttle can be substantially open during this mode), illustrated as line 33ba in the example presented in FIG. 3B;

Operating some cylinders at stoichiometry, and the remaining cylinders pumping air with substantially no injected fuel (note: the throttle can be substantially open during this mode), shown as line 334a in the example presented in FIG. 3B;

Operating all cylinders lean of stoichiometry (note: the throttle can be substantially open during this mode, shown as line 332a in the example presented in FIG. 3B;

Operating all cylinders substantially at stoichiometry for maximum available engine torque, shown as line 330a in the example presented in FIG. 3B.

Described above is one exemplary embodiment according to the present invention where an 8-cylinder engine is used and the cylinder groups are broken into two equal groups. However, various other configurations can be used according to the present invention. In particular, engines of various cylinder numbers can be used, and the cylinder groups can be broken down into unequal groups as well as further broken down to allow for additional operating modes. For the example presented in FIG. 3B in which a V-8 engine is used, lines 336a shows operation with 4 cylinders operating with air and substantially no fuel, lines 334a shows operation with four cylinders operating at stoichiometry and four cylinders operating with air, line 332a shows 8 cylinders operating lean, and line 33a shows 8 cylinders operating at stoichiometry.

The above described graph illustrates the range of available torques in each of the described modes. In particular, for any of the described modes, the available engine output torque is any torque less than the maximum amount illustrated by the graph. Also note that in any mode where the overall mixture air-fuel ratio is lean of stoichiometry, the engine can periodically switch to operating all of the cylinders stoichiometric or rich. This is done to reduce the stored oxidants (e.g., NOx) in the emission control device(s). For example, this transition can be triggered based on the amount of stored NOx in the emission control device(s), or the amount of NOx exiting the emission control device(s), or the amount of NOx in the tailpipe per distance traveled (mile) of the vehicle.

To illustrate operation among these various modes, several examples of operation are described. The following are simply exemplary descriptions of many that can be made, and are not the only modes of operation according to the present invention. As a first example, consider operation of the engine along trajectory A. In this case, the engine initially is operating with four cylinders lean of stoichiometry, and four cylinders pumping air with substantially no injected fuel. Then, in response to: operating conditions, it is desired to change engine operation along trajectory A. In this case, it is desired to change engine operation to operating with four cylinders operating at substantially stoichiometric combustion, and four cylinders pumping air with substantially no injected fuel. In this case, additional fuel is added to the combusting cylinders to decrease air-fuel ratio toward stoichiometry, and correspondingly increase engine torque.

As a second example, consider trajectory labeled B. In this case, the engine begins by operating with four cylinders combusting at substantially stoichiometry, and the remaining four cylinders pumping air with substantially no injected fuel. Then, in response to operating conditions, engine speed changes and is desired to increase engine torque. In response to this, all cylinders are enabled to combust air and fuel at a lean air-fuel ratio. In this way, it is possible to increase engine output, while providing lean operation.

As a third example, consider the trajectory labeled C. In this example, the engine is operating with all cylinders combusting at substantially stoichiometry. In response to a decrease in desired engine torque, four cylinders are disabled to provide the engine output.

Continuing with FIG. 3B, and lines 330–336 in particular, an illustration of the engine output, or torque, operation for each of the four exemplary modes is now described. For example, at engine speed Ni, line 330 shows the available engine output or torque output that is available when operating in the 8-cylinder stoichiometric mode. As another example, line 332 indicates the available engine output or torque output available when operating in the 8-cylinder lean mode at engine speed N2. When operating in the 4-cylinder stoichiometric and 4-cylinder air mode, line 334 shows the available engine output or torque output available when operating at engine speed N3. And, finally, when operating in the 4-cylinder lean, 4-cylinder air mode, line 336 indicates the available engine or torque output when operating at engine speed N4.

Figure 3C:
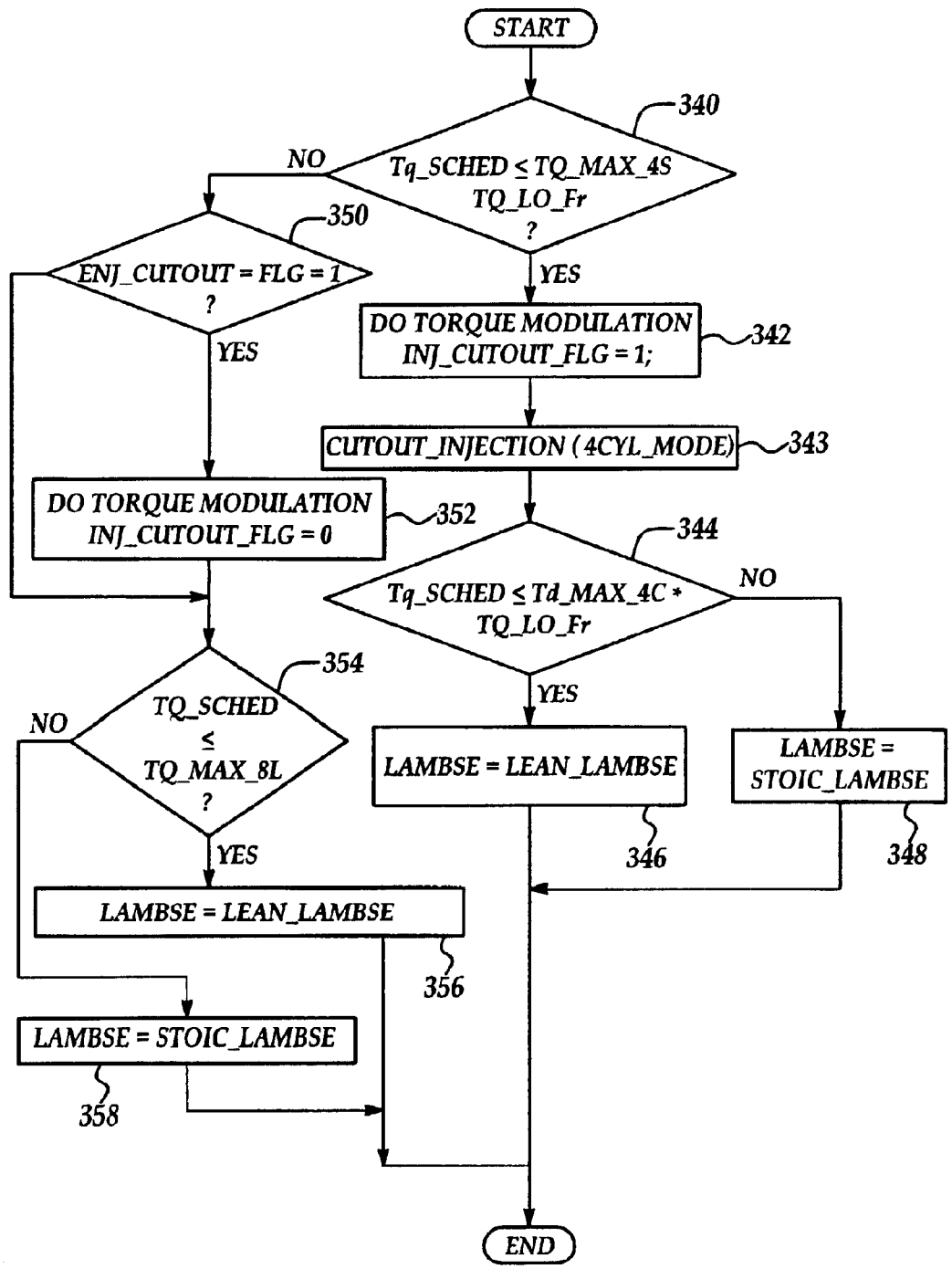
FIG. 3C shows a high level flow chart for scheduling air-fuel ratio.

Referring now to FIG. 3C, an alternative routine to FIG. 3A is described for selecting the engine mode. In this particular example, the routine refers to selecting between 4-cylinder and 8-cylinder combustion, and between lean and stoichiometric combustion. However, the routine can be easily adjusted for various other combinations and numbers of cylinders. Continuing with FIG. 3C, in step 340, the routine determines whether the scheduled/requested torque (TQ_SCHED) is less than the available torque in the 4-cylinder stoichiometric mode where four cylinders are combusting at substantially stoichiometry, and the remaining four cylinders are pumping air with substantially no injected fuel. Note that engine torque is utilized as just one example according to the present invention. Various other methods could be used such as comparing wheel torque, engine power, wheel power, load, or various others. Further, an adjustment factor (TQ_LO_FR) is used to adjust the maximum available torque in the 4-cylinder stoichiometric mode to leave extra control authority.

When the answer to step 340 is yes, the routine continues to step 342 where torque modulation is requested by setting the flag (INJ_CUTOUT_FLG) is set to 1. In other words, when the answer to step 340 is yes, the routine determines that the desired mode is to have four cylinders combusting and four cylinders flowing air with substantially no injected fuel. Further, in step 342, the routine calls for the transition routine (see FIG. 3D). Next in step 343, the injectors are cut out in four of the cylinders. Then, in step 344, the routine determines whether the requested torque is less than the maximum available torque that can be provided in the mode where four cylinders are operated lean of stoichiometry, and four cylinders flow air with substantially no injected fuel. In other words, the parameter TQ_SCHED is compared to parameter (TQ_MAX_4L×TQ_LO_FR). When the answer to step 344 is yes, this indicates that lean operation is available and the routine continues to step 346. In step 346, the desired air-fuel ratio (LAMBSE, which also corresponds to A/Fd) is set to a lean air-fuel ratio determined based on engine speed and engine load (LEAN_LAMBSE).

When the answer to step 344 is no, the routine continues to step 348 where the desired air-fuel ratio is set to a stoichiometric value. Thus, according to this example embodiment of the present invention, it is possible to select between the four-cylinder lean and the four-cylinder stoichiometric mode when it is possible to operate in a four-cylinder mode.

When the answer to step 340 is no, the routine continues to step 350. In step 350, the routine determines whether the flag (INJ_CUTOUT_FLG) is equal to 1. In other words, when the current conditions indicate that the engine is operating in the four-cylinder mode, the answer to step 350 is yes. When the answer to step 350 is yes, the routine calls a transition routine described later in FIG. 3E and sets the flag to 0. Then, the routine continues to step 354 where the routine determines whether the requested torque is less than the maximum available torque in the 8-cylinder lean mode (TQ_MAX_8L). When the answer to step 354 is yes, the routine continues to step 356. In other words, when it is possible to meet the current engine torque request in 8-cylinder lean mode, then the desired air-fuel ratio (LAMBSE) is set to a desired lean air-fuel ratio based on engine speed and load in step 356.

Continuing with FIG. 3C, when the answer to step 354 is no, then the engine is operated in the 8-cylinder stoichiometric mode, and the desired engine air-fuel ratio (LAMBSE) is set to a stoichiometric value is step 358.

Referring now to FIG. 3D(1), an example of engine operation in transitioning from an 8-cylinder mode to a 4-cylinder mode is described. The graph 3D(1)a illustrates the timing of the change in the cylinder mode from eight cylinders to four cylinders. Graph 3D(1)b illustrates the change in throttle position. Graph 3D(1)e illustrates the change in ignition timing (spark retard). Graph 3D(1)2 illustrates engine torque. In this example, the graphs show how, as throttle position is gradually increased, ignition timing is retarded in an amount so that engine torque stays substantially constant. While the graph illustrates straight lines, this is an idealized version of actual engine operation, which of course, will show some variation. Also note that the throttle position and ignition timing movements described previously occur before the transition. Once the throttle position and ignition timing reach predetermined values, the cylinder mode is changed and at this point, ignition timing is returned to optimal (MBT) timing. In this way, the engine cylinder mode transition is achieved with substantially no effect on engine torque variation.

Referring now to FIG. 3D(2), a routine is described for transitioning from 8-cylinder mode to 4-cylinder mode. In step 360, the routine determines whether the engine is currently operating in the 8-cylinder mode. When the answer to step 360 is yes, the routine continues to step 362. In step 362, the routine determines whether conditions indicate the availability of four-cylinder operation as described previously herein in particular reference to FIG. 3C. While the answer to step 362 is yes, the routine increments a timer (IC_ENA_TMR). Then, in step 366, the routine determines whether the timer is less than a preselected time (IC_ENA_TIM). This time can be adjusted to different predetermined times based on engine operating conditions. In one particular example, the time can be set to a constant value of one second. Alternatively, the time can be adjusted depending on whether the driver is tipping in or tipping out.

Continuing with FIG. 3D(2), when the answer to step 366 is yes, the routine continues to step 368. In step 368, the routine calculates a torque ratio (TQ_ratio), spark_retard, and relative throttle position (TP_REL). In particular, a torque ratio is calculated based on the number of cylinders being disabled (in this case four) to the total number of cylinders (in this case eight), and the current timer value and timer limit value (IC_ENA_TIM). Further, the spark retard is calculated as a function of the torque ratio. Finally, the relative throttle position is calculated as a function of the torque ratio. Alternatively, when the answer to step 366 is no, the routine continues to step 370. In step 370, the routine operates in the four-cylinder mode and sets the spark retard to zero.

Note that the difference in the times t1 and t2 in FIG. 3D(1) correspond to the timer value limit (IC_ENA_TIM).

Referring now to FIG. 3D(3), graphs 3D(3)a 3D(3)d illustrate transitions from the 4-cylinder mode to the 8-cylinder mode. In this case, at time t, the ignition timing and the number of cylinders is changed. Then, from time t1 to time t2 (which corresponds to the timer limit value) the throttle position and the ignition timing are ramped, or gradually adjusted, to approach optimal ignition timing while maintaining engine torque substantially constant. Also note that three different responses are provided at three different transition times as set by parameter (IC_ENA_TIM). Further, in the first two responses as labeled by a and b the driver is, for example, only requesting a slight gradual increase in engine torque. However, in situation c, the driver is requesting a rapid increase in engine torque. In these cases, the graphs illustrate the adjustment in throttle position and ignition timing and the change in the number of cylinders, as well as the corresponding engine output.

Figure 3E:
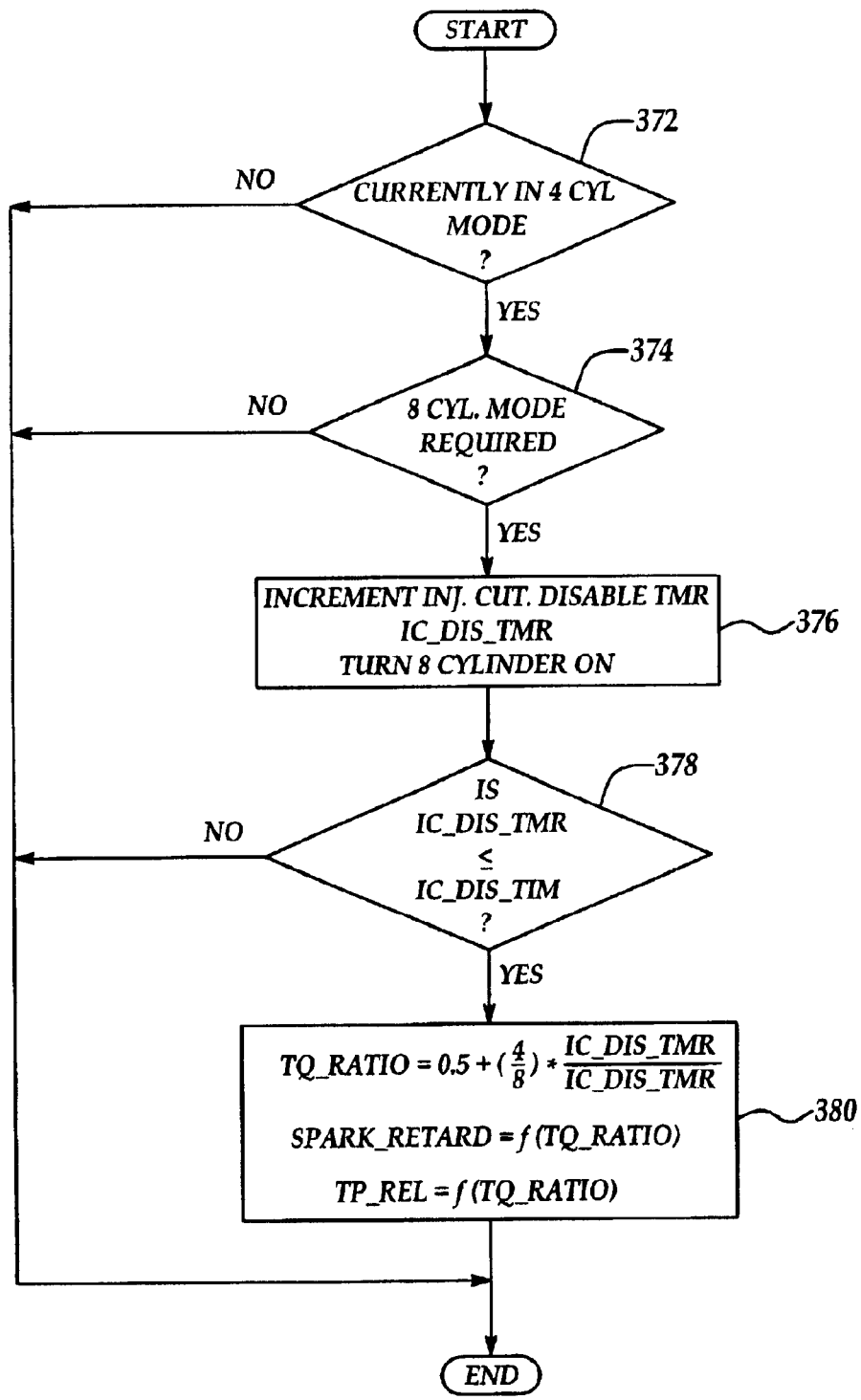
FIG. 3E shows a high level flow chart for controlling engine transitions.

Referring now to FIG. 3E, the routine describes the transition from four cylinders to the 8-cylinder mode. First, in step 372, the routine determines whether the engine is currently operating in the four-cylinder mode. When the answer to step 372 is yes, the routine continues to step 374, where it is determined whether it is required to operate in the 8-cylinder mode as described above herein with particular reference to FIG. 3C. When the answer to step 374 is yes, the routine continues to step 376. In step 376, the routine increments the timer (IC_DIS_TMR) and enables all cylinders. Then, in step 378, the routine determines whether the timer value is less than or equal to the limit time (IC_DIS_TIM). As described above herein, this timer limit is adjusted to achieve different engine responses. When the answer to step 378 is yes, the routine continues to step 380 where the torque ratio, spark retard and relative throttle position are calculated as shown.

Figure 4A:
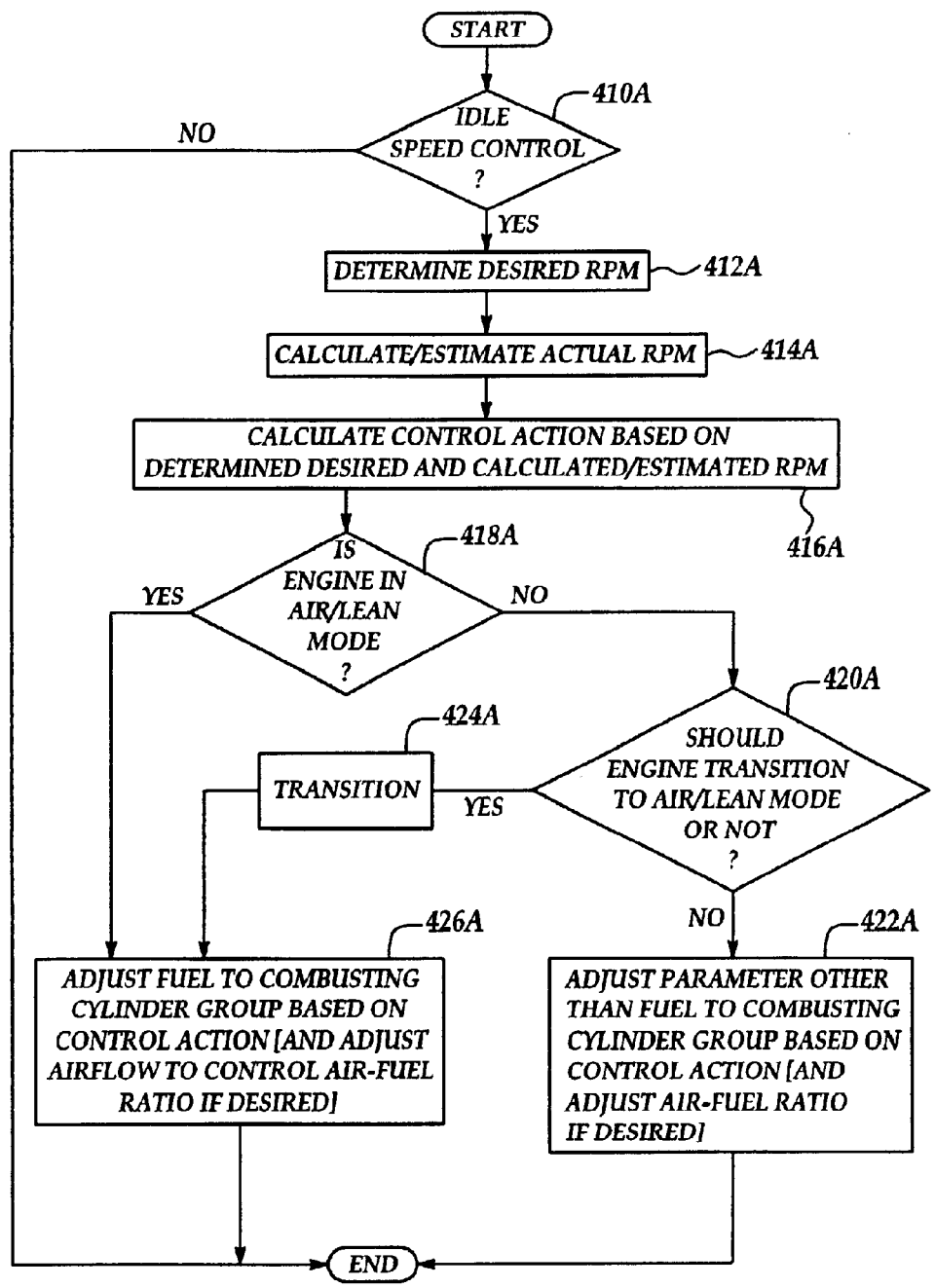
FIG. 4A is a high level flow chart for controlling engine speed depending on engine operating mode.

Referring now to FIG. 4A, a routine for controlling engine idle speed is described. First, in step 410a, a determination is made as to whether idle speed control is required. In particular, the routine determines whether engine speed is within a predetermined idle speed control range, whether the pedal position is depressed less than a predetermined amount, whether vehicle speed is less than a predetermined value, and other indications that idle speed control is required. When the answer to step 410a is yes, the routine determines a desired engine speed in step 412a. This desired engine speed is based on various factors, such as engine coolant temperature, time since engine start, position of the gear selector (for example, a higher engine speed is usually set when the transmission is in neutral compared with in drive), and accessory status such as air-conditioning, and catalyst temperature. In particular, desired engine speed may be increased to provide additional heat to increase temperature of the catalyst during engine warm-up conditions.

Then, in step 414*a*, the routine determines actual engine speed. There are various methods for determining actual engine speed. For example, engine speed can be measured from an engine speed sensor coupled to the engine crankshaft. Alternatively, engine speed can be estimated based on other sensors, such as a camshaft position sensor and time. Then, in step 416*a*, the routine calculates a control action based on the determined desired speed and measured engine speed. For example, a feed forward plus feed back proportional/integral controller can be used. Alternatively, various other control algorithms can be used so that the actual engine speed approaches the desired speed.

Next, in step 418*a*, the routine determines whether the engine is currently operating in the AIR/LEAN mode. When the answer to step 418*a* is no, the routine continues to step 420*a*.

Referring now to step 420*a*, a determination is made as to whether the engine should transition to a mode with some cylinders operating lean and other cylinders operating without injected fuel, referred to as AIR/LEAN mode. This determination can be made based on various factors. For example, various conditions may be occurring where it is desired to remain with all cylinders operating such as, for example, fuel vapor purging, adaptive air/fuel ratio learning, a request for higher engine output by the driver, operating all cylinders rich to release and reduce oxidants stored in the emission control device, to increase exhaust and catalyst temperature to remove contaminants such as sulfur, operating to increase or maintain exhaust gas temperature to control any emission control device to a desired temperature or to lower emission control device temperature due to over-temperature condition. In addition, the above-described conditions may occur not only when all the cylinders are operating or all the cylinders are operating at the same air/fuel ratio, but also under other operating conditions, such as some cylinders operating at stoichiometry and others operating rich, some cylinders operating without fuel and just air, and other cylinders operating rich, or conditions where some cylinders are operating at a first air/fuel ratio and other cylinders are operating at a second different air/fuel ratio. In any event, these conditions may require transitions out of, or prevent operation in, the AIR/LEAN operating mode.

Referring now to step 422*a* of FIG. 4A, a parameter other than fuel to the second cylinder group is adjusted to control engine output and thereby control engine speed. For example, if the engine is operating with all of the cylinder groups lean, then the fuel injected to all of the cylinder groups is adjusted based on the determined control action. Alternatively, if the engine is operating in a stoichiometric mode with all of the cylinders operating at stoichiometry, then engine output and thereby engine speed is adjusted by adjusting the throttle or an air bypass valve. Further, in the stoichiometric mode, the stoichiometric air/fuel ratio of all the cylinders is adjusted by individually adjusting the fuel injected to the cylinders based on the desired air/fuel ratio and the measured air/fuel ratio from the exhaust gas oxygen sensor in the exhaust path.

Thus, according to the present invention, when operating in the AIR/LEAN mode, idle speed control is accomplished by adjusting fuel to the cylinders that are combusting air and fuel and the remaining cylinders are operated without fuel and only air. Note, that the fuel adjustment can be achieved by changing the engine air-fuel ratio via a change in combusted fuel—either injected or inducted in vapor form. However, when this AIR/LEAN mode is not employed, idle speed control is accomplished in one of the following or other various manners: adjusting airflow and operating at stoichiometry with retarded ignition timing; operating some cylinders at a first air/fuel ratio and other cylinders at a second air/fuel ratio and adjusting at least one of air or fuel to the cylinders; adjusting an idle bypass valve based on speed error; or various others.

When the answer to step 420*a* is yes, the routine continues to step 424*a* and the engine is transitioned from operating all the cylinders to operating in the AIR/LEAN mode with some of the cylinders operating lean and other cylinders operating without injected fuel (see transitioning routines below).

From step 424*a*, or when the answer to step 418*a* is yes, the routine continues to step 426*a* and idle speed is controlled while operating in the AIR/LEAN mode. Referring now to step 426*a* of FIG. 4*a*, the fuel provided to the cylinder group combusting an air/fuel mixture is adjusted based on the determined control action. Thus, the engine idle speed is controlled by adjusting fuel to less than all of the cylinder groups and operating with some cylinders having no injected fuel. Further, if it is desired to control the air/fuel ratio of the combusting cylinders, or the overall air/fuel ratio of the mixture of pure air and combusted air and fuel based on, for example, an exhaust gas oxygen sensor, then the throttle is adjusted based on the desired air/fuel ratio and the measured air/fuel ratio. In this way, fuel to the combusting cylinders is adjusted to adjust engine output, while air/fuel ratio is controlled by adjusting airflow. Note, in this way, the throttle can be used to keep the air-fuel ratio of the combusting cylinders within a preselected range to provide good combustibility and reduced pumping work.

Thus, according to the present invention, when operating in the AIR/LEAN mode, fuel injected to the cylinders combusting a lean air-fuel mixture is adjusted so that actual engine speed approaches a desired engine speed, while some of the cylinders operate without injected fuel. Alternatively, when the engine is not operating in the AIR/LEAN mode, at least one of the air and fuel provided all the cylinders is adjusted to control engine speed to approach the desired engine speed.

Figure 4B:
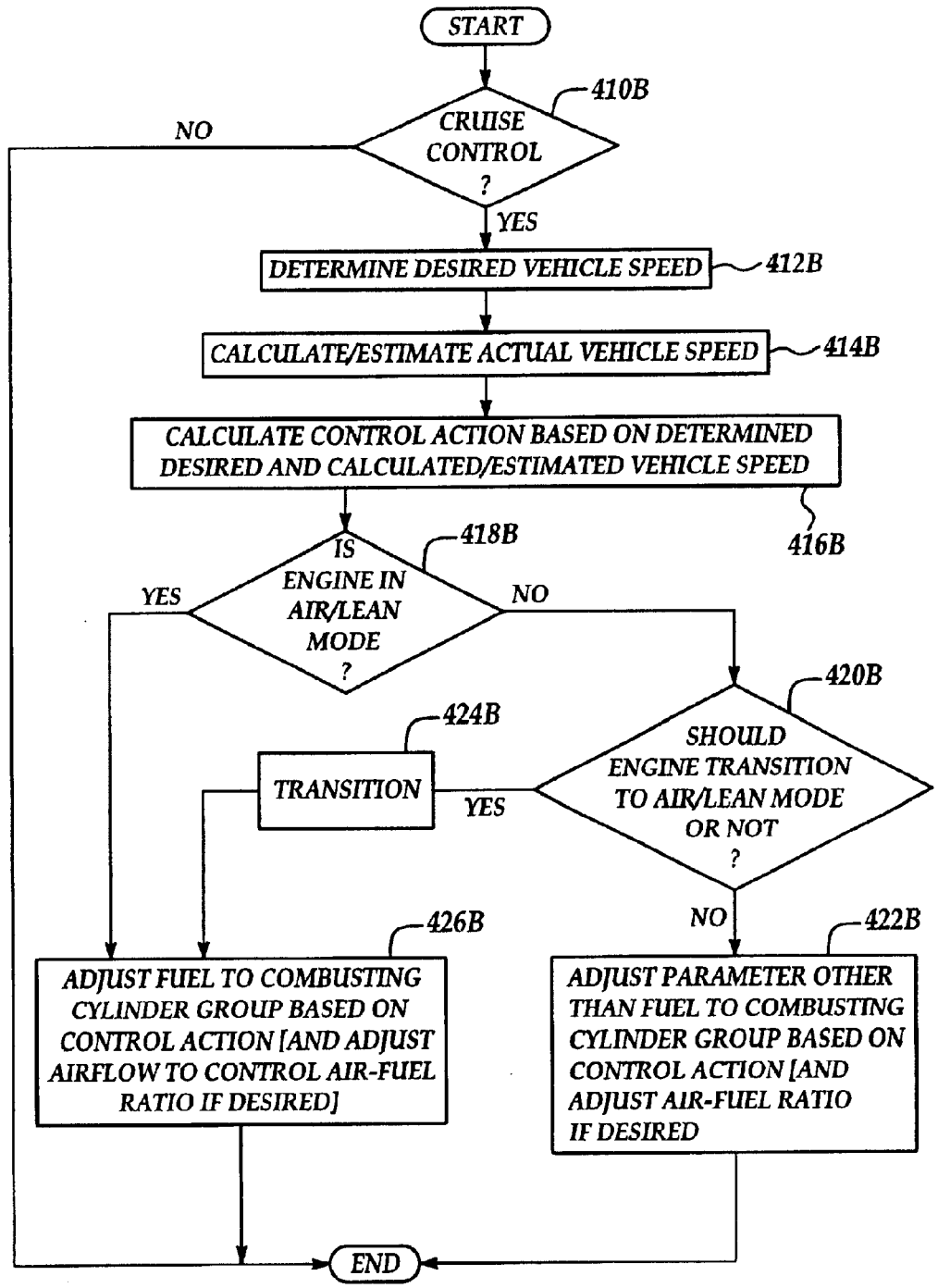
FIG. 4B is a high level flow chart describing vehicle cruise control.
Figure 4C:
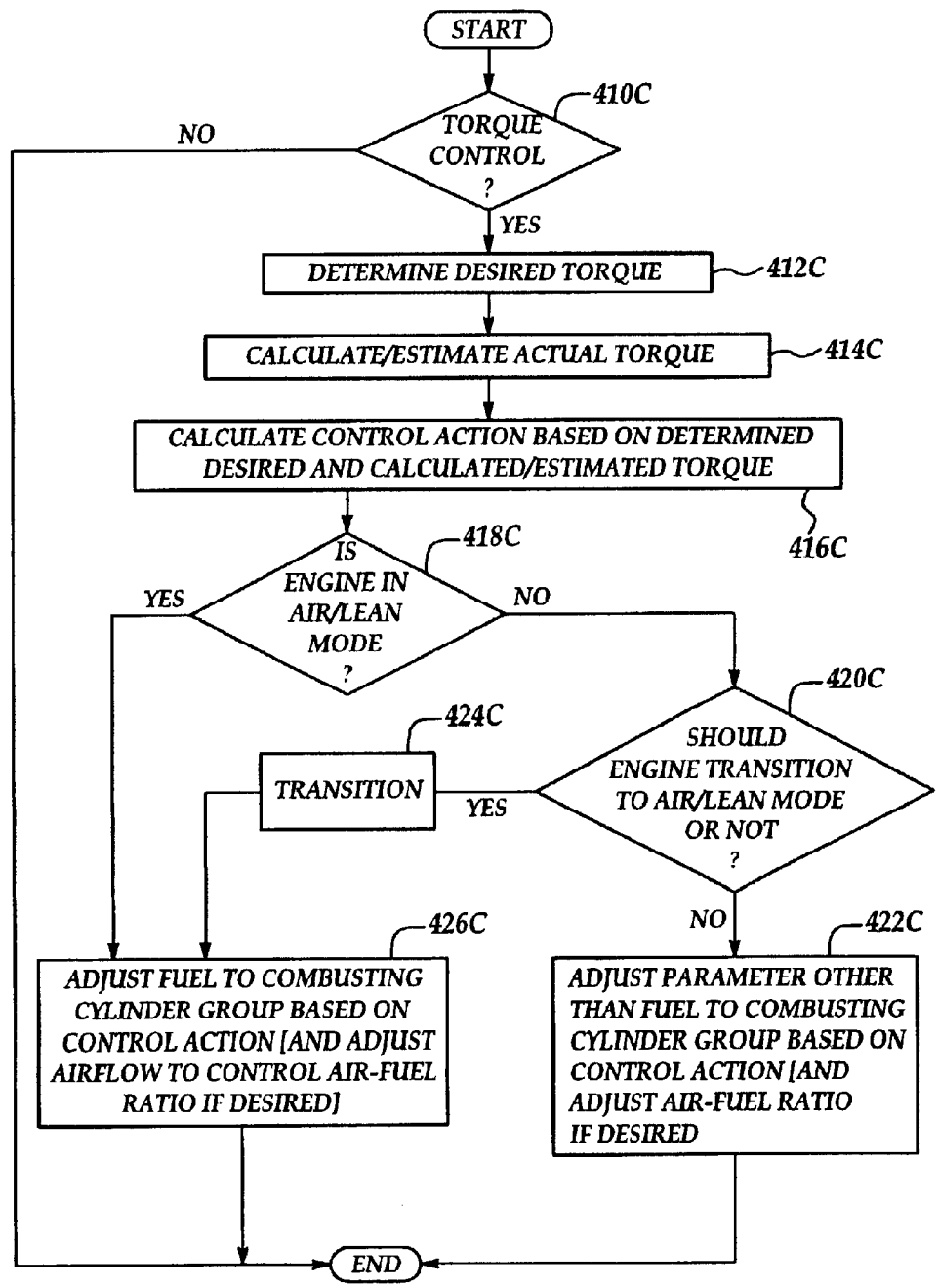
FIG. 4C is a high level flow chart showing engine torque control.
Figure 4D:
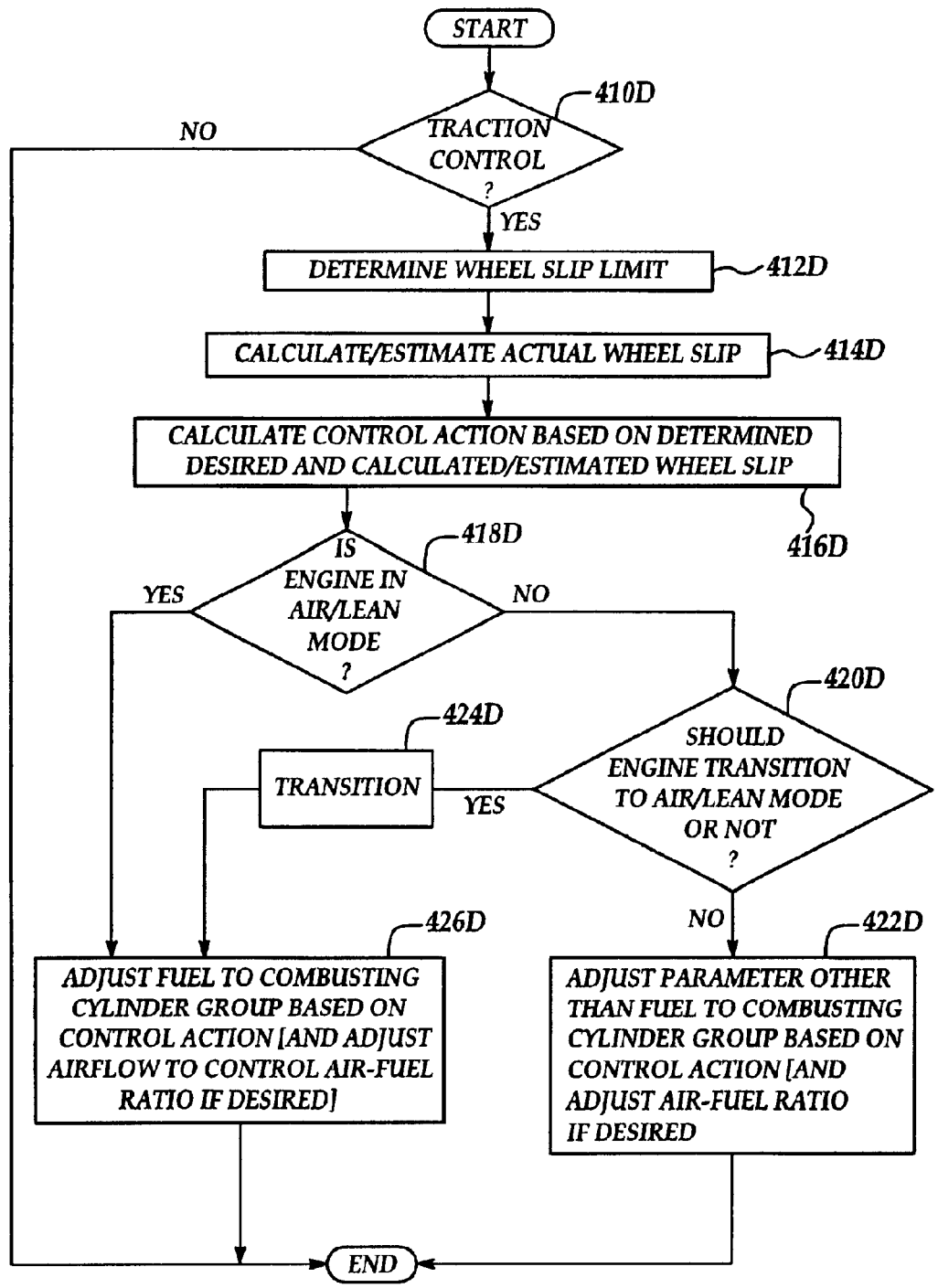
FIG. 4D is a high level flow chart showing vehicle wheel traction control.

The above description of FIG. 4*a* referred to the embodiment for idle speed control. However, this is simply one embodiment according to the present invention. FIGS. 4*b* through 4*d* refer to additional alternate embodiments.

Referring now to FIG. 4B, an embodiment directed to cruise control (vehicle speed control) is described. In particular, the routine of FIG. 4B is similar to that of FIG. 4A except for blocks 410*b* through 416*b*. In particular, in step 410*b*, a determination is made as to whether cruise control mode is selected. When the answer to step 410*b* is yes, the routine continues to step 412*b*, where a desired vehicle speed is determined. In step 412*b*, various methods are available for selecting the desired vehicle speed. For example, this may be a vehicle speed set directly by the vehicle driver. Alternatively, it could be a desired vehicle speed to give a desired vehicle acceleration or deceleration requested by the vehicle driver via steering wheel controls. Next, in step 414*b*, the routine calculates/estimates actual vehicle speed. This actual vehicle speed can be calculated/ estimated in various methods such as, for example, based on vehicle speed sensors, based on engine speed and a gear ratio, based on a global positioning system, or various other methods. Next, in step 416*b*, the routine calculates a control action based on the desired and actual vehicle speed. As described above, various control methods can be used such as, for example, a PID controller, a feed-forward controller, or various others.

Referring now to FIG. 4C, another alternate embodiment is described for controlling engine, or wheel, torque during the AIR/LEAN mode. Again, FIG. 4c is similar to FIGS. 4A and B, except for steps 410c through 416c. First, in step 410c, the routine determines whether torque control is selected. When the answer to step 410c is yes, the routine continues to step 412c. In step 412c, the routine determines a desired torque (either an engine torque, wheel torque, or another torque value). In particular, this desired torque value can be based on various parameters such as, for example, a driver request (pedal position), a desired engine speed, a desired vehicle speed, a desired wheel slip, or various other parameters. As such, this torque control routine can be used to accomplish idle speed control, cruise control, driver control as well as traction control.

Next, in step 414c, the routine calculates/estimates actual torque. This can be accomplished via a torque sensor, or based on other engine operating parameters such as engine speed, engine airflow, fuel injection, and others. Then, in step 416c, the routine calculates control action based on the desired and actual torque. As above, various control methodologies can be used, such as a PID controller.

Finally, in FIG. 4D, another embodiment is described which is directed to traction control. In step 410d, the routine determines whether traction control is activated. When the answer to step 410d is yes, the routine continues to step 412d, where the routine determines a wheel slip limit. This limit represents the maximum allowed wheel slip between driving and driven wheels that is tolerated. Then, in step 414d, the routine calculates/estimates actual wheel slip based on, for example, wheel speed sensors on the driving and driven wheels. Then, in step 416d, the routine continues to calculate a control action based on the limit wheel slip and the calculated/estimated wheel slip. As above, with regard to FIGS. 4A through 4C, steps 418d through 426d are similar to steps 418a through 426a.

Figure 5:
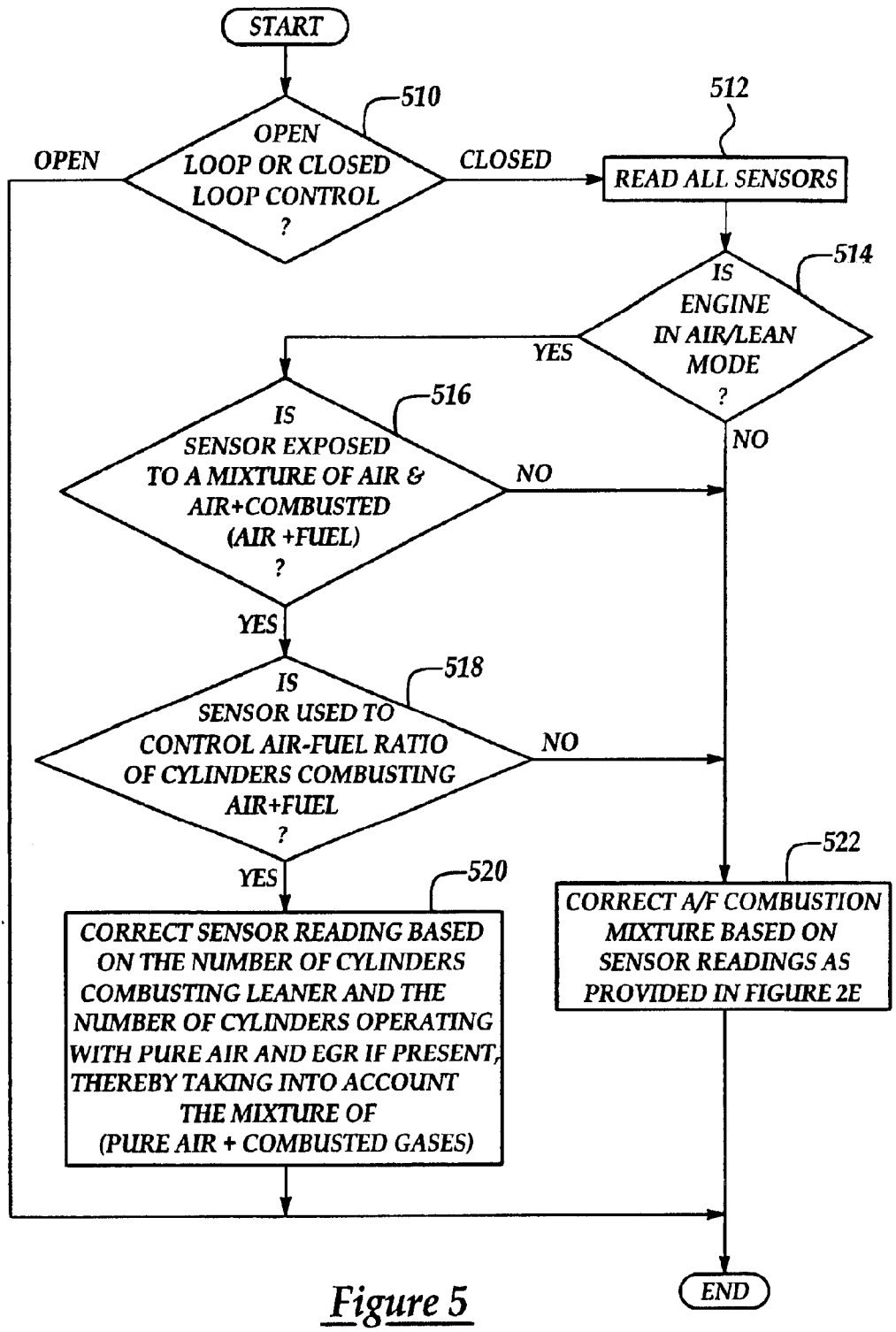
FIG. 5 is a high level flow chart for correcting an output of an air-fuel ratio sensor.

Referring now to FIG. 5, a routine is described for controlling engine air-fuel ratio according to the present invention. First, in step 510, a determination is made as to whether the engine is operating in open loop or closed loop air-fuel ratio control. In particular, in one example, open loop air-fuel ratio operation is performed during engine start up until the exhaust gas oxygen sensors have reached their operating temperature. Also, open loop air-fuel ratio control may be required when operating away from stoichiometry in the case where the exhaust gas oxygen sensors are switching type exhaust gas oxygen sensors that provide a switch and sensor output at the stoichiometric point. When the engine is operating in the open loop air-fuel ratio control mode, the routine simply ends. Otherwise, when operating in the closed loop mode, the routine continues to step 512, where all of the exhaust gas oxygen sensors coupled to the engine exhaust are read. Also note that operation in the AIR/LEAN operating mode may be prohibited when conditions are such that open loop control is required. However, it is also possible to provide the AIR/LEAN mode in the open loop mode.

Next, in step 514, a determination is made as to whether the engine is operating in the AIR/LEAN mode. When the answer to step 514 is yes, the routine continues to step 516. In step 516, a determination is made, for each sensor, as to whether the sensor is exposed to a mixture of air and combusted fuel (i.e., whether the sensor sees a mixture of gases from a first cylinder group with substantially no fuel injection and gases from a second combustion chamber group performing combustion of an air and fuel mixture). When the answer to step 516 is no, then it is not necessary to take into account the mixture of pure air and combusted gases in utilizing information from the sensor. As such, the routine can continue to step 522 where air/fuel control is provided as shown in FIG. 2E and the corresponding written description. Alternatively, if the answer to step 516 is yes, the routine continues to step 518. As such, if the sensor is exposed to a mixture of air and combusted air and fuel, the routine continues to step 518.

In step 518, a determination is made as to whether the sensor is used to control air-fuel ratio of cylinders combusting an air and fuel mixture. In other words, a sensor such as 230B for example, can be exposed through a mixture of air and combusted air and fuel and still be used to control air-fuel ratio of the combusting cylinder group, in this example 212B. When the answer to step 518 is no, the routine continues to step 522 as described below herein. Alternatively, when the answer to step 518 is yes, the routine continues to step 520. In step 520, the routine corrects the combustion air fuel mixture for the sensor reading by adjusting one of air or fuel or both provided to the combusting cylinders based on the number of cylinders combusting the mixture and the number of cylinders operating without substantial fuel injection, thereby taking into account the mixture of pure air and combusted gases. Stated another way, the routine corrects for the sensor offset caused by pure air from the combustion group (for example 210B) that has inducted air, but no injected fuel. In addition, the routine can take into account recycled exhaust gas in the exhaust passage and intake passage if present. For example, if operating with the configuration of FIG. 2(C), the upstream sensors see a mixture of air and combusted gasses. As such, the raw sensor reading does not correspond to the air-fuel ratio of the combusted gasses. According to the present invention, this error is compensated in various ways.

In one particular example, the air-fuel ratio of the combusting cylinders can be determined from the sensor reading as shown below. In this example, an assumption of perfect mixing in the exhaust gas is made. Further, it is assumed that all the cylinders combusting air-fuel mixture are all combusting substantially the same air-fuel ratio. In this example, the sensor reading(s) is provided in terms of a relative air-fuel ratio through stoichiometry. For gasoline, this ratio is approximately 14.6. The air per cylinder for cylinders without injected fuel is denoted as $a_A$. Similarly, the air per cylinder for combusting cylinders is denoted as $a_C$, while the fuel injected per cylinder for the combustion cylinders is denoted as $s_C$. The number of cylinders without fuel injected is denoted as Na, while the number of cylinders combusting an air fuel mixture is denoted as $N_C$. The general equation to relate these parameters is:

$$S \cdot 14.6 = \frac{N_A \cdot a_A + N_C \cdot a_c}{N_c \cdot f_c} \qquad \text{Equation 1}$$

Assuming that the air provided to each combustion chamber group is substantially the same, then the air to fuel ratio of the combustion cylinders can be found from multiplying the sensor reading by 14.6 and the number of cylinders combusting an air-fuel mixture divided by the total number of cylinders. In the simple case where an equal number of cylinders operate with and without fuel, the sensor simply indicates twice the combustion air-fuel ratio.

In this way, it is possible to utilize the sensor reading that is corrupted by air from the cylinders without fuel injection. In this example, the sensor reading was modified to obtain an estimate of the air fuel ratio combusted in the combustion cylinders. Then this adjusted sensor reading can be used with a feedback control to control the cylinder air-fuel ratio of the combustion cylinders to a desired air-fuel ratio taking into account the air affecting the sensor output from the cylinders without fuel injection.

In an alternative embodiment to the present invention, the desired air-fuel ratio can be adjusted to account for the air affecting the sensor output from the cylinders without fuel injection. In this alternative embodiment, the sensor reading is not adjusted directly, rather the desired air-fuel ratio is adjusted accordingly. In this way it is possible to control the actual air-fuel ratio in the cylinders combusting an air-fuel mixture to a desired air-fuel ratio despite the effect of the air from the cylinders without fuel injection on the sensor output.

In a similar manner, it is possible to account for the recycled exhaust gas. In other words, when operating lean, there is excess air in the recycled exhaust gas that enters the engine unmeasured by the air meter (air flow sensor 100). The amount of excess air in the EGR gasses (Am_egr) can be calculated from the equation below, using the measured air mass from sensor 100 (am, in lbs/min), the EGR rate, or percent, (egrate), and the desired relative air-fuel ratio to stoichiometry (lambse):

$$am\_egr = am * (egrate/(1-egrate)) * (lambse-1)$$

where egrate=100*desem/(am+desem), where desem is the mass of EGR in lbs/min.

Thus, the corrected air mass would be am+am_egr.

In this way, it is possible to determine the actual air entering the engine cylinder so that air-fuel ratio can be controlled more accurately.

In other words, if operating in open loop fuel control, the excess air added through the EGR will operate the cylinder leaner than requested and could cause lean engine misfires if not accounted for. Similarly, if operating in closed-loop fuel control, the controller may adjust the desired air-fuel ratio such that more fuel is added to make the overall air-fuel ratio match the requested value. This may cause engine output to be off proportional to the value am_egr. The solution to these is to, for example, adjust the requested air mass by reducing the requested airflow from the electronically controlled throttle by an amount of am_egr so as to maintain the engine output and air-fuel ratio.

Note that in some of the above corrections, the adjustments made to compensate for the uncombusted air in some cylinders requires an estimate of airflow in the cylinders. However, this estimate may have some error (for example, if based on an airflow sensor, there may be as much as 5% error, or more). Thus, the inventors have developed another method for determining air-fuel ratio of the combusted mixture. In particular, using temperature sensor coupled to an emission control device (e.g., 220*c*), it is possible to detect when the operating cylinders have transitioned through the stoichiometric point. In other words, when operating the combusting cylinders lean, and other cylinders with substantially no injected fuel, there will be almost no exothermic reaction across the catalyst since only excess oxygen is present (and almost no reductants are present since no cylinders are operating rich). As such, catalyst temperature will be at an expected value for current operating conditions. However, if the operating cylinders transition to slightly rich of stoichiometry, the rich gasses can react with the excess oxygen across the catalyst, thereby generating heat. This heat can raise catalyst temperature beyond that expected and thus it is possible to detect the combustion air-fuel ratio from the temperature sensor. This correction can be used with the above-described methods for correcting the air-fuel ratio reading so that accurate air-fuel ratio feedback control can be accomplished when operating some cylinders with substantially no injected fuel.

Continuing with FIG. 5, in step 522, the air-fuel ratio of the cylinders carrying out a combustion is corrected based on the output of the sensors read in step 512. In this case, since the engine is not operating in the AIR/LEAN mode, it is generally unnecessary to correct the sensor outputs since generally the cylinders are all operating at substantially the same air-fuel ratio. A more detailed description of this feedback control is provided in FIG. 2E and the related written description. Note that in one particular example according to the present invention, the air-fuel ratio of the cylinders combusting an air-fuel mixture when operating in the AIR/LEAN mode is controlled by controlling airflow entering the engine (see step 520). In this way, it is possible to control engine output by adjusting the fuel injection to the combusting cylinders, while controlling the air-fuel ratio by changing the air amounts provided to all of the cylinders. Alternatively, when engine 10 is not operating in the AIR/LEAN mode (see step 522). The air-fuel ratio of all of the cylinders is controlled to a desired air-fuel ratio by changing the fuel injection amount, while the torque output of the engine is adjusted by adjusting airflow to all of the cylinders.

Figure 6:
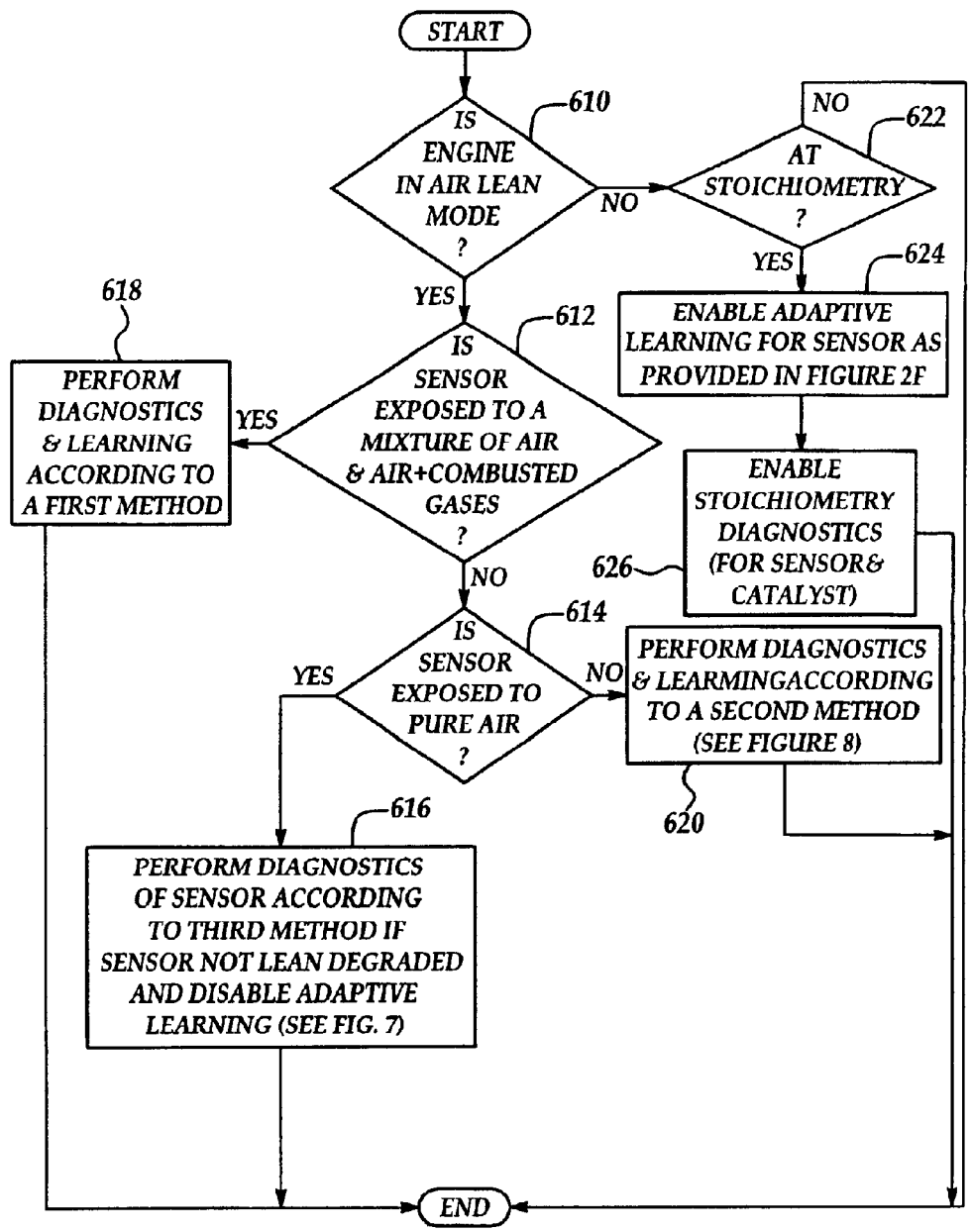
FIG. 6 is a high level flow chart for performing engine diagnostics.

Referring now to FIG. 6, a routine is described for determining degradation of exhaust gas oxygen sensors as well as controlling enablement of adaptive learning based on the exhaust gas oxygen sensors.

First, in step 610, the routine determines whether the engine is operating in the AIR/LEAN mode. When the answer to step 610 is yes, the routine continues to step 612 where a determination is made as to whether a sensor is exposed to a mixture of air and air plus combusted gases. When the answer to step 612 is no, the routine determines whether the sensor is exposed to pure air in step 614. When the answer to step 614 is yes, the routine performs diagnostics of the sensor according to the third method of the present invention (described later herein) and disables adaptive learning (see FIG. 7). In other words, when a sensor is exposed only to a cylinder group that inducts air with substantially no injected fuel, then sensor diagnostics according to the third method of the present invention are used, and adaptive learning of fueling and airflow errors is disabled.

Alternatively, when the answer to step 612 is yes, the routine continues to step 618. In step 618, the routine performs diagnostics and learning according to the first method of the present invention described later herein.

Figure 8:
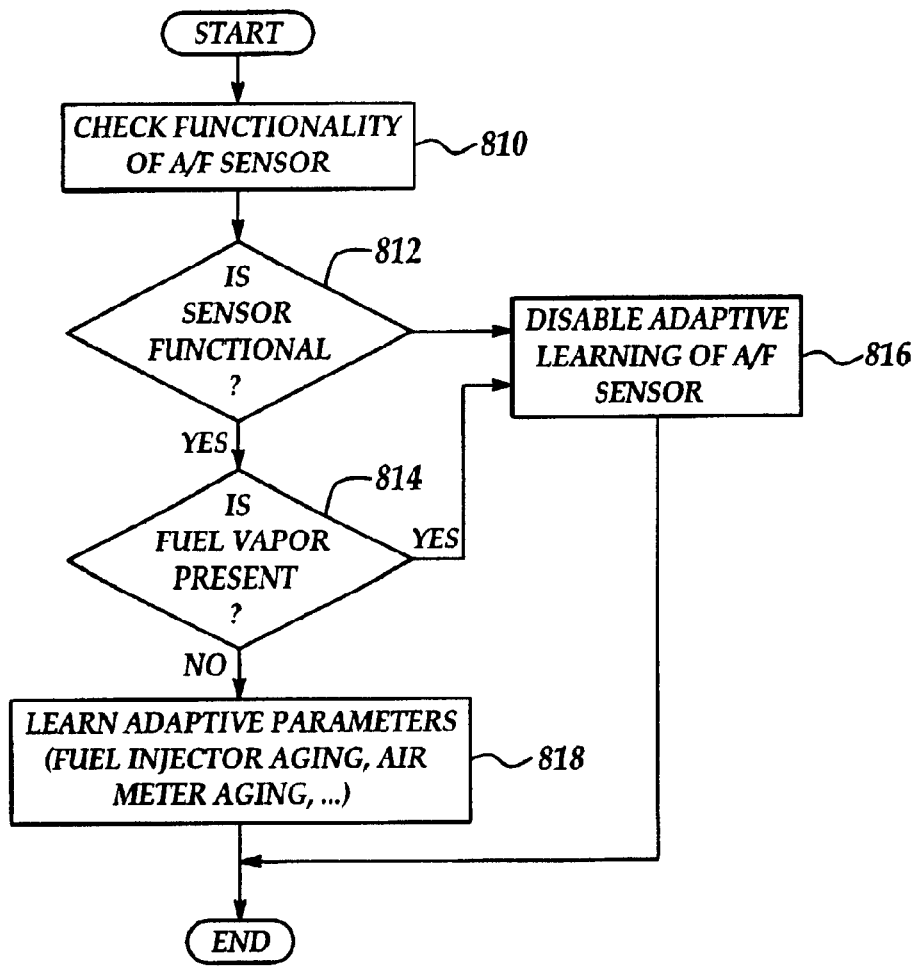
FIG. 8 is a high level flow chart relating to adaptive learning of an air-fuel sensor.

When the answer to step 614 is no, the routine continues to step 620 and performs diagnostics and adaptive learning according to the second method of the present invention (see FIG. 8).

When the answer to step 610 is no, the routine determines in step 622 whether the engine is operating substantially near stoichiometry. When the answer to step 622 is yes, the routine enables adaptive learning from the exhaust gas sensor in step 624. In other words, when all cylinders are combusting air and fuel, and the engine is operating near stoichiometry, adaptive learning from the exhaust gas oxygen sensors is enabled. A more detailed description of adaptive learning is provided in FIG. 2F and the corresponding written description.

Then, in step 626, the routine enables stoichiometric diagnostics for the sensors and catalyst.

Figure 7:
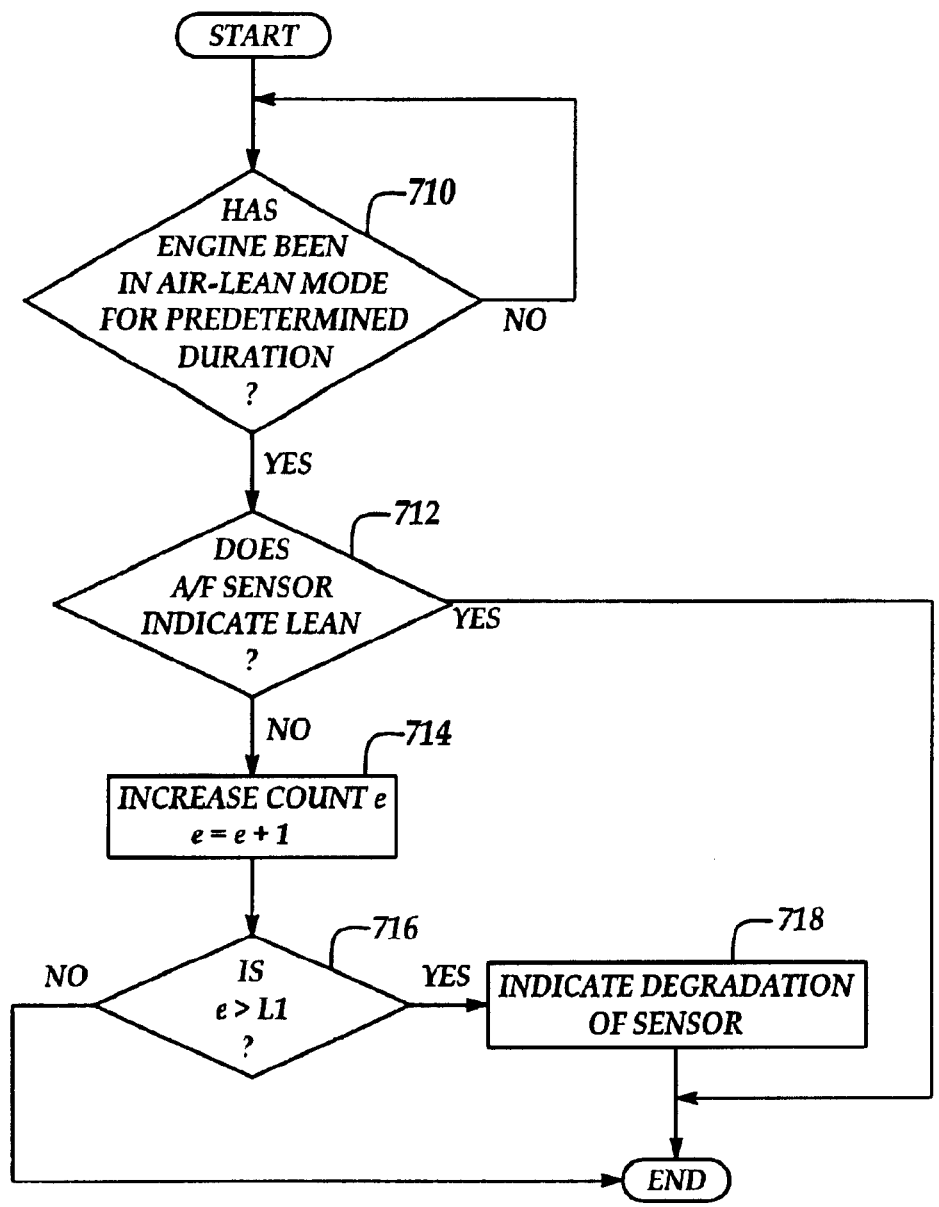
FIG. 7 is a high level flow chart for indicating degradation of an engine sensor.

Referring now to FIG. 7, the third adaptive/diagnostic method according to the present invention (see step 616 of FIG. 6) is described. First, in step 710, the routine determines whether the engine has been in the AIR/LEAN mode for a predetermined duration. This can be a predetermined time duration, a predetermined number of engine revolutions, or a variable duration based on engine and vehicle operating conditions such as vehicle speed and temperature. When the answer to step 710 is yes, the routine continues to step 712, where a determination is made as to whether the air fuel sensor indicates a lean air-fuel ratio. For example, the routine can determine whether the sensor indicates a lean value greater than a predetermined air-fuel ratio. When the answer to step 712 is no, the routine increases count e by one in step 714. Then, in step 716, the routine determines whether count e is greater than a first limit value (L1). When the answer to step 716 is yes, the routine indicates degradation of the sensor in step 718.

Thus, according to the present invention, when the sensor is coupled only to a cylinder group inducting air with substantially no injected fuel, the routine determines that the sensor has degraded when the sensor does not indicate a lean air-fuel ratio for a predetermined interval.

Referring now to FIG. 8, the second method of diagnostics and adaptive learning according to the present invention (see step 620 of FIG. 6) is described. First, in step 810, the routine determines whether the air-fuel sensor is functioning. This can be done in a variety of methods such as, for example, comparing the measured air-fuel ratio to an expected air-fuel ratio value based on engine operating conditions. Then, in step 812, when the sensor is functioning properly, the routine continues to step 814. When the sensor has degraded, the routine moves from step 812 to step 816 and disables adaptive learning based on the air-fuel sensor reading.

Continuing with FIG. 8, when the answer to step 812 is yes, the routine determines whether fuel vapor is present in step 814. Again, if fuel vapor is present, the routine continues to step 816. Otherwise, the routine continues to step 818 and learns an adaptive parameter to account for fuel injector aging, air meter aging, and various other parameters as described in greater detail herein with particular reference to FIG. 2F. Adaptive learning can be in various forms, such as described in U.S. Pat. No. 6,102,018 assigned to the assignee of the present invention and incorporated herein by reference in its entirety.

Figure 9:
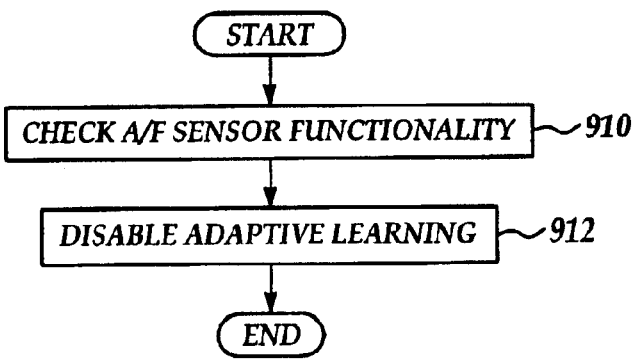
FIG. 9 is a high level flow chart for calling sensor diagnostics.

Referring now to FIG. 9, diagnostics and adaptive learning according to the first method of the invention (see step 618 of FIG. 6) is described. First, in step 910, the routine determines whether the air-fuel sensor is functioning in a manner similar to step 810 in FIG. 8. Then, in step 912, adaptive learning is disabled.

The method according to the present invention described hereinabove with particular reference to FIGS. 6 through 9 describes diagnostics and adaptive learning for a particular exhaust gas oxygen, or air-fuel ratio, sensor. The above routines can be repeated for each exhaust gas sensor of the exhaust gas system.

Figure 10:
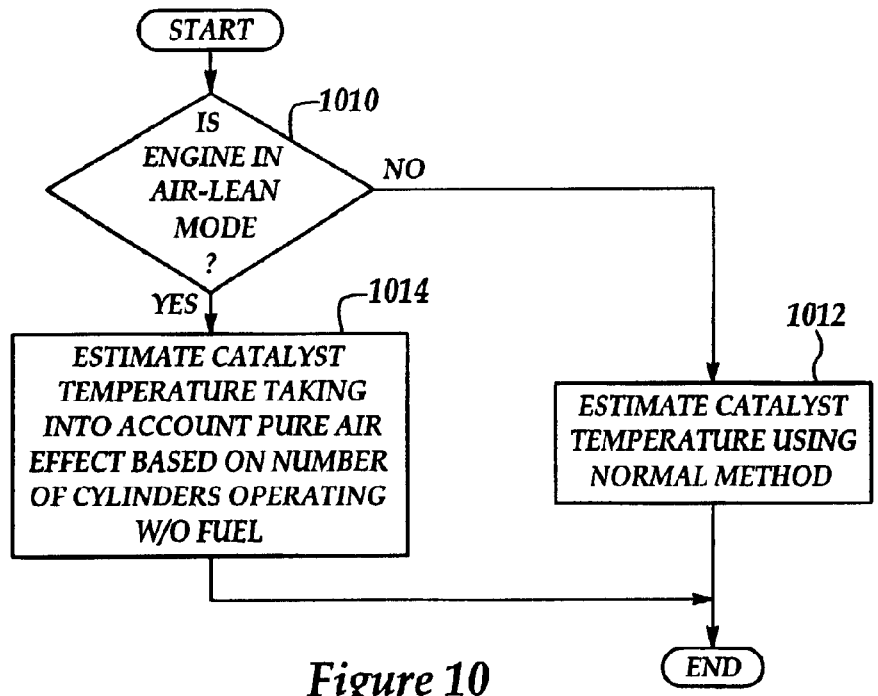
FIG. 10 is a high level flow chart for estimating catalyst temperature depending on engine operating mode.

Referring now to FIG. 10, the routine is described for estimating catalyst temperature depending on engine operating mode. First, in step 1010, the routine determines whether the engine is operating in the AIR/LEAN mode. When the answer to step 1010 is no, the routine estimates catalyst temperature using the conventional temperature estimating routines. For example, catalyst temperature is estimated based on operating conditions such as engine coolant temperature, engine airflow, fuel injection amount, ignition timing, and various other parameters as described, for example, in U.S. Pat. No. 5,303,168, the entire contents of which are incorporated herein by reference.

Alternatively, when the answer to step 1010 is no, the routine continues to step 1014 where catalyst temperature is estimated taking into account the pure air effect based on the number of cylinders operating without injected fuel. In other words, additional cooling from the airflow through cylinders without injected fuel can cause catalyst temperature to decrease significantly. Alternatively, if the exhaust gases of the combusting cylinders are rich, this excess oxygen from the cylinders operating without injected fuel can cause a substantial increase in exhaust gas temperature. Thus, this potential increase or decrease to the conventional catalyst temperature estimate is included.

Figure 11:
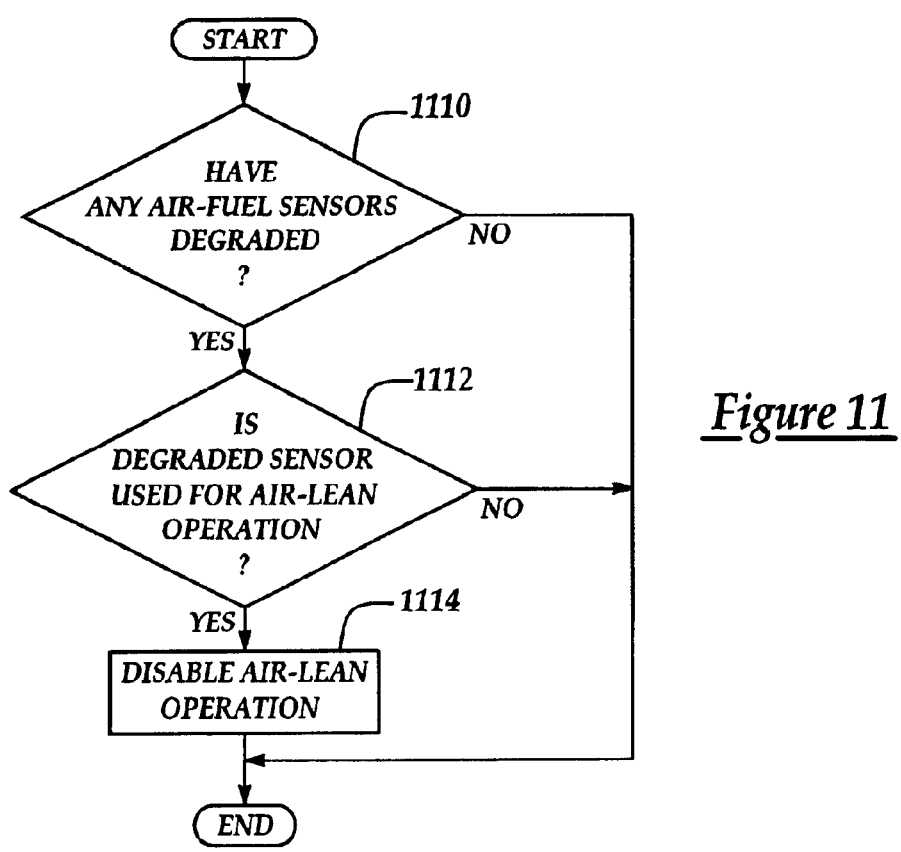
FIG. 11 is a high level flow chart for performing default operation in response to sensor degradation.

Referring now to FIG. 11, a routine is described for controlling engine operation in response to a determination of degradation of exhaust gas sensors described above herein with particular reference to FIGS. 6 through 9. In particular, in step 1110, the routine determines whether any air-fuel sensors have been degraded. As described above, this can be determined by comparing the sensor reading to an expected value for the sensor reading. Next, when the answer to step 1110 is yes, the routine determines in step 1112 if the degraded sensor is used for engine control during the AIR/LEAN mode of operation. If the answer to step 1112 is yes, the routine disables the AIR/LEAN operation.

In other words, if a sensor has degraded that is used for engine control during the AIR/LEAN operating mode, then the AIR/LEAN operating mode is disabled. Alternatively, if the sensor is not used in such an operating mode, then the AIR/LEAN mode can be enabled and carried out despite the degraded sensor.

Figure 12:
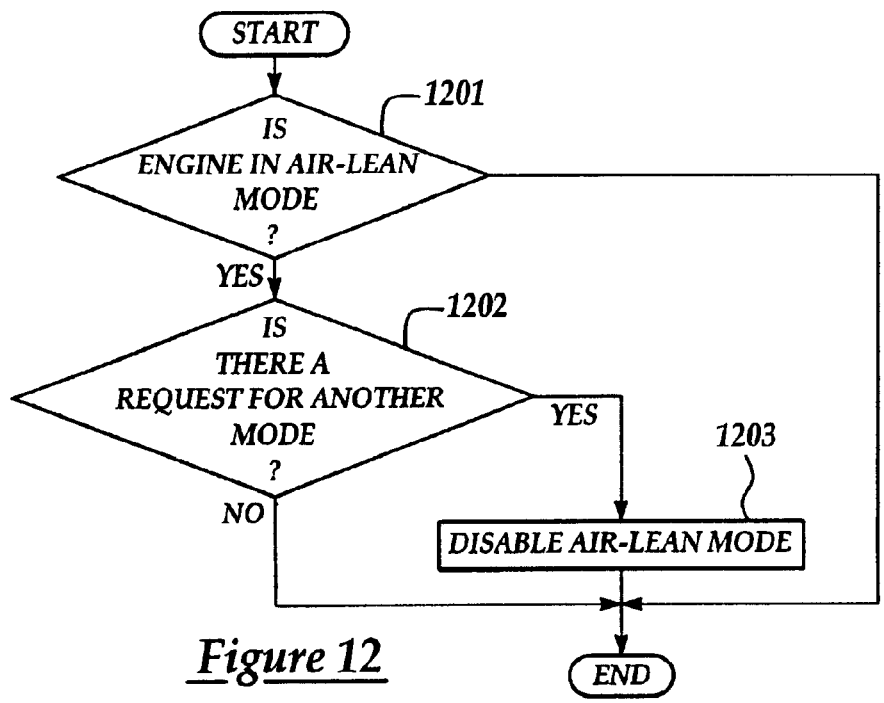
FIG. 12 is a high level flow chart for disabling certain engine operating modes.

Referring now to FIG. 12, a routine is described for controlling disabling of the AIR/LEAN mode. First, in step 1201, the routine determines whether the engine is currently operating in the AIR/LEAN mode. When the answer to step 1201 is yes, the routine continues to step 1202 where it determines whether there is a request for another operating mode. This request for another operating mode can take various forms such as, for example, the request for fuel vapor purging, the request for operating rich to release and reduce $NO_x$ trapped in the emission control device, the request for increasing brake booster vacuum by increasing manifold vacuum, a request for temperature management to either increase a desired device temperature or decrease a desired device temperature, a request to perform diagnostic testing of various components such as sensors or the emission control device, a request to end lean operation, a request resulting from a determination that an engine or vehicle component has degraded, a request for adaptive learning, or a request resulting from a control actuator reaching a limit value. When the answer to step 1202 is yes, the routine continues to step 1203 where the AIR/LEAN mode is disabled.

Note that the request for fuel vapor purging can be based on various conditions, such as the time since the last fuel vapor purge, ambient operating conditions such as temperature, engine temperature, fuel temperature, or others.

As described above, if catalyst temperature falls too low (i.e., less than preselected value), operating some cylinders with substantially no injected fuel can be disabled, and operating switched to firing all cylinders to generate more heat. However, other actions can also be taken to increase catalyst temperature. For example, ignition timing of the firing cylinders can be retarded, or some fuel can be injected into the non-combusting cylinders. In the latter case, the injected fuel can pass through (i.e., not ignited) and then react with excess oxygen in the exhaust system and thereby generate heat.

Figure 13A:
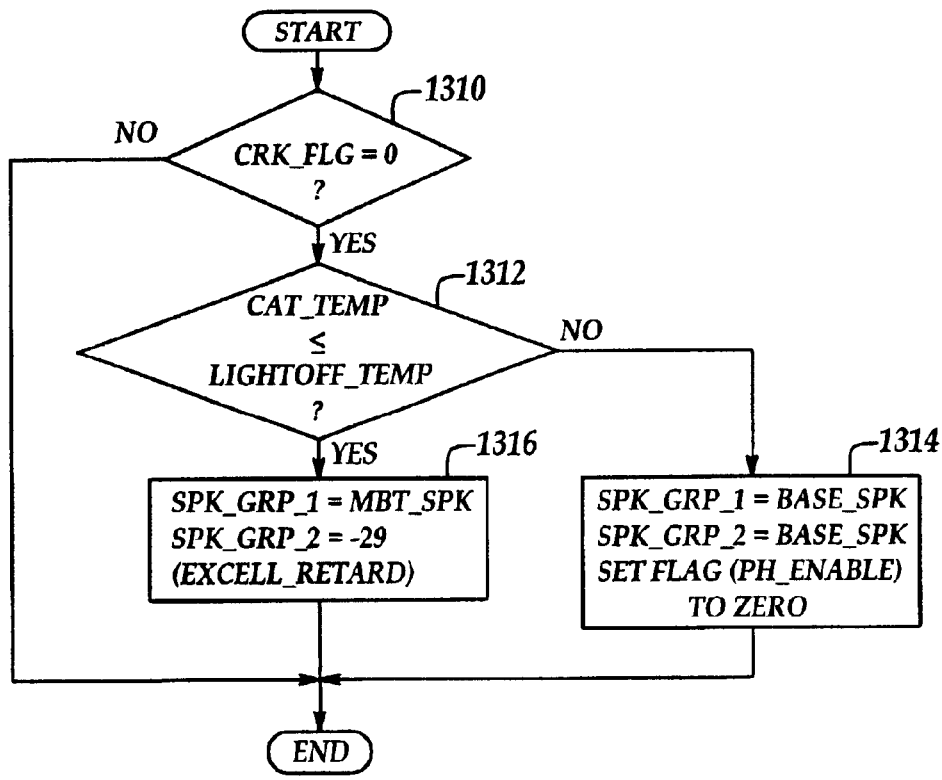
FIGS. 13A–B are high level flow charts for controlling engine transitions into catalyst heating modes.

Referring now to FIG. 13A, a routine is described for rapid heating of the emission control device. As described above herein, the emission control device can be of various types such as, for example, a three-way catalyst, a $NO_x$ catalyst, or various others. In step 1310, the routine determines whether the crank flag (crkflg) is set equal to zero. The crank flag indicates when the engine is being turned by the engine starter, rather than running under its own power. When it is set to one, this indicates that the engine is no longer in the crank mode. There are various methods known to determine when the engine has finished cranking such as, for example, when sequential fuel injection to all of the engine cylinders has begun, when the starter is no longer engaged, or various other methods. Another alternative, rather than using an indication of engine cranking, would be to use a flag indicating when the engine has begun synchronous fuel injection to all of the cylinders (sync_flg). In other words, when an engine starts, all of the cylinders are fired since engine position is not known. However, once the engine has reached a certain speed and after a predetermined amount of rotation, the engine control system can determine which cylinder is firing. At this point, the engine changes the sync_flg to indicate such a determination. Also note that during engine cranking/starting, the engine is operated substantially near stoichiometry with all cylinders having substantially the same ignition timing (for example, MBT timing, or slightly retarded ignition timing).

When the answer to step 1310 is yes, the routine continues to step 1312 where a determination is made as to whether the catalyst temperature (cat_temp) is less than or equal to a light off temperature. Note that in an alternative embodiment, a determination can be made as to whether the exhaust temperature is less than a predetermined value, or whether various temperatures along the exhaust path or in different catalyst have reached predetermined temperatures. When the answer to step 1312 is no, this indicates that additional heating is not called for and the routine continues to step 1314. In step 1314, the ignition timing of the first and second groups (spk_grp_1, spk_grp_2) set equal to base spark values (base_spk), which is determined based on current operating conditions. Also, the power heat flag (ph_enable) is set to zero. Note that various other conditions can be considered for disabling the power heat mode (i.e., disabling the split ignition timing). For example, if there is insufficient manifold vacuum, or if there is insufficient brake booster pressure, or if fuel vapor purging is required, or if purging of an emission control device such as a NOx trap is required. Similarly, when operating in the power heat mode, any of the above conditions will result in leaving the power heat mode and operating all cylinders at substantially the same ignition timing. If one of these conditions occurs during the power heat mode, the transition routine described below herein can be called.

Alternatively, when the answer to step 1312 is yes, this indicates that additional heating should be provided to the exhaust system and the routine continues to step 1316. In step 1316, the routine sets the ignition timing of the first and second cylinder groups to differing values. In particular, the ignition timing for the first group (spk_grp_1) is set equal to a maximum torque, or best, timing (MBT_spk), or to an amount of ignition retard that still provides good combustion for powering and controlling the engine. Further, the ignition timing for the second group (spk_grp_2) is set equal to a significantly retarded value, for example, 29°. Note that various other values can be used in place of the 29° value depending on engine configuration, engine operating conditions, and various other factors. Also, the power heat flag (ph_enable) is set to zero. Also, the amount of ignition timing retard for the second group (spk_grp_2) used can vary based on engine operating parameters, such as air-fuel ratio, engine load, and engine coolant temperature, or catalyst temperature (i.e., as catalyst temperature rises, less retard in the first and/or second groups, may be desired). Further, the stability limit value can also be a function of these parameters.

Also note, as described above, that the first cylinder group ignition timing does not necessarily have to be set to maximum torque ignition timing. Rather, it can be set to a less retarded value than the second cylinder group, if such conditions provide acceptable engine torque control and acceptable vibration (see FIG. 13B). That is it can be set to the combustion stability spark limit (e.g., −10). In this way, the cylinders on the first group operate at a higher load than they otherwise would if all of the cylinders were producing equal engine output. In other words, to maintain a certain engine output (for example, engine speed, engine torque, etc.) with some cylinders producing more engine output than others, the cylinders operating at the higher engine output produce more engine output than they otherwise would if all cylinders were producing substantially equal engine output. As an example, if there is a four-cylinder engine and all cylinders are producing a unitless output of 1, then the total engine output is 4. Alternatively, to maintain the same engine output of 4 with some cylinders operating at a higher engine output than others, then, for example, two cylinders would have an output of 1.5, while the other two cylinders would have an output of 0.5, again for a total engine output of 4. Thus, by operating some cylinders at more retarded ignition timing than others, it is possible to place some of the cylinders into a higher engine load condition. This allows the cylinders operating at the higher load to tolerate additional ignition timing retard (or additional enleanment). Thus, in these above examples, the cylinders operating with a unitless engine output of 1.5 could tolerate significantly more ignition timing retard than if all of the cylinders were operating at an engine output of 1. In this way, additional heat is provided to the engine exhaust to heat the emission control device.

An advantage to the above aspect of the present invention is that more heat can be created by operating some of the cylinders at a higher engine load with significantly more ignition timing retard than if operating all of the cylinders at substantially the same ignition timing retard. Further, by selecting the cylinder groups that operate at the higher load, and the lower load, it is possible to minimize engine vibration. Thus, the above routine starts the engine by firing cylinders from both cylinder groups. Then, the ignition timing of the cylinder groups is adjusted differently to provide rapid heating, while at the same time providing good combustion and control.

Also note that the above operation provides heat to both the first and second cylinder groups since the cylinder group operating at a higher load has more heat flux to the catalyst, while the cylinder group operating with more retard operates at a high temperature. Also, when operating with a system of the configuration shown in FIG. 2C (for example a V-8 engine), the two banks are substantially equally heated since each catalyst is receiving gasses from both the first and second cylinder groups.

However, when using such an approach with a V-10 engine (for example with a system of the form of FIG. 2D), then the cylinder groups provide exhaust only to different banks of catalyst. As such, one bank may heat to a different temperature than the other. In this case, the above routine is modified so periodically (for example, after a predetermined time period, or number of engine revolutions, etc.) the cylinder group operation is switched. In other words, if the routine starts with the first group operating with more retard than the second group, then after said duration, the second group is operated with more retard than the first, and so on. In this way, even heating of the exhaust system is achieved.

When operating as described with regard to FIG. 13A, the engine operates substantially at, or lean of, stoichiometry. However, as described below, with particular reference to FIGS. 13E–G, the air-fuel ratio of the cylinder groups can be adjusted to differing values as well.

Also note that all of the cylinders in the first cylinder group do not necessarily operate at exactly the same ignition timing. Rather, there can be small variations (for example, several degrees) to account for cylinder-to-cylinder variability. This is also true for all of the cylinders in the second cylinder group. Further, in general, there can be more than two cylinder groups, and the cylinder groups can have only one cylinder. However, in one specific example of a V8, configured as in FIG. 2C, there are 2 groups, with four cylinders each. Further, the cylinder groups can be two or more.

Also note that, as described above, during operation according to FIG. 13A, the engine cylinder air-fuel ratios can be set at different levels. In one particular example, all the cylinders are operated substantially at stoichiometry. In another example, all the cylinders are operated slightly lean of stoichiometry. In still another example, the cylinders with more ignition timing retard are operated slightly lean of stoichiometry, and the cylinders with less ignition timing retard are operated slightly rich of stoichiometry. Further, in this example, the overall mixture air-fuel ratio is set to be slightly lean of stoichiometry. In other words, the lean cylinders with the greater ignition timing retard are set lean enough such that there is more excess oxygen than excess rich gasses of the rich cylinder groups operating with less ignition timing retard. Operation according to this alternate embodiment is described in more detail below, with particular reference to FIGS. 13E, 13F, 13G, and others.

In an alternative embodiment of the present invention, two different catalyst heating modes are provided. In the first mode, the engine operates with some cylinders having more ignition timing retard than others. As described above, this allows the cylinders to operate at substantially higher load (for example, up to 70% air charge), since the cylinders with more retard are producing little torque. Thus, the cylinders with less retard than others can actually tolerate more ignition timing retard than if all cylinders were operating with substantially the same ignition timing retard while providing stable combustion. Then, the remaining cylinders produce large amounts of heat, and the unstable combustion has minimal NVH (Noise, Vibration, Harshness) impacts since very little torque is being produced in those cylinders. In this first mode, the air-fuel ratio of the cylinders can be set slightly lean of stoichiometry, or other values as described above.

In a second mode, the engine operates with all of the cylinders having substantially the same ignition timing, which is retarded to near the combustion stability limit. While this provides less heat, it provides more fuel economy. Further, the engine cylinders are operated near stoichiometry, or slightly lean of stoichiometry. In this way, after engine start-up, maximum heat is provided to the catalyst by operating the engine in the first mode until, for example, a certain time elapses, or a certain temperature is reached. Then, the engine is transitioned (for example, as described below herein) to operating with all cylinders having substantially the same ignition timing retard. Then, once the catalyst has reached a higher temperature, or another certain time has passed, the engine is transitioned to operating near optimal ignition timing.

Figure 13B:
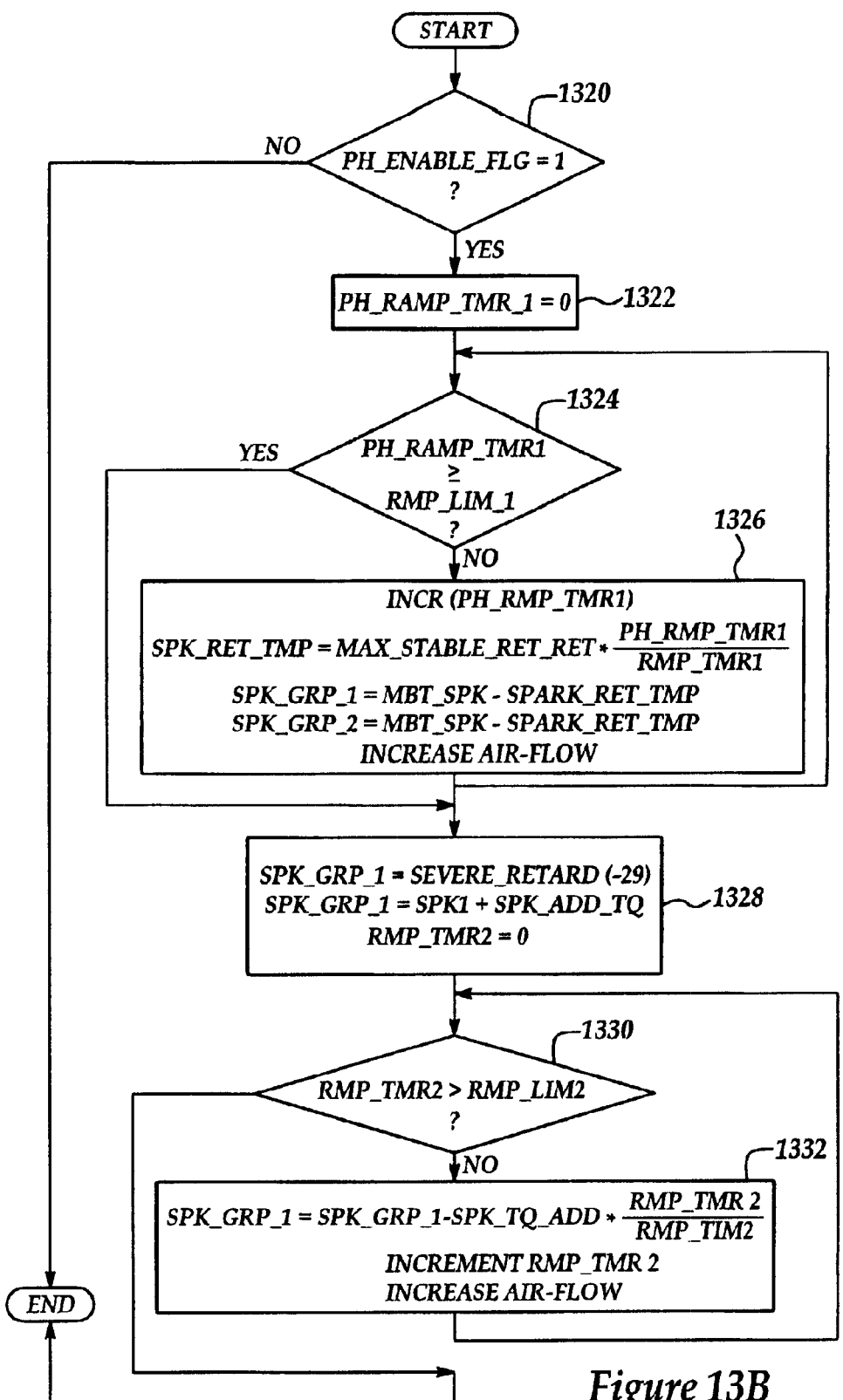

Referring now to FIG. 13B, the routine is described for transitioning in and out of the power seat strategy of FIG. 13A. The routine of FIG. 13B is called by step 1314 of FIG. 13A. In other words, the routine provides the following operation. First, the engine is started by operating all of the cylinders to combust an air and fuel mixture; and second, once the engine cylinders are firing synchronously, or engine speed has reached a predetermined threshold (and while the catalyst temperature is below a desired light-off temperature), the engine is transitioned to operate with one group of cylinders severely retarded and a second group of cylinders with only so much ignition timing retard as can be tolerated while providing acceptable engine combustion and minimum engine vibration. As described above, the cylinder group with a more retarded timing can be operated, for example, about 10 degrees more retarded than the less retarded cylinder group. However, this is just one example, and the difference can be various amounts such as 5 degrees, 10 degrees, 15 degrees, 20 degrees, 30 degrees, etc.

Also note that in this embodiment, both cylinder groups are operating substantially at stoichiometry, or slightly lean of stoichiometry. Also note that engagement/disengagement of the A/C compressor can be disabled during these transitions.

Referring now specifically to FIG. 13B, in step 1320 a determination is made as to whether the power heat mode has been requested via an affirmative answer to step 1312. In other words, the routine checks whether the flag (ph_enable_flg) is set to 1. When the answer to step 1320 is yes, the routine continues to step 1322 where a first ramping timer (ph_ramp_tmr1) is said equal to zero. Then, in step 1324, the routine determines whether the first ramping timer is greater than a first ramp limit (rmp_lim_1). When the answer to step 1324 is no, the routine continues to step 1326 where various operations are performed. In particular, in step 1326, the routine increments the first ramping timer; calculates temporary spark retard value (spark_ret_tmp) based on the maximum stability ignition timing retard that can be tolerated (max_stable_ret) and the first ramping timer and the first ramping time limit. Further, the routine calculates the ignition timing for the first and second groups (spk_grp_1, spk_grp_2) based on the optimum ignition timing (MBT_spk) and the temporary spark value. Further, the routine ramps the airflow to increase. Alternatively, when the answer to step 1324 is yes, the routine continues directly to step 1328.

In step 1328, the routine sets the first and second cylinder group ignition timing as follows: the second cylinder group ignition timing is set to severe retard (for example −29°), and the first cylinder group ignition timing is jumped up by an amount (spk_add_tq) necessary to counteract the decrease in engine torque caused by setting the second cylinder group to the severely retarded value. Further, in step 1328, the second ramping timer is set equal to zero.

Next, in step 1330, the routine determines whether the second ramping timer (Rmp_tmr_2) is greater than a limit time (Rmp_lim_2). When the answer to step 1330 is no, the routine continues to step 1332. In step 1332, the first cylinder group ignition timing is gradually decreased based on the ramping timer. Further, the second ramping timer is incremented and airflow is gradually increased. Alternatively, when the answer to step 1330 is yes, the routine ends.

Figure 13C:
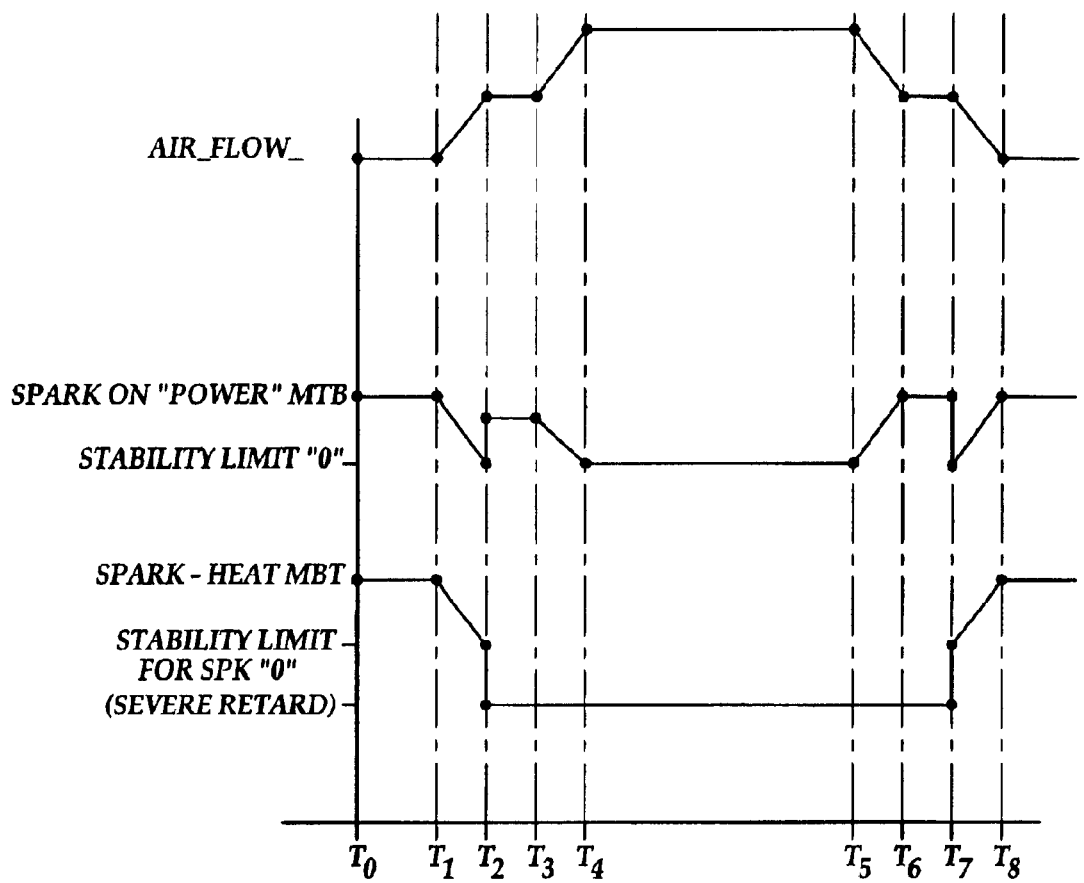
FIG. 13C is a graphical representation of engine operating parameters during transitions into and out of a catalyst heating mode.

In this way, it is possible to transition from all cylinders operating with substantially equal ignition timing to operating with a first group of cylinders severely retarded, and a second group of cylinders generating increased engine torque than if all cylinders were operating at substantially full ignition timing. The routine of FIG. 13B can be more fully understood by considering the graphs of FIG. 13C. The graph shows engine airflow, ignition timing for the two cylinder groups versus time. Ignition timing for cylinder group 1 and group 2 is shown in FIGS. 13C(2) and 13C(3), respectively. Before time t0, the engine is stopped. At time t0, the engine is cranked/started. Then, at time t1, the engine has reached a predetermined engine speed and all cylinders are being fired synchronously. At time t1, airflow is gradually increased while the ignition timing of both cylinder groups is retarded from optimum (nbt) timing. Then, at time t2, both cylinders have been retarded to the combustion stability limit (for example 0°). Up to this point, all cylinders are firing and producing substantially similar engine output. At time t2, the ignition timing on the second cylinder group is jumped to a severely retarded value (for example −29°) as shown in FIG. 13C(3). Similarly, at this time, the ignition timing on the first cylinder group is jumped back towards optimum ignition timing as shown in FIG. 13C(2). In particular, the amount of this jump on the first cylinder group is based on the amount of torque increase needed to cancel the torque decrease caused by the retard on the second cylinder group. Then, at time t3, the ignition timing on the first cylinder group is gradually ramped back towards the stability limit, while the airflow is again gradually increased to maintain engine torque until time t4. Thus, according to the present invention, it is possible to adjust airflow (via the throttle or other parameters such as variable cam timing) while adjusting ignition timing as described above to transition the engine to operating with some cylinders severely retarded and others retarded only to a predetermined threshold, while maintaining engine torque substantially constant. The remainder of FIG. 13C will be describe below herein after description of the reverse transitions in FIG. 13D.

Figure 13D:
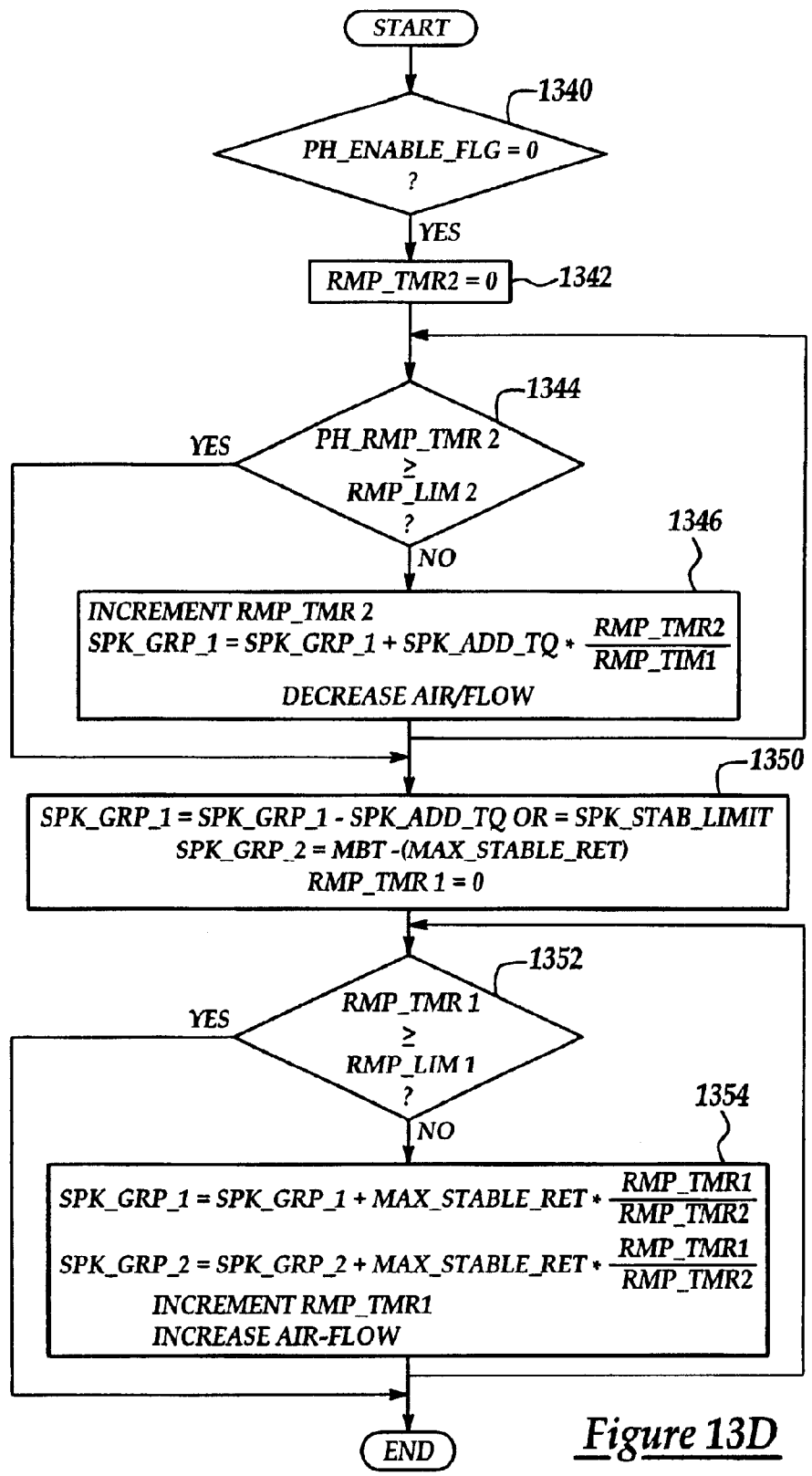
FIG. 13D is a high level flow chart for controlling the engine out of catalyst heating mode.

Referring now to FIG. 13D, a routine is described for transitioning from operating with some cylinder groups having more retarded ignition timing than others to operating with other cylinders as substantially the same ignition timing. In particular, the routine of FIG. 13D is called by step 1314 of FIG. 13A. First, in step 1340, the routine determines whether the power heat flag is set to zero. When the answer to step 1340 is yes, the routine continues to step 1342. In step 1342, the routine sets the second ramp timer to zero. Then, in step 1344, the routine determines whether the second ramp timer is greater than a second ramp limit. When the answer to step 1344 is no, the routine continues to step 1346. In step 1346, the routine increments the second ramp timer and sets the ignition timing for the first cylinder group to ramp based on the second ramp timer and the first ramp limit, as well as the ignition timing adjustment based on the change in torque. Further, the routine decreases airflow. Next, in step 1350, the routine sets the first and second ignition timings as shown in the Figure. Further, the routine sets the first ramp timer to zero. In particular, the routine sets the first ignition timing to jump based on the additional torque, or clips it to the stability limit. Next, in step 1352, the routine determines whether the first ramp timer is greater than the first timer limit. When the answer to step 1352 is no, the routine continues to step 1354. In step 1354, the routine sets the first and second cylinder group ignition timing as described, as well as incrementing the first ramp timer and increasing airflow.

Operation according to FIG. 13D can be more fully understood by again considering FIG. 13C. As described above, at time t4, the engine is operating at a high airflow with the first cylinder group having an ignition timing retard to the stability limit, while the second cylinder group has an ignition timing that is severely retarded past the stability limit, thereby generating heat to the engine exhaust. At time t5, the routine decreases engine airflow while increasing the ignition timing on the first cylinder group towards optimum ignition timing until time t6. Then, at time t7, the routine jumps the ignition timing on the first cylinder group towards the stability limit, while at the same time jumping the ignition timing on the second cylinder group to the stability limit. Then, from time t7 to time t8, engine airflow is further decreased, while the ignition timing on both cylinder groups is ramped towards optimal ignition timing. In this way, the routine transitions to operating all of the cylinders at substantially the same ignition timing near the optimum ignition timing.

Figure 13E:
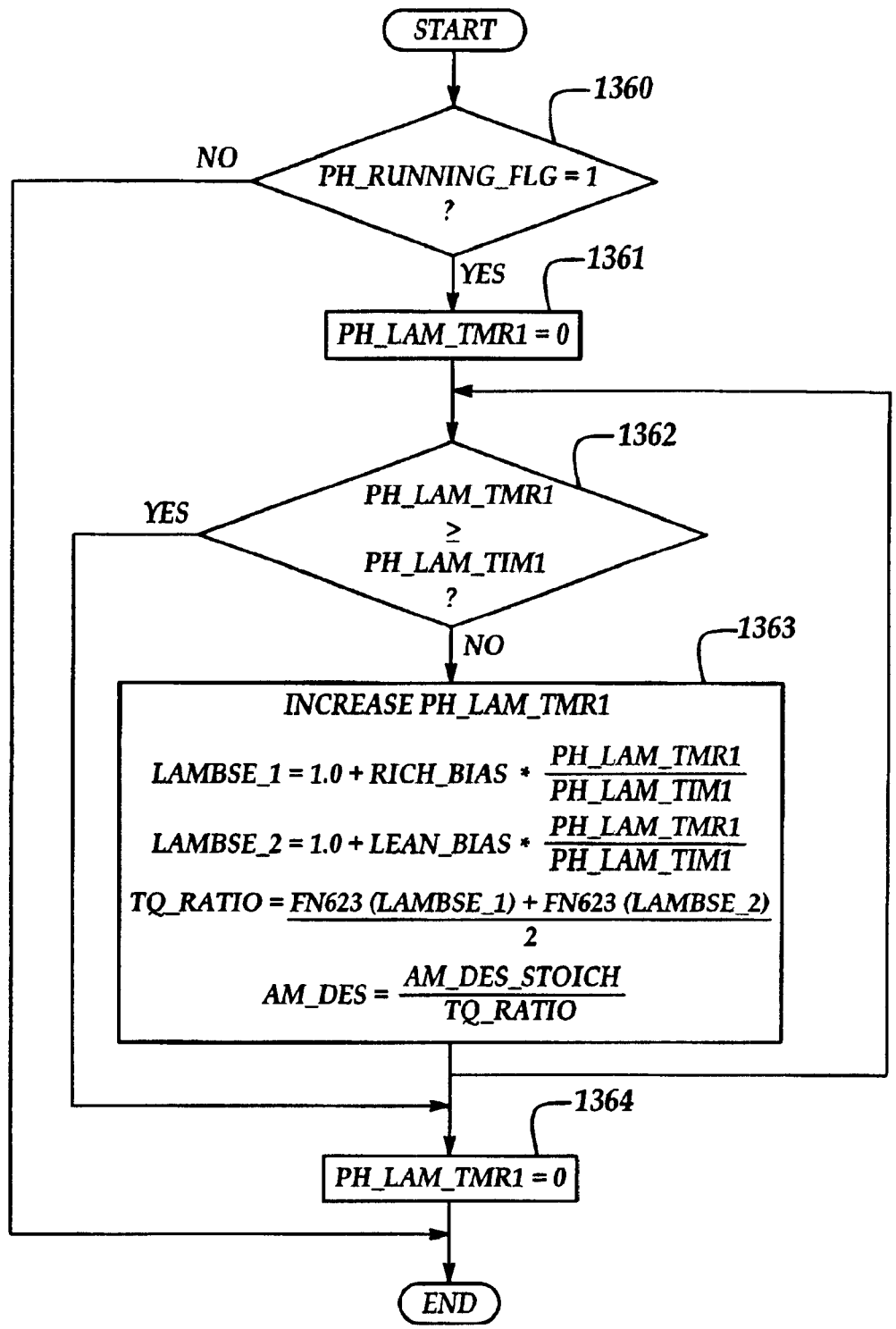
FIGS. 13E–F are high level flow charts for controlling engine error-fuel ratio during catalyst heating mode.

Referring now to FIG. 13E, a routine is described for transitioning the engine air fuel ratio after the engine has transitioned to operating with one group of cylinders having an ignition timing more retarded than another group of cylinders. In particular, the routine describes how to transition to operate one group of cylinders with a slightly rich bias, and the other group of cylinders with a slightly lean bias. Further, the lean and rich bias values are selected such that the overall mixture air-fuel ratio of gasses from the first and second cylinder groups is slightly lean of stoichiometry, for example, between 0.1 and 1. air-fuel ratios. First, in step 1360, the routine determines whether the engine is currently operating in the power-heat mode (operating one cylinder group with an ignition timing more retarded than another cylinder group). When the answer to step 1360 is yes, the routine continues to step 1361, where the air fuel ratio timer (ph_lam_tmr1) is set equal to zero. Then, the routine continues to step 1362, where a determination is made as to whether the air-fuel ratio timer is greater than a first limit value (ph_lam_tim1); When the answer to step 1362 is no, the routine continues to step 1363. In step 1363, the timer is incremented, and the first and second cylinder group desired air-fuel ratios (lambse_1, lambse2) are ramped to the desired values, while airflow is adjusted to maintain engine torque substantially constant. In particular, while the airflow ratios are ramped, the engine airflow is increased. In particular, the torque ratio (tq_ratio) is calculated using function 623. Function 623 contains engine mapping data that gives a relationship between the engine torque ratio and the air-fuel ratio. Thus, from this function and the equations described in step 1363, it is possible to calculate the desired airflow to maintain engine torque substantially constant while changing the combustion air-fuel ratios. Then, in step 1364, the timer is reset to zero.

Thus, as described in FIG. 13E above, the engine is transitioned from operating all of the cylinders at substantially the same air-fuel ratio (with one cylinder group operating at an ignition timing more retarded than others) to operating first group of cylinders at a first ignition timing with a first air-fuel ratio slightly rich, and a second group of cylinders operating a second ignition timing substantially more retarded than the first ignition timing, and at a second air-fuel ratio slightly lean of stoichiometry. This operation can be more fully understood by considering the first portion of FIG. 13G. In particular, the FIG. 13G(1) shows the spark transition described above herein with particular reference to FIG. 13B. FIG. 13G(2), shows an air-fuel ratio transition according to FIG. 13E. Note that the desired airflow adjustment that is made to compensate for the change in air-fuel ratio of the first and second cylinder groups may cause airflow to increase in some conditions, while causing air flow to decrease in other conditions. In other words, there may be conditions that require increasing engine airflow to maintain substantially the same engine torque, while there may also be other conditions that require decreasing engine airflow to maintain engine torque substantially constant. FIG. 13G(3) will be described more fully below after a description of FIG. 13F.

Figure 13F:
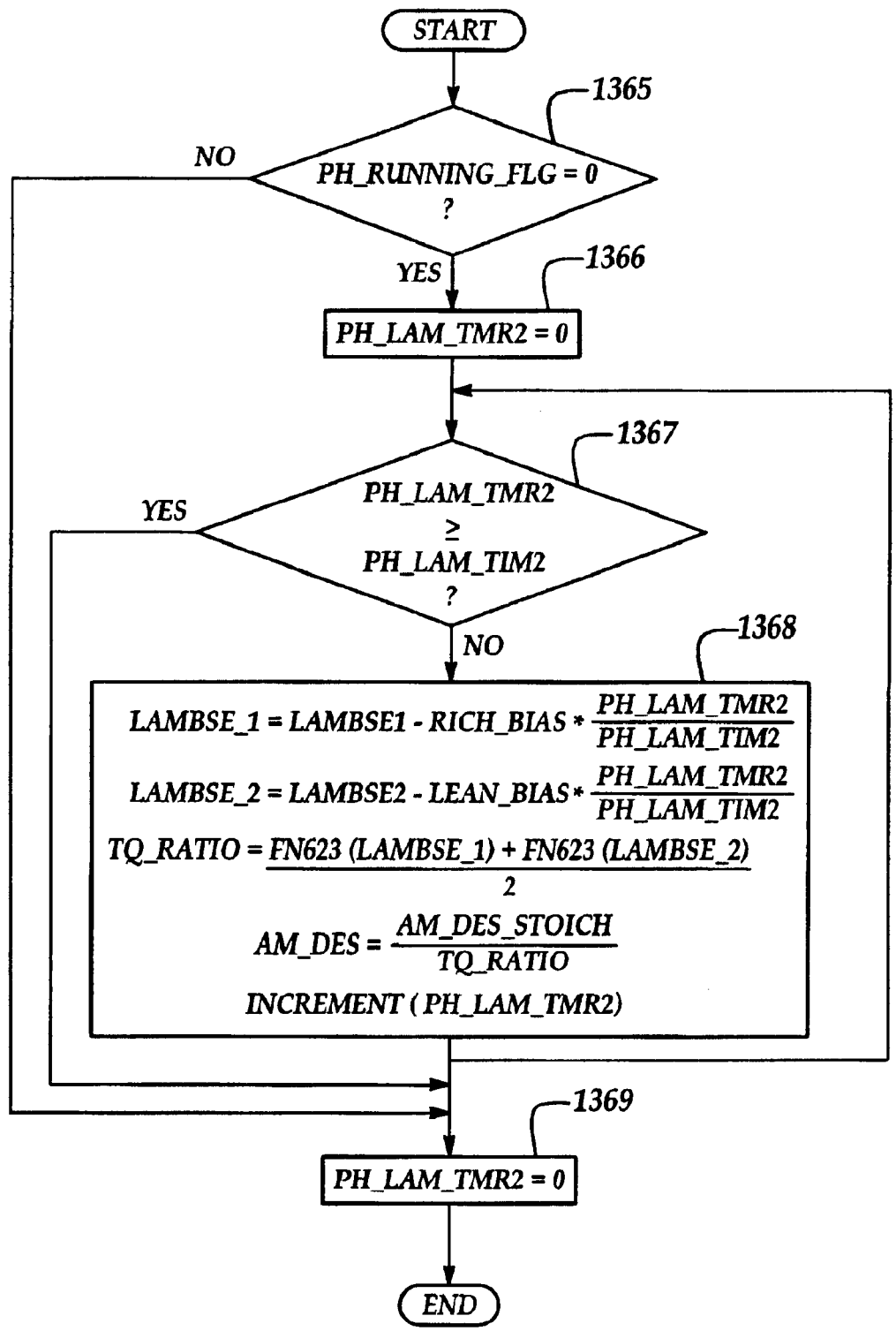

Referring now to FIG. 13F, routine is described for transitioning out of the split air-fuel ratio operation. First, in step 1365, the routine determines whether the engine is operating in the power heat mode by checking the flag (ph_running_flg). When the answer to step 1365 is yes, the routine continues to step 1366 where the second air fuel ratio timer (ph_lam_tmr2) is set to zero. Next, in step 1367, the routine determines whether the timer is greater than a limit value (ph_lam_tim2). When the answer to step 1367 is no, the routine continues to step 1368.

In step 1368, the timer is incremented, and the first and second cylinder group desired air-fuel ratio is open (lambse_1, lambse_2) are calculated to maintain engine torque substantially constant. Further, the desired air flow is calculated based on the torque ratio and function 623. Further, these desired air-fuel ratios are calculated based on the desired rich and lean bias values (rach_bias, lean_bias). As such, in a manner similar to step 1363, the air-fuel ratios are ramped while the airflow is also gradually adjusted. Just as in step 1363, the desired air-fuel ratio may increase or decrease depending on operating conditions. Finally, in step 1369, the timer is reset to zero.

Operation according to FIG. 13F can be more fully understood by continuing the second half of the graph in FIG. 13G. Continuing the description of 13G from above, after the air fuel transition into the split air-fuel operating mode, the Figure shows transitioning out of the split air-fuel ratio mode, where the desired air-fuel ratios are ramped to a common value. Similarly, the airflow is adjusted to compensate engine torque.

Figure 13H:
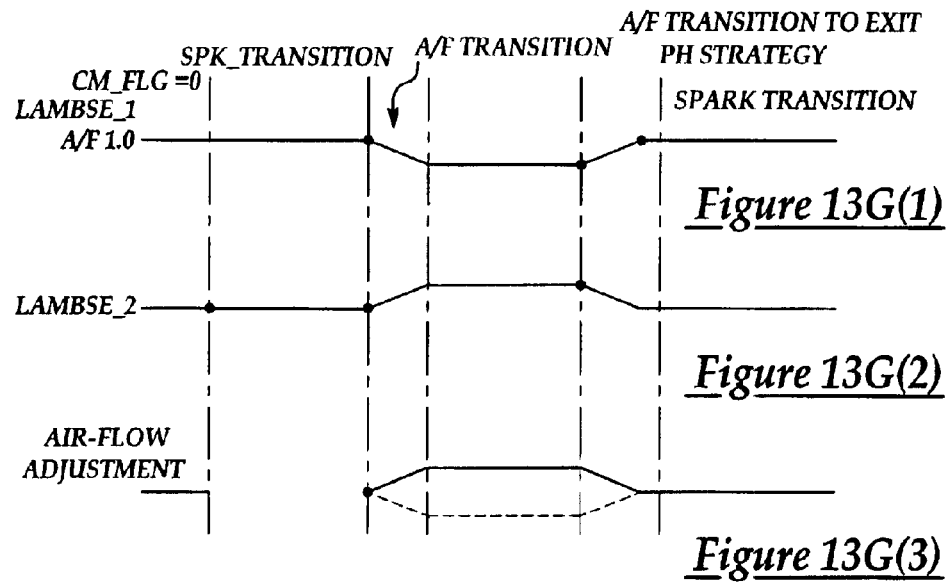
FIG. 13H is a high level flow chart for controlling engine idle speed control depending on whether catalyst heating is in progress.
Figure 13H:
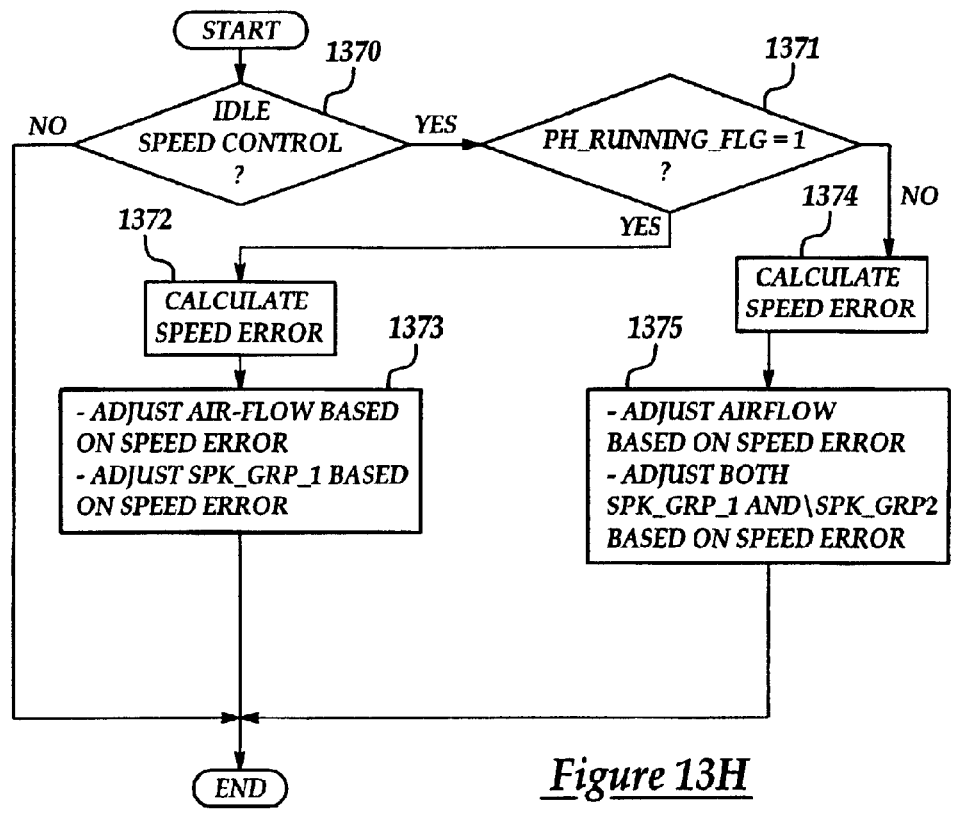

Referring now to FIG. 13H, a routine is described for controlling engine idle speed during the power heat mode. In other words, after the engine is started by firing all the cylinders, and the engine is transitioned to operating with a first group of cylinders having more ignition timing retard than a second group of cylinders, FIG. 13H describes the control adjustments made to maintain engine idle speed during such operation. First, in step 1370, the routine determines whether the engine is in the idle speed control mode. When the answer to step 1370 is yes, the routine continues to step 1371 where a determination is made as to whether the engine is operating in the power heat mode by checking a flag (ph_running_flg). When the answer to step 1371 is yes, the engine is operating with the first cylinder group having more ignition timing retard than a second cylinder group. When the answer to step 1371 is yes, the routine continues to step 1372 and calculates an engine speed error between a desired engine idle speed and a measured engine idle speed. Then, in step 1373, the routine calculates an airflow adjustment value based on the speed error as well as an adjustment to the first cylinder group ignition timing based on the speed error. In other words, the routine adjusts airflow to increase when engine speed falls below the desired value, and adjusts airflow to decrease when engine speed rises above the desired value. Similarly, when engine speed falls below the desired value, the ignition timing of the first cylinder group (spk_grp_1) is advanced toward optimal emission timing. Further, when engine speed rises above the desired value, the ignition timing of the first cylinder group is retarded away from optimal ignition timing.

When the answer to step 1371 is no, the routine continues to step 1374 and calculates an engine idle speed error. Then, in step 1375, the routine adjusts airflow based on the speed error, as well as both the first and second cylinder group ignition timing values based on the speed error. In other words, when not in the power heat mode, the engine adjusts the ignition timing to all cylinders to maintain engine idle speed.

Figure 13I:
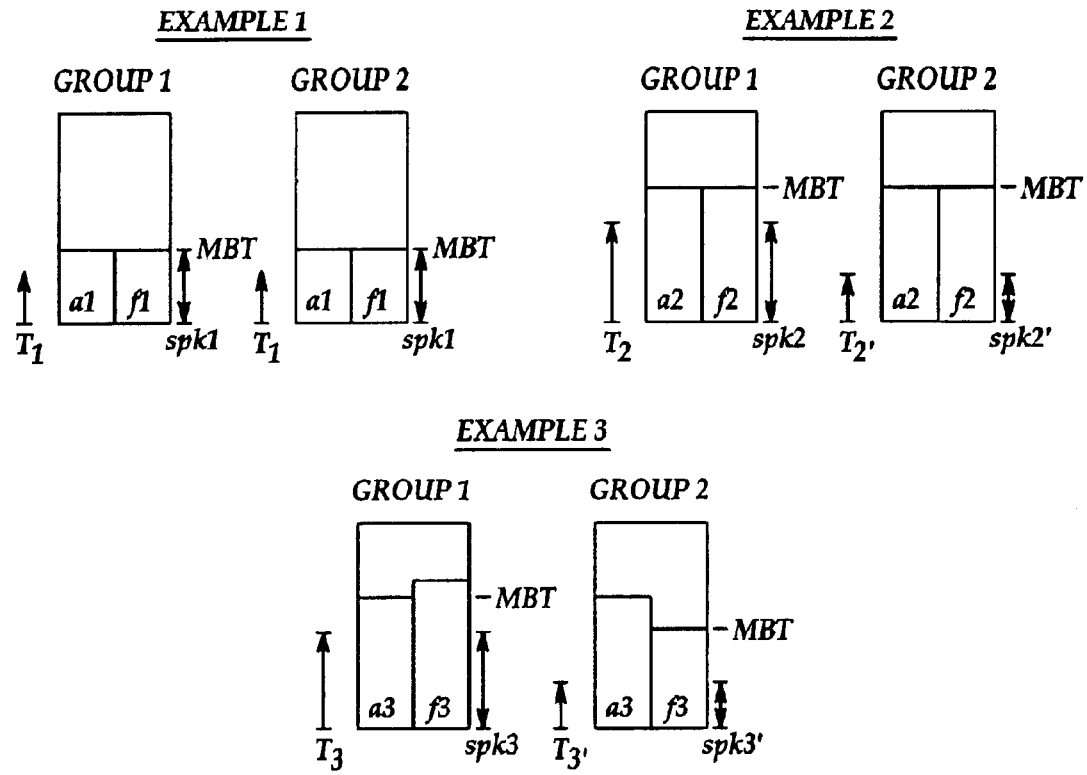
FIG. 13I graphically represents operation according to an aspect of the present invention.
Figure 13J:
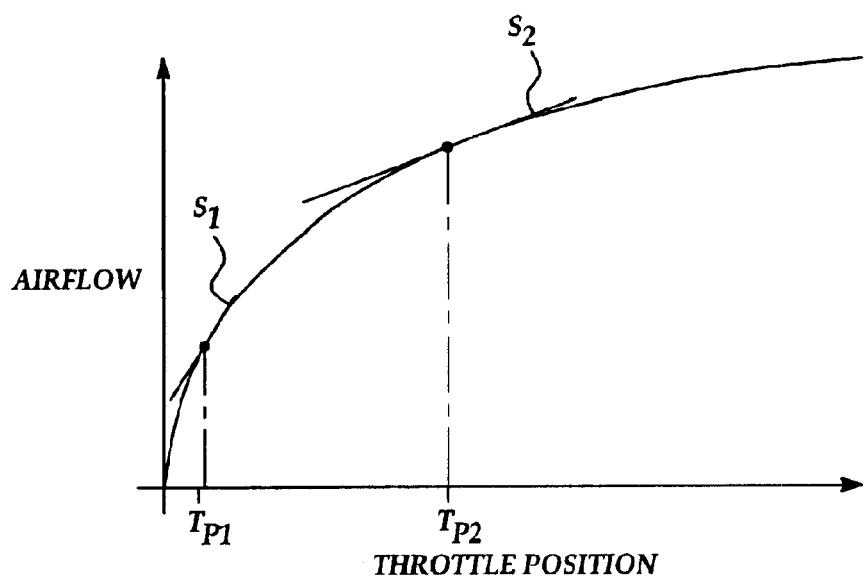
FIG. 13J graphically illustrates the effect of throttle position on engine air flow.
Figure 13K:
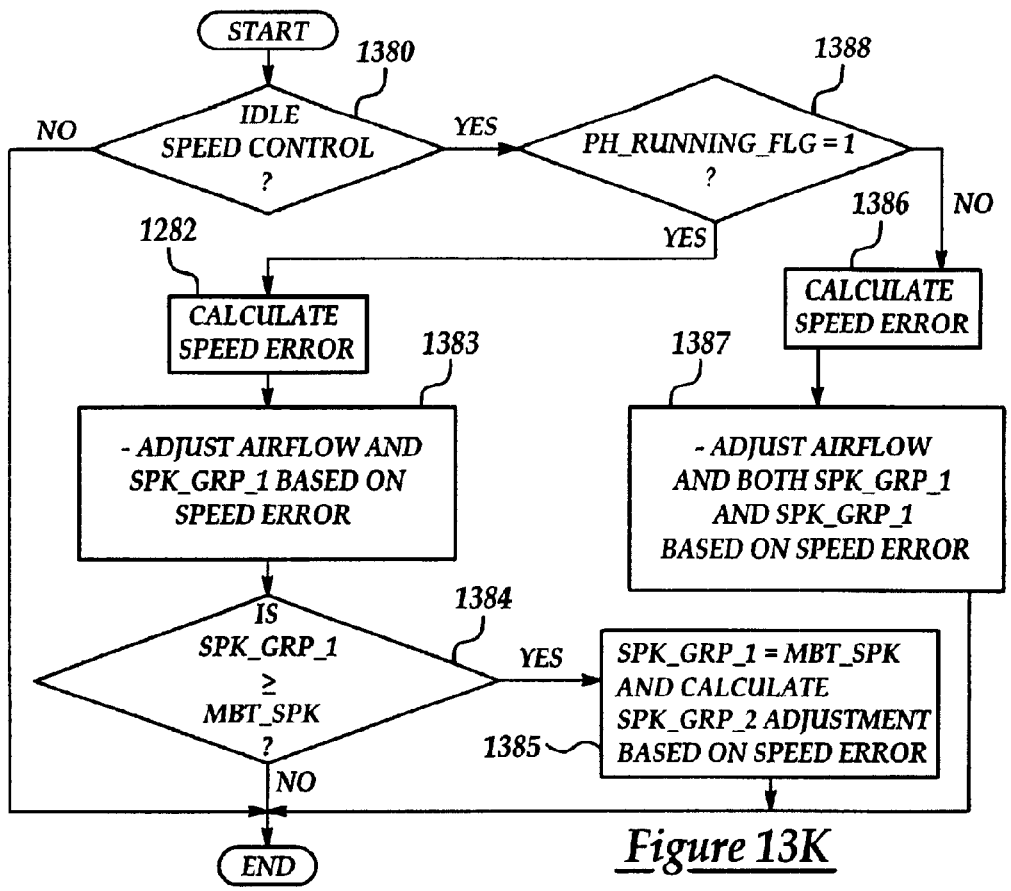
FIG. 13K is a high level flow chart for controlling engine idle speed.

Referring now to FIG. 13K, an alternate embodiment of the routine described in FIG. 13H is described. Steps 1380, 1381, 1382, 1386, and 1387 correspond to steps 1370, 1371,1372, 1374, and 1375 of step 13H. However, in FIG. 13K, the routine has an additional check to determine whether the control authority of ignition timing of the first cylinder group has reached a limit value. In particular, in step 1384, the routine determines whether the first ignition timing (spk_grp_1) is greater than the optimal ignition timing (MBT-SPK). In other words, the routine determines whether the ignition timing of the first cylinder group has been advanced to the maximum ignition timing limit. When the answer to step 1384 is yes, the routine continues to step 1385 and sets the first cylinder group ignition timing to the optimal ignition timing and calculates an adjustment to the second cylinder group ignition timing based on a speed error.

In other words, if a large engine load is placed on the engine and adjustment of engine air flow and the first cylinder group ignition timing to the optimal ignition timing is insufficient to maintain the desired engine idle speed, then additional torque is supplied from the second cylinder group by advancing the ignition timing towards the optimal ignition timing. While this reduces the engine heat generated, it only happens for a short period of time to maintain engine idle speed, and therefore, has only a minimal effect on catalyst temperature. Thus, according to the present invention, it is possible to quickly produce a very large increase in engine output since the engine has significant amount of ignition timing retard between the first and second cylinder groups.

Note that FIG. 13C shows operation where desired engine torque is substantially constant. However, the routines of FIGS. 13A, B and others, can be adjusted to compensate for a change in desired engine output by adjusting engine airflow to provide the desire engine output. That is, the airflow can have a second adjustment value to increase or decrease engine airflow from the values shown to accommodate such a request. In other words, during the very short time of the transition, the desired engine output can be maintained substantially constant if desired, or increased/decreased by further adjusting engine airflow from that shown.

Note that in the above described idle speed control operations, air/fuel or spark transitions may be smoothed by engaging or disengaging an engine load such as this AC compressor.

Referring now to FIG. 13I, several examples of operation of an engine are described to better illustrate operation according to the present invention and its corresponding advantages. These examples schematically represent engine operation with differing amounts of air, fuel, and ignition timing. The examples illustrate schematically, one cylinder of a first group of cylinders, and one cylinder of a second group of cylinders. In Example 1, the first and second cylinder groups are operating with substantially the same airflow, fuel injection, and ignition timing. In particular, the first and second groups induct an airflow amount (a1), have injected fuel amount (f1), and have an ignition timing (spk1). In particular, groups 1 and 2 in Example 1 are operating with the air and fuel amounts in substantially stoichiometric proportion. In other words, the schematic diagram illustrates that the air amount and fuel amount are substantially the same. Also, the Example 1 illustrates that the ignition timing (spk1) is retarded from optimal timing (MBT). Operating in this way results in the first and second cylinder groups producing an engine torque (T1).

Example 2 of FIG. 13I illustrates operation according to the present invention. In particular, the ignition timing of the second group (spk2') is substantially more retarded than the ignition timing of the first cylinder group of Example 2 (spk2). Further, the air and fuel amounts (a2, f2) are greater than the air amounts in Example 1. As a result of operation according to Example 2, the first cylinder group produces engine torque (T2), while the second cylinder group produces engine torque (T2'). In other words, the first cylinder group produces more engine torque than when operating according to Example 1 since there is more air and fuel to combust. Also note that the first cylinder group of Example 2 has more ignition retard from optimal timing than the ignition timing of group 1 of Example 1. Also, note that the engine torque from the second cylinder group (T2') is less than the engine torque produced by the first and second cylinder group of Example 1, due to the severe ignition timing retard from optimal timing. The combined engine torque from the first and second cylinder groups of Example 2 can be roughly the same as the combined engine torque in the first and second cylinder groups of Example 1. However, significantly more exhaust heat is generated in Example 2 due to the large ignition timing retard of the second group, and the ignition timing retard of the first group operating at a higher engine load.

Referring now to Example 3 of FIG. 13I, operation according to another embodiment of the present invention is described. In Example 3, an addition to adjustments of ignition timing, the first cylinder group is operated slightly rich, and the second cylinder group is operated slightly lean. Also note that these cylinder groups can be operated at various rich and lean levels. Operation according to the third example produces additional heat since the exhaust temperature is high enough such that the excess fuel of the first group reacts with the excess oxygen from the second group.

Referring now to FIG. 13J, a graph is shown illustrating engine airflow versus throttle position. According to operation of the present invention, in one particular example an electronically controlled throttle is coupled to the engine (instead of, for example, a mechanical throttle and an idle air pass valve). FIG. 13J shows that at low throttle positions, a change in throttle position produces a large change in air flow, while at large throttle positions, a change in throttle position produces a relatively smaller change in air flow. As described above herein, operation according to the present invention (for example, operating some cylinders at a more retarded ignition timing than others, or operating some cylinders without fuel injection) causes the engine cylinders to operate at a higher load. In other words, the engine operates at a higher airflow and larger throttle position. Thus, since the slope of airflow to throttle position is lower in this operating mode, the controllability of airflow, and torque, is thereby improved. In other words, considering the example of idle speed control via adjustments of throttle, engine idle speed is better maintained at the desired level. For example, at throttle position (tp1) the slope relating airflow and throttle position is s1. At throttle position (tp2), the slope is s2, which is less than slope s1. Thus, if the engine were operating with all cylinders at substantially the same ignition timing, the throttle position may be operating about throttle position (tp1). However, if the engine is operating at a higher load (since some cylinders are operating with more ignition timing retard than others), then the engine can operate about throttle position (tp2). As such, better idle speed control can be achieved.

As described above, engine idle speed control is achieved by adjusting ignition timing during the power heat mode. Note that various alternate embodiments are possible. For example, a torque based engine idle speed control approach could be used. In this approach, from the desired engine speed and engine speed error, a desired engine output (torque) is calculated. Then, based on this desired engine torque, an airflow adjustment and ignition timing adjustment value can be calculated.

Figure 14:
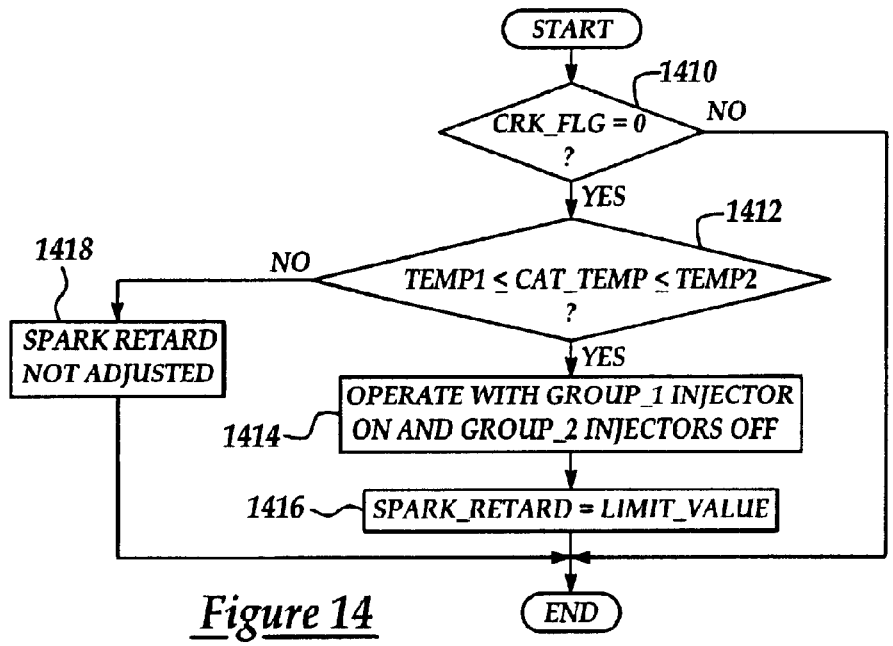
FIG. 14 is a high level flow chart for adjusting ignition timing of the engine.

Referring now to FIG. 14, an alternate embodiment is described for quickly heating the exhaust system. Note that the routine of FIG. 14 is applicable to various system configurations, such as systems where exhaust gasses from the cylinder groups mix at some point before they enter the catalyst to be heated.

First, in step 1410, the routine determines whether the crank flag is set to zero. Note that when the crank flag is set to zero, the engine is not in the engine start/crank mode. When the answer to step 1410 is yes, routine continues to step 1412. In step 1412, the routine determines whether the catalyst temperature (cat_temp) is above a first temperature (temp1) and below a second temperature (temp2). Various temperature values can be used for temp1 and temp2 such as, for example, setting temp1 to the minimum temperature that can support a catalytic reaction between rich gasses and oxygen, setting temp2 to a desired operating temperature. When the answer to step 1412 is no, the routine does not adjust the engine ignition timing (spark retard).

Alternatively, when the answer to step 1412 is yes, the routine continues to step 1414. In step 1414, the routine adjusts engine operation to operate with one cylinder group receiving injecting fuel and inducting air, and the second group inducting air with substantially no injector fuel. More specifically, if the engine was started with all cylinders (i.e., all cylinders are currently firing) then the engine transitions to operating with only some cylinders firing, such as described above herein with particular reference to FIG. 3D(2), for example. Also, once the engine has been transitioned, the cylinders that are combusting air and fuel are operated at an air-fuel ratio which is rich of stoichiometry. However, the firing cylinder air-fuel ratio is not set so rich such that the mixture of the combusted gasses with the air from the non-combusting cylinders is substantially greater than near stoichiometry. In other words, the mixture air-fuel ratio is maintained within a limit (above/below) near the stoichiometric value. Next, in step 1416, the routine sets the ignition timing, for the firing cylinders, to a limited value. In other words, the ignition timing for the firing cylinders are set to, for example, the maximum ignition timing retard that can be tolerated at the higher engine load, while producing acceptable engine control and engine vibration.

In this way, the rich combustion gasses from the firing cylinders can mix with and react with the excess oxygen in the cylinders without injected fuel to created exothermic or catalytic heat. Further, heat can be provided from the firing cylinders operating at a higher load than they otherwise would if all cylinders were firing. By operating at this higher load, significant ignition timing retard can be tolerated while maintaining acceptable engine idle speed control and acceptable vibration. Further, since the engine is operating at a higher load, the engine pumping work is reduced.

Also note that once the desired catalyst temperature, or exhaust temperature, has been reached, the engine can transition back to operating with all cylinders firing, if desired. However, when the engine is coupled to an emission control device that can retain NOx when operating lean, it may be desirable to stay operating in the mode with some cylinders firing and other cylinders operating with substantially no injected fuel. However, once the desired catalyst temperature is reached, the mixture air-fuel ratio can be said substantially lean of stoichiometry. In other words, the firing cylinders can be operated with a lean air-fuel ratio and the ignition timing set to maximum torque timing, while the other cylinders operate with substantially no injected fuel.

Figure 15:
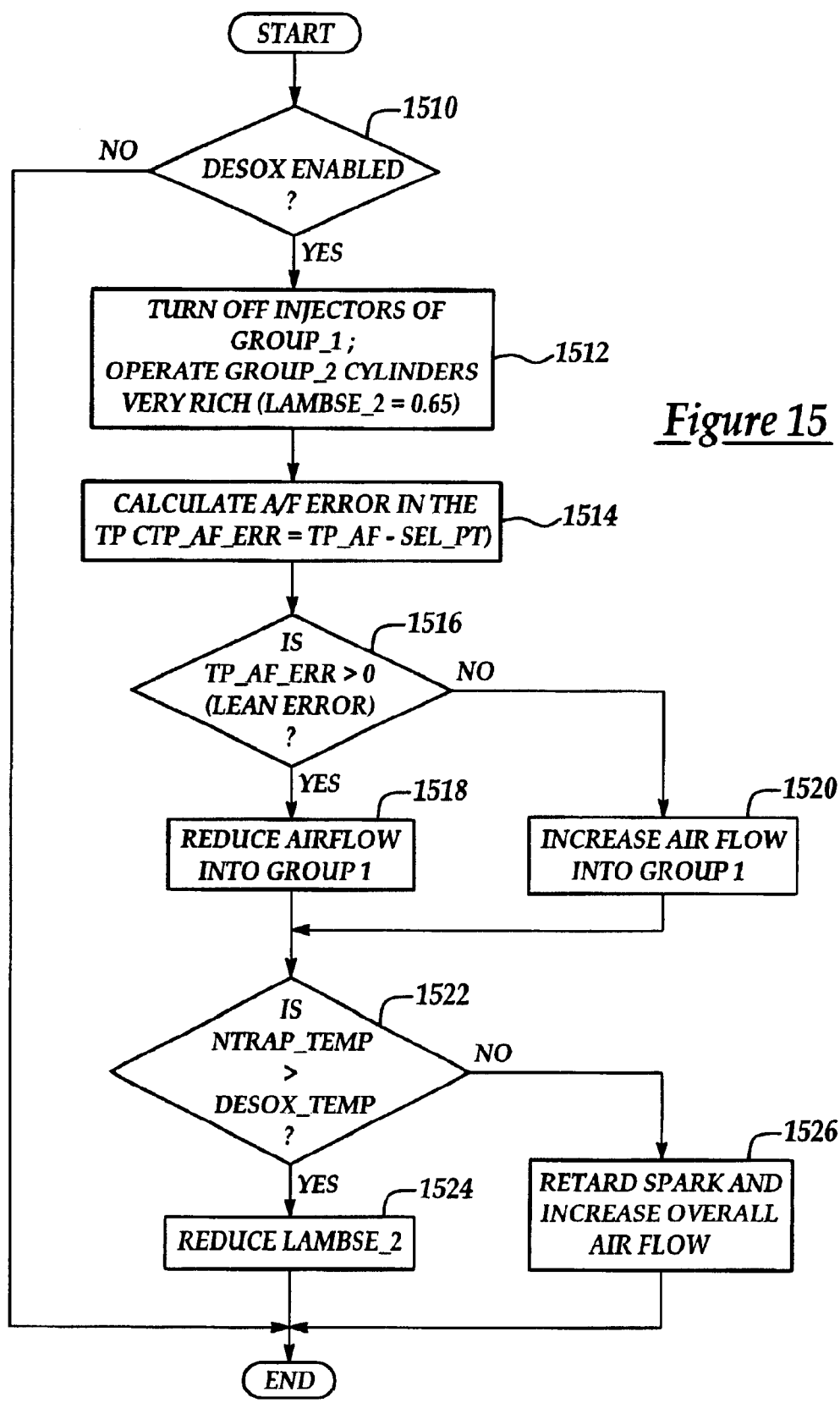
FIG. 15 is a high level flow chart for adjusting injected fuel based on operating modes.

Referring now to FIG. 15, another alternate embodiment of the present invention is described for heating the exhaust system. In this particular example, the routine operates the engine to heat the emission control device to remove sulfur ($SO_x$) that has contaminated the emission control device. In step 1510, the routine determines whether a desulfurization period has been enabled. For example, a desulfurization period is enabled after a predetermined amount of fuel is consumed. When the answer to step 1510 is yes, the routine continues to step 1512. In step 1512, the routine transitions from operating with all cylinders firing to operating with some cylinders firing and other cylinders operating with substantially no injected fuel. Further, the firing cylinders are operated at a significantly rich air-fuel ratio such as, for example 0.65. Generally, this rich air-fuel ratio is selected as rich as possible, but not so rich as to cause soot formation. However, less rich values can be selected. Next, in step 1514, the routine calculates a mixture air-fuel ratio error in the exhaust system tailpipe. In particular, a tailpipe air-fuel ratio error (TP_AF_err) is calculated based on the difference between an actual tailpipe air-fuel ratio (TP-AF) minus a desired, or set-point, air-fuel ratio (set_pt). Note that the actual air-fuel ratio and tailpipe can be determined from an exhaust gas oxygen sensor positioned in the tailpipe, or estimated based on engine operating conditions, or estimated based on air-fuel ratios measured in the engine exhaust.

Next, in step 1516, the routine determines whether the tailpipe air fuel air is greater than zero. When the answer to step 1516 is yes (i.e., there is a lean error), the routine continues to step 1518. In step 1518, the airflow into the group operating with substantially no injected fuel is reduced. Alternatively, when the answer to step 1516 is no, the routine continues to step 1520 where the airflow into the group operating with substantially no injected fuel is increased. Note that the airflow into the group operating with substantially no injected fuel can be adjusted in a variety of ways. For example, it can be adjusted by changing the position of the intake throttle. However, this also changes the airflow entering the cylinder's combusting air and fuel and thus other actions can be taken to minimize any affect on engine output torque. Alternatively, the airflow can be adjusted by changing the cam timing/opening duration of the valves coupled to the group operating system with substantially no injected fuel. This will change the airflow entering the cylinders, with a smaller affect on the airflow entering the combusted cylinders. Next, in step 1522, a determination is made as to whether the catalyst temperature has reached the desulfurization temperature (desox_temp). In this particular example, the routine determines whether the downstream catalyst temperature (for example catalyst 224) has reached a predetermined temperature. Further, in this particular example, the catalyst temperature (ntrap_temp) is estimated based on engine operating conditions. Also note, that in this particular example, the downstream catalyst is particularly susceptible to sulfur contamination, and thus it is desired to remove sulfur in this downstream catalyst. However, sulfur could be contaminating upstream emission control devices, and the present invention can be easily altered to generate heat until the upstream catalyst temperature has reached its desulfurization temperature.

When the answer to step 1522 is yes, the routine reduces the air-fuel ratio in the cylinder and the combusting cylinders. Alternatively, when the answer to step 1522 is no, the routine retards ignition timing and increases the overall airflow to generate more heat.

In this way, heat is generated from the mixture of the combusted rich gas mixture and the oxygen in the airflow from the cylinders operating with substantially known injected fuel. The air-fuel ratio of the mixture is adjusted by changing the airflow through the engine. Further, additional heat can be provided by retarding the ignition timing of the combusting cylinders, thereby increasing the overall airflow to maintain the engine output.

As a general summary, the above description describes a system that exploits several different phenomena. First, as engine load increases, the lean combustion limit also increases (or the engine is simply able to operate lean where it otherwise would not be). In other words, as the engine operates at higher loads, it can tolerate a lean(er) air-fuel ratio and still provide proper combustion stability. Second, as engine load increases, the ignition timing stability limit also increases. In other words, as the engine operates at higher loads, it can tolerate more ignition timing retard and still provide proper combustion stability. Thus, as the present invention provides various methods for increasing engine load of operating cylinders, it allows for the higher lean air-fuel ratio or a more retarded ignition timing, for the same engine output while still providing stable engine combustion for some cylinders. Thus, as described above, both the ignition timing retard stability limit and the lean combustion stability limit are a function of engine load.

While the invention has been described in detail, those familiar with the art to which this invention relates will recognize various alternative designs and embodiments for practicing the invention as defined by the following claims.

What is claimed is:

1. A method for controlling engine operation for efficient operation, the engine having a first and second group of cylinders, each of said groups having at least one cylinder, the method comprising:

operating the engine in at least two modes, with a first mode including operating both the first and second group of cylinders with injected fuel and inducted air, and a second mode including operating the first group of cylinders with injected fuel and inducted air and the second group with substantially no injected fuel and inducted air;

during said second mode of operation, determining a desired air amount, and adjusting an actuator command to provide said desired air amount, taking into account excess oxygen in a recirculated exhaust gas being inducted into the engine.

2. The method recited in claim 1 wherein said actuator is a fuel injection amount.

3. The method recited in claim 1 wherein said actuator is a throttle position.

4. The method recited in claim 1 wherein engine is a multiple bank engine, and said first group includes a first bank and said second group includes a second bank.

5. The method recited in claim 1 wherein engine is a multiple V-type engine.

6. The method recited in claim 1 wherein engine is a multiple V-8 engine, with said first group including 4 cylinders of a first bank of said engine and said second group including 4 cylinders of a second bank of said engine.

7. The method recited in claim 1 wherein engine is coupled to an emission control device that stores NOx when operating lean and reduces stored NOx when operating rich.

* * * * *